(12) United States Patent
Cohen

(10) Patent No.: US 12,222,084 B2
(45) Date of Patent: Feb. 11, 2025

(54) LIGHTING JUNCTION BOX

(71) Applicant: Brandon Cohen, Vernon, CA (US)

(72) Inventor: Brandon Cohen, Vernon, CA (US)

(73) Assignee: AMP Plus, Inc., Vernon, CA (US)

( * ) Notice: Subject to any disclaimer, the term of this patent is extended or adjusted under 35 U.S.C. 154(b) by 282 days.

(21) Appl. No.: 17/725,386

(22) Filed: Apr. 20, 2022

(65) Prior Publication Data

US 2022/0243883 A1     Aug. 4, 2022

Related U.S. Application Data

(63) Continuation-in-part of application No. 17/505,563, filed on Oct. 19, 2021, and a continuation-in-part of (Continued)

(51) Int. Cl.
| | | |
|---|---|---|
| *H02G 3/08* | (2006.01) | |
| *F21S 8/02* | (2006.01) | |
| *F21V 21/04* | (2006.01) | |

(52) U.S. Cl.
CPC ............ *F21S 8/026* (2013.01); *F21V 21/047* (2013.01); *H02G 3/081* (2013.01)

(58) Field of Classification Search
CPC .......... H02G 3/08; H02G 3/081; H02G 3/083; H02G 3/12; H02G 3/121; H02G 3/126;
(Continued)

(56) References Cited

U.S. PATENT DOCUMENTS

| | | |
|---|---|---|
| 1,133,535 A | 3/1915 | Cain |
| 1,471,340 A | 10/1923 | Knight |

(Continued)

FOREIGN PATENT DOCUMENTS

| | | |
|---|---|---|
| EP | 3521688 A1 | 7/2019 |
| WO | WO2010051985 A1 | 5/2010 |

(Continued)

OTHER PUBLICATIONS

US 10,816,169 B1, 10/2020, Danesh (withdrawn)
(Continued)

*Primary Examiner* — Angel R Estrada
(74) *Attorney, Agent, or Firm* — Eric Kelly

(57) ABSTRACT

A lighting-junction-box-assembly-for-remodel (assembly) has a lighting-junction-box, leg-springs attached to the lighting-junction-box, and mounting-tabs attached to the lighting-junction-box. The leg-springs are used to (temporarily) hold (by friction) the assembly within a hole in an existing ceiling, sized to fit the assembly. While the leg-springs are (temporarily) holding the assembly within the hole in the existing ceiling, other/different holes within extension-portions of the mounting-tabs are used to secure the entire assembly to the existing ceiling, via mechanical fasteners passing through the extension-portion holes and into the existing ceiling. An existing ceiling may be retrofitted with this assembly to have a lighting-junction-box where desired/needed in that existing ceiling; and as such, this assembly is particularly useful in remodeling situations (applications); however, the assembly may also be used in new construction. The assembly may also include a second junction-box to offload some of the circuitry that would otherwise be included within a lighting can.

18 Claims, 27 Drawing Sheets

Related U.S. Application Data application No. 17/106,048, filed on Nov. 27, 2020, now Pat. No. 11,725,805, and a continuation-in-part of application No. 16/790,345, filed on Feb. 13, 2020, now Pat. No. 11,460,157.

(58) Field of Classification Search
CPC ............ H02G 3/125; H02G 3/10; H05K 5/00; H05K 5/02; H05K 5/0204; H05K 5/0217; F21V 21/04; F21V 21/042; F21V 21/048
USPC ....... 174/50, 480, 481, 53, 57, 58, 535, 542, 174/560, 559, 54, 61, 63; 220/3.2–3.9, 220/4.02; 248/906, 343, 317, 342
See application file for complete search history.

(56) References Cited

U.S. PATENT DOCUMENTS

| | | |
|---|---|---|
| 1,856,356 A | 5/1932 | Owen |
| 2,352,913 A | 7/1944 | Parker |
| 2,758,810 A | 8/1956 | Good |
| 2,802,933 A | 8/1957 | Broadwin |
| 3,104,087 A | 9/1963 | Budnick |
| 3,773,968 A | 11/1973 | Copp |
| 3,913,773 A | 10/1975 | Copp |
| 4,450,512 A * | 5/1984 | Kristofek .................. F21S 8/02 362/147 |
| 4,673,149 A | 6/1987 | Grote |
| 4,733,339 A * | 3/1988 | Kelsall ...................... F21S 8/02 362/365 |
| 4,880,128 A | 11/1989 | Jorgensen |
| 4,919,292 A | 4/1990 | Hsu |
| 5,009,383 A | 4/1991 | Chapman |
| 5,206,464 A | 4/1993 | Lamm |
| 5,303,894 A | 4/1994 | Deschamps |
| 5,420,376 A | 5/1995 | Rajecki |
| 5,609,414 A * | 3/1997 | Caluori ..................... F21S 8/02 362/365 |
| 5,931,432 A | 8/1999 | Herold |
| 5,957,573 A | 9/1999 | Wedekind |
| 6,521,833 B1 | 2/2003 | DeFreitas |
| 6,967,284 B1 | 11/2005 | Gretz |
| 7,170,003 B2 * | 1/2007 | Fields .................... H02G 3/123 174/53 |
| 7,586,039 B1 * | 9/2009 | Gretz ..................... H02G 3/123 174/53 |
| 7,673,842 B2 * | 3/2010 | Nevers .................... F16F 1/025 248/906 |
| 7,784,754 B2 | 8/2010 | Nevers |
| 7,857,275 B2 | 12/2010 | de la Borbolla |
| 7,950,832 B2 | 5/2011 | Tanaka |
| 8,235,549 B2 | 8/2012 | Gingrich, III |
| 8,308,322 B2 * | 11/2012 | Santiago ................ F21V 21/048 362/365 |
| 8,322,897 B2 | 12/2012 | Blincoe |
| 8,545,063 B2 * | 10/2013 | Dupuy .................... F21V 21/04 362/404 |
| 8,545,064 B2 | 10/2013 | Blincoe |
| 8,575,483 B2 * | 11/2013 | Gauthier ................ H02G 3/121 174/53 |
| D704,875 S * | 5/2014 | Johnson ........................ D26/74 |
| 8,845,144 B1 | 9/2014 | Davis |
| 8,926,133 B2 | 1/2015 | Booth |
| 9,039,254 B2 | 5/2015 | Danesh |
| 9,151,457 B2 | 10/2015 | Pickard |
| 9,404,639 B2 | 8/2016 | Bailey |
| 9,523,493 B2 | 12/2016 | Chen |
| 9,605,842 B1 | 3/2017 | Davis |
| 9,673,597 B2 | 6/2017 | Lee |
| 9,696,021 B2 | 7/2017 | Wronski |
| 9,797,562 B2 | 10/2017 | Dabiet |
| 9,854,642 B2 | 12/2017 | Kashani |
| 9,890,942 B2 | 2/2018 | Lin |
| 9,945,548 B2 | 4/2018 | Williams |
| 9,964,266 B2 | 5/2018 | Danesh |
| 10,072,805 B2 | 9/2018 | Bailey |
| D832,218 S | 10/2018 | Wronski |
| 10,103,533 B1 | 10/2018 | Gretz |
| D833,977 S | 11/2018 | Danesh |
| 10,139,059 B2 | 11/2018 | Danesh |
| 10,244,607 B1 | 3/2019 | Kashani |
| D847,414 S | 4/2019 | Danesh |
| D847,415 S | 4/2019 | Danesh |
| 10,247,390 B1 | 4/2019 | Kopitzke |
| D848,375 S | 5/2019 | Danesh |
| D851,046 S | 6/2019 | Peng |
| 10,378,738 B1 | 8/2019 | Davis |
| 10,408,395 B2 | 9/2019 | Danesh |
| 10,408,396 B2 | 9/2019 | Wronski |
| D864,877 S | 10/2019 | Danesh |
| 10,488,000 B2 | 11/2019 | Danesh |
| 10,551,044 B2 | 2/2020 | Peng |
| 10,563,850 B2 | 2/2020 | Danesh |
| D877,957 S | 3/2020 | Kopitzke |
| 10,591,120 B2 | 3/2020 | Bailey |
| 10,609,785 B1 | 3/2020 | Fardadi |
| 10,616,968 B2 | 4/2020 | Wang |
| 10,663,127 B2 | 5/2020 | Danesh |
| 10,663,153 B2 | 5/2020 | Nikooyan |
| 10,753,558 B2 | 8/2020 | Danesh |
| 10,805,997 B2 | 10/2020 | Wang |
| 10,816,148 B2 | 10/2020 | Danesh |
| D901,398 S | 11/2020 | Danesh |
| D902,871 S | 11/2020 | Danesh |
| D903,605 S | 12/2020 | Danesh |
| D905,327 S | 12/2020 | Williams |
| D907,284 S | 1/2021 | Danesh |
| 10,975,570 B2 | 4/2021 | Shen |
| 10,982,829 B2 | 4/2021 | Danesh |
| 10,989,390 B2 | 4/2021 | Lotfi |
| 11,022,259 B2 | 6/2021 | Bailey |
| 11,028,982 B2 | 6/2021 | Danesh |
| 11,047,538 B2 | 6/2021 | Danesh |
| D924,467 S | 7/2021 | Danesh |
| D925,109 S | 7/2021 | Danesh |
| 11,060,705 B1 | 7/2021 | Danesh |
| 11,067,231 B2 | 7/2021 | Lotfi |
| 11,085,597 B2 | 8/2021 | Danesh |
| 11,118,768 B2 | 9/2021 | Danesh |
| 11,622,179 B2 * | 4/2023 | Christie ................. H04R 1/028 181/150 |
| 11,725,805 B2 * | 8/2023 | Cohen ..................... F21S 8/026 174/61 |
| 2014/0254177 A1 | 9/2014 | Danesh |
| 2015/0009676 A1 | 1/2015 | Danesh |
| 2015/0233556 A1 | 8/2015 | Danesh |
| 2015/0276185 A1 | 10/2015 | Bailey |
| 2016/0312987 A1 | 10/2016 | Danesh |
| 2016/0348860 A1 | 12/2016 | Bailey |
| 2016/0348861 A1 | 12/2016 | Bailey |
| 2017/0005460 A1 | 1/2017 | Lee |
| 2017/0045213 A1 | 2/2017 | Williams |
| 2017/0138576 A1 | 5/2017 | Peng |
| 2017/0167672 A1 | 6/2017 | Stauner |
| 2017/0167699 A1 | 6/2017 | Schubert |
| 2017/0290129 A1 | 10/2017 | Kashani |
| 2018/0231197 A1 | 8/2018 | Danesh |
| 2018/0372284 A1 | 12/2018 | Danesh |
| 2019/0049080 A1 | 2/2019 | Danesh |
| 2019/0063701 A1 | 2/2019 | Lotfi |
| 2019/0093836 A1 | 3/2019 | Danesh |
| 2019/0394849 A1 | 12/2019 | Wang |
| 2020/0056752 A1 | 2/2020 | Danesh |
| 2020/0116340 A1 | 4/2020 | Nikooyan |
| 2020/0158302 A1 | 5/2020 | Danesh |
| 2020/0232624 A1 | 7/2020 | Lotfi |
| 2020/0236755 A1 | 7/2020 | Wang |
| 2020/0291652 A1 | 9/2020 | Shen |
| 2020/0348000 A1 | 11/2020 | Bailey |
| 2020/0386375 A1 | 12/2020 | Danesh |
| 2020/0393118 A1 | 12/2020 | Danesh |
| 2021/0010647 A1 | 1/2021 | Danesh |
| 2021/0010663 A1 | 1/2021 | Nikooyan |
| 2021/0033268 A1 | 2/2021 | Danesh |

(56) References Cited

U.S. PATENT DOCUMENTS

| | | |
|---|---|---|
| 2021/0041070 A1 | 2/2021 | Danesh |
| 2021/0071836 A1 | 3/2021 | Danesh |
| 2021/0080084 A1 | 3/2021 | Danesh |
| 2021/0262650 A1 | 8/2021 | Danesh |

FOREIGN PATENT DOCUMENTS

| | | |
|---|---|---|
| WO | WO2018237294 A2 | 12/2018 |
| WO | WO2018237294 A3 | 12/2018 |
| WO | WO2019046310 A1 | 3/2019 |
| WO | WO2019133669 A1 | 7/2019 |
| WO | WO2019222259 A1 | 11/2019 |
| WO | WO2019241198 A1 | 12/2019 |
| WO | WO2021051101 A1 | 3/2021 |

OTHER PUBLICATIONS

US 10,969,069 B2, 04/2021, Danesh (withdrawn)

DMF DRD2 Product Publicly available at least as early as Sep. 6, 2018 Website: https://www.dmflighting.com/product/drd2/.

DMF DRD4 Product Publicly available at least as early as Sep. 6, 2018 Website: https://www.dmflighting.com/product/drd4/.

ELCO E247 Product Publicly available at least as early as Sep. 6, 2018 See attached concurrently filed NPL document with two product images of this ELCO E247 Product.

Soraa LED Optical Light Engine See: https://res.cloudinary.com/soraa/image/upload/v1516986148/resources/misc/ole-more-info-pdf.pdf.

Imtra Tide PowerLED Light Fixture See: https://www.imtra.com/1806fa8d-4593-40f4-bbf0-f9a833e92148/lighting-light-fixtures-detail.htm Publicly available at least as early as 2012.

ELCO 4" Round LED Reflector Insert Publicly available at least as early as Mar. 23, 2021 Website: https://elcolighting.com/products/4-round-led-reflector-insert.

ELCO 4" Five-Color Temperature Switch LED Reflector Inserts Publicly available at least as early as Mar. 23, 2021 Website: https://elcolighting.com/node/1432026.

MaxLite Publicly available at least as early as Mar. 23, 2021 Website: https://www.maxlite.com/news-and-events/2021/02/05/maxlite-introduces-canless-commercial-downlights-with-field-selectable-wattages-and-ccts/ and https://www.maxlite.com/products/universal-downlights-wattage-color-selectable/.

Soraa Vivid MR16—GU10; https://www.soraa.com/products/19-MR16-GU10.php (last visited Nov. 9, 2021).

Nora Lighting, NIOB-2RNDC https://noralighting.com/product/niob-2rndc/.

Nora Lighting, NIO-4RPH https://noralighting.com/product/nio-4rph/.

Nora Lighting, NIOB-1RNG https://noralighting.com/product/niob-1rng/.

Nora Lighting https://noralighting.com/product-category/products/pendants/cylinder/.

Nora Lighting https://noralighting.com/product-category/products/pendants/ilene-mini-cylinder/.

Bruck Lighting https://brucklighting.com/download/b/GX15/Spec%20Sheets/GX15%20Cylinder%20Multi-Mount%20Spec%20Sheet.pdf.

Elite LED Lighting https://iuseelite.com/product-category/architectural-cylinders/?characteristics=c%2Bq.

DMF Lighting https://www.dmflighting.com/wp-content/uploads/2021/12/DMFLighting_DCC_Spec_Sheet.pdf.

Sunco Lighting 10 Pack 4 Inch Recessed Lighting Housing Can Light New Construction, Air Tight Steel Ceiling Can, 120-277V, Hard Wired, TP24 Connector, Easy Install, IC Rated, UL Listed https://www.amazon.com/Sunco-Lighting-Construction-Downlight-Electrician/dp/B01N4RT3CD/ref=sr_1_5?crid=27BW0MUZZE2JJ&keywords=ASIN+B01N4RT3CD&qid=1649455893&sprefix=asin+b01n4rt3cd%2Caps%2C119&sr=8-5.

Halo E27ICAT E26 Series Recessed Lighting Shallow New Construction Insulation Contact Rated Air-Tite Housing, 6 In, Aluminum https://www.amazon.com/E27ICAT-Recessed-Lighting-Construction-Insulation/dp/B076C37RS3/ref=sr_1_1?crid=2CTRIHBHRV1KF&keywords=ASIN+B076C37RS3&qid=1649455212&sprefix=asin+b076c37rs3%2Caps%2C901&sr=8-1.

* cited by examiner

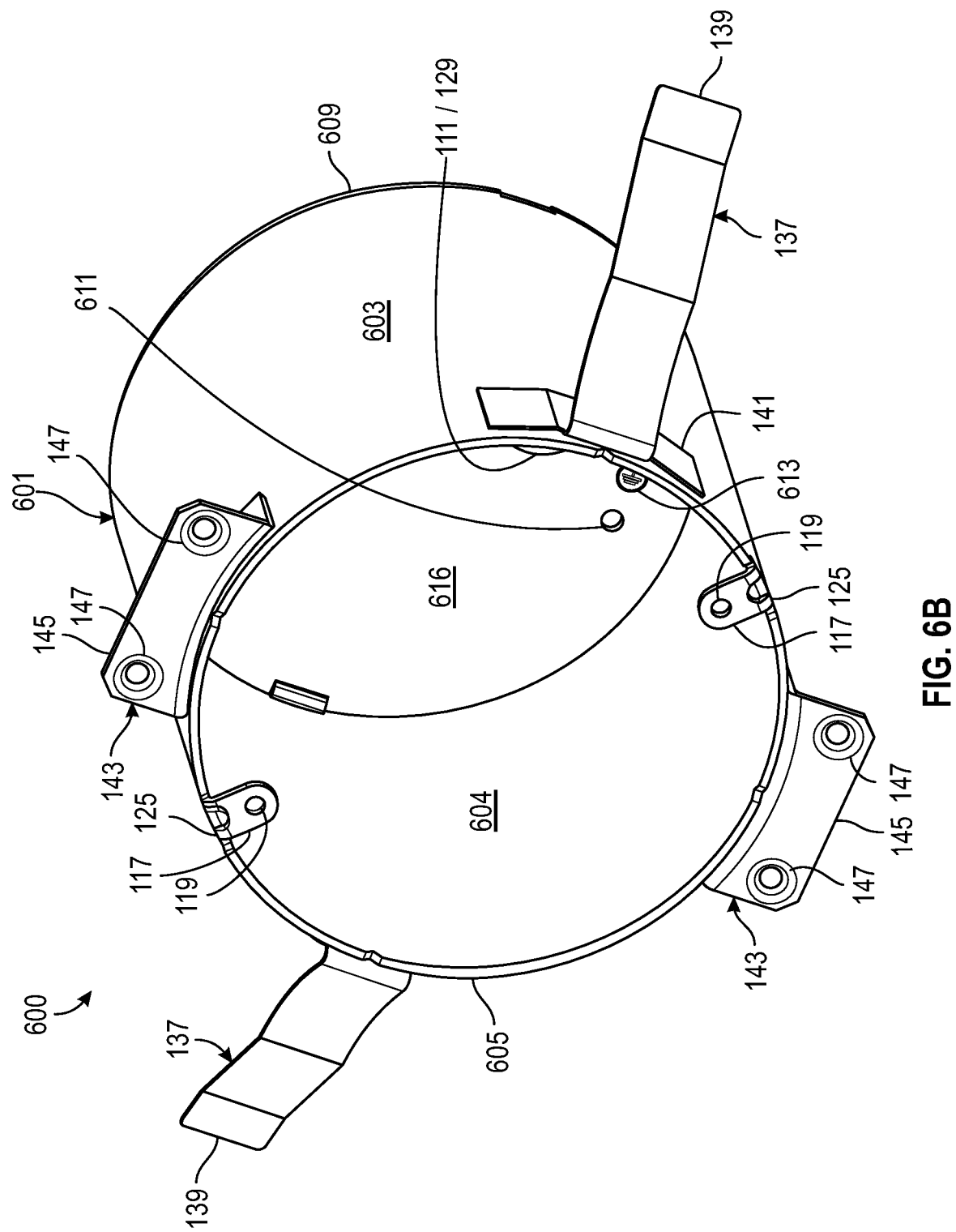

LIGHTING JUNCTION BOX

PRIORITY NOTICE

The present patent application is a continuation-in-part (CIP) of U.S. non-provisional patent application Ser. No. 17/505,563 filed on Oct. 19, 2021, and claims priority to said U.S. non-provisional patent application under 35 U.S.C. § 120. The above-identified patent application is incorporated herein by reference in its entirety as if fully set forth below.

The present patent application is a continuation-in-part (CIP) of U.S. non-provisional patent application Ser. No. 17/106,048 filed on Nov. 27, 2020, and claims priority to said U.S. non-provisional patent application under 35 U.S.C. § 120. The above-identified patent application is incorporated herein by reference in its entirety as if fully set forth below.

The present patent application is a continuation-in-part (CIP) of U.S. non-provisional patent application Ser. No. 16/790,345 filed on Feb. 13, 2020, and claims priority to said U.S. non-provisional patent application under 35 U.S.C. § 120. The above-identified patent application is incorporated herein by reference in its entirety as if fully set forth below.

TECHNICAL FIELD OF THE INVENTION

The present invention relates in general to junction boxes and more specifically to lighting junction boxes with additional structures that are configured for installing such lighting junction boxes into existing ceilings (e.g., for remodeling purposes).

COPYRIGHT AND TRADEMARK NOTICE

A portion of the disclosure of this patent application may contain material that is subject to copyright protection. The owner has no objection to the facsimile reproduction by any-one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

During remodeling applications (scenarios), such as with respect to changing and/or adding in lighting to a given room and/or to a given ceiling covered area, it is often desirable to provide lighting from the existing ceiling. At the very least, this often entails cutting a hole into the existing ceiling from a bottom surface of the existing ceiling, such that the newly formed hole in the existing ceiling may then receive a lighting junction box within that newly formed hole. Most existing ceiling mounted lighting junction boxes may only be installed in relative close proximity to some other supporting structures, aside from the ceiling (e.g., drywall) itself, such as ceiling joists and/or roof rafters. However, often there may be a need and/or desire to locate a ceiling light in an area of the given existing ceiling that is not in relative close proximity to such other supporting structures. And in those situations, it may be desirable to have a new/novel lighting junction box that may be installed and mounted directly to the ceiling itself and not to the other supporting structures.

Further, during the installation operations of such a new/novel lighting junction box into the existing ceiling, it may be desirable for that new/novel lighting junction box to have means to at least temporarily hold up that new/novel lighting junction box within the newly formed ceiling cutout, while more permanent/secure attachment operations are carried out to securely attach that new/novel lighting junction box to the existing ceiling.

There is a need in the art for such a new/novel lighting junction box that may be installed directly to the existing ceiling itself and that has means for at least temporarily holding up that new/novel lighting junction box within a newly formed ceiling cutout, while more permanent/secure attachment operations are carried out to securely attach that new/novel lighting junction box to the existing ceiling.

It would also be desirable to improve heat dissipation within a lighting junction box by utilizing a second junction box adjacent and connected to the lighting junction box, as this second junction box could house and offload at least some circuitry that would otherwise have to be housed within the lighting junction box if the second junction box was not present/included.

It is to these ends that the present invention has been developed.

BRIEF SUMMARY OF THE INVENTION

To minimize the limitations in the prior art, and to minimize other limitations that will be apparent upon reading and understanding the present specification, at least some embodiments of the present invention describes a lighting-junction-box-assembly-for-remodel (hereinafter, "assembly"). In some embodiments, the assembly may comprise: a lighting-junction-box, leg-springs attached to the lighting-junction-box, and mounting-tabs attached to the lighting-junction-box. In some embodiments, the leg-springs may be used to (temporarily) hold (by friction) the assembly within a hole in an existing ceiling, wherein that hole may be sized to fit the assembly (or a portion thereof) within the hole. This hole may be referred to as a largest-hole and/or as a cutout-for-junction-box. In some embodiments, while the leg-springs are (temporarily) holding the assembly within the hole (i.e., the largest-hole and/or the cutout-for-junction-box) in the existing ceiling, other/different holes (e.g., extension-portion holes) within extension-portions of the mounting-tabs are used to secure the entire assembly to the existing ceiling, via mechanical fasteners passing through the extension-portion holes and into the existing ceiling. An existing ceiling may be retrofitted with this assembly to have a lighting-junction-box where desired/needed in that existing ceiling; and as such, this assembly is particularly useful in remodeling situations (applications); however, the assembly may also be used in new construction. In some embodiments, the assembly may also comprise a second junction-box, that may be separate and distinct from the first junction-box of the lighting-junction-box. In some embodiments, this second junction-box may be used to offload and house at least some of the circuitry that would otherwise have been included within a lighting can. This may help with heat dissipation within the circuitry that remains within the lighting-junction-box, as this remaining circuitry now has more room within the lighting-junction-box; and in turn this better heat dissipation situation may help to prolong the operational lifespan of the remaining circuitry within the lighting-junction-box.

It is an objective of the present invention to provide a lighting-junction-box-assembly-for-remodel (assembly) that is configured for use in adding-in/installing such a lighting-junction-box-assembly-for-remodel into an existing ceiling.

It is another objective of the present invention to provide a lighting-junction-box-assembly-for-remodel (assembly) that is for use in remodeling applications (scenarios) where it may be desired to install a lighting junction box into an existing ceiling.

It is another objective of the present invention to provide a lighting-junction-box-assembly-for-remodel (assembly) that has a lighting-junction-box component and that has leg-springs attached to the lighting-junction-box component.

It is another objective of the present invention to provide a lighting-junction-box-assembly-for-remodel (assembly) that has a lighting-junction-box component and that has leg-springs attached to the lighting-junction-box component, wherein the leg-springs are configured to at least temporarily hold up the lighting-junction-box-assembly-for-remodel within a ceiling cutout.

It is another objective of the present invention to provide a lighting-junction-box-assembly-for-remodel (assembly) that has appropriate and/or desirable rating(s), such as, but not limited to, UL (Underwriters' Laboratories) ratings and/or IC (insulation contact) ratings.

It is another objective of the present invention to provide a lighting-junction-box-assembly-for-remodel (assembly) that has a lighting-junction-box component and that has mounting-tabs attached to the lighting-junction-box component.

It is another objective of the present invention to provide a lighting-junction-box-assembly-for-remodel (assembly) that has a lighting-junction-box component and that has mounting-tabs attached to the lighting-junction-box component, wherein the mounting-tabs are configured for permitting secure attachment of the entire lighting-junction-box-assembly-for-remodel to the existing ceiling.

It is another objective of the present invention to provide a lighting-junction-box-assembly-for-remodel (assembly) that has a lighting-junction-box component, that has leg-springs attached to the lighting-junction-box component, and that has mounting-tabs attached to the lighting-junction-box component.

It is another objective of the present invention to provide a lighting-junction-box-assembly-for-remodel (assembly) that has a lighting-junction-box component, that has leg-springs attached to the lighting-junction-box component, and that has mounting-tabs attached to the lighting-junction-box component; wherein the leg-springs are configured to at least temporarily hold up the lighting-junction-box-assembly-for-remodel within a ceiling cutout; and wherein the mounting-tabs are configured for permitting secure attachment of the entire lighting-junction-box-assembly-for-remodel to the existing ceiling.

It is another objective of the present invention to provide a template for providing assistance in forming appropriately sized and located cutouts and/or holes within the existing ceiling.

It is another objective of the present invention to provide a template for providing assistance in forming appropriately sized and located cutouts and/or holes within the existing ceiling, wherein the template may be (removably and/or temporarily) attached to a bottom surface of the existing ceiling.

It is another objective of the present invention to provide a kit that has both a lighting-junction-box-assembly-for-remodel (assembly) and a template providing assistance in forming appropriately sized and located cutouts and/or holes within the existing ceiling.

It is another objective of the present invention to provide a kit that has a lighting-junction-box-assembly-for-remodel (assembly), a template providing assistance in forming appropriately sized and located cutouts and/or holes within the existing ceiling, and drywall-anchors.

It is another objective of the present invention to provide a kit that has a lighting-junction-box-assembly-for-remodel (assembly), a template providing assistance in forming appropriately sized and located cutouts and/or holes within the existing ceiling, drywall-anchors, and mechanical fasteners (such as, but not limited to, screws) for use in securing the lighting-junction-box-assembly-for-remodel to the existing ceiling.

It is another objective of the present invention to provide a method of retrofitting an existing ceiling with a lighting-junction-box-assembly-for-remodel (assembly) installed within that existing ceiling.

It is another objective of the present invention to provide a lighting-junction-box with (an entirely) cylindrical sidewall.

It is another objective of the present invention to provide a second junction-box to be used with the lighting-junction-box.

It is another objective of the present invention to provide a second junction-box to be used with the lighting-junction-box, wherein the second junction-box is configured to house at least some circuitry that would otherwise have been included within the lighting-junction-box had the second junction-box not been present.

It is yet another objective of the present invention to improve heat dissipation within the lighting-junction-box by utilizing a second junction-box adjacent and connected to the lighting-junction-box.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 6B depicts the lighting-junction-box-assembly-for-remodel of FIG. 6A shown from a bottom-up perspective view.

Figure 1A:
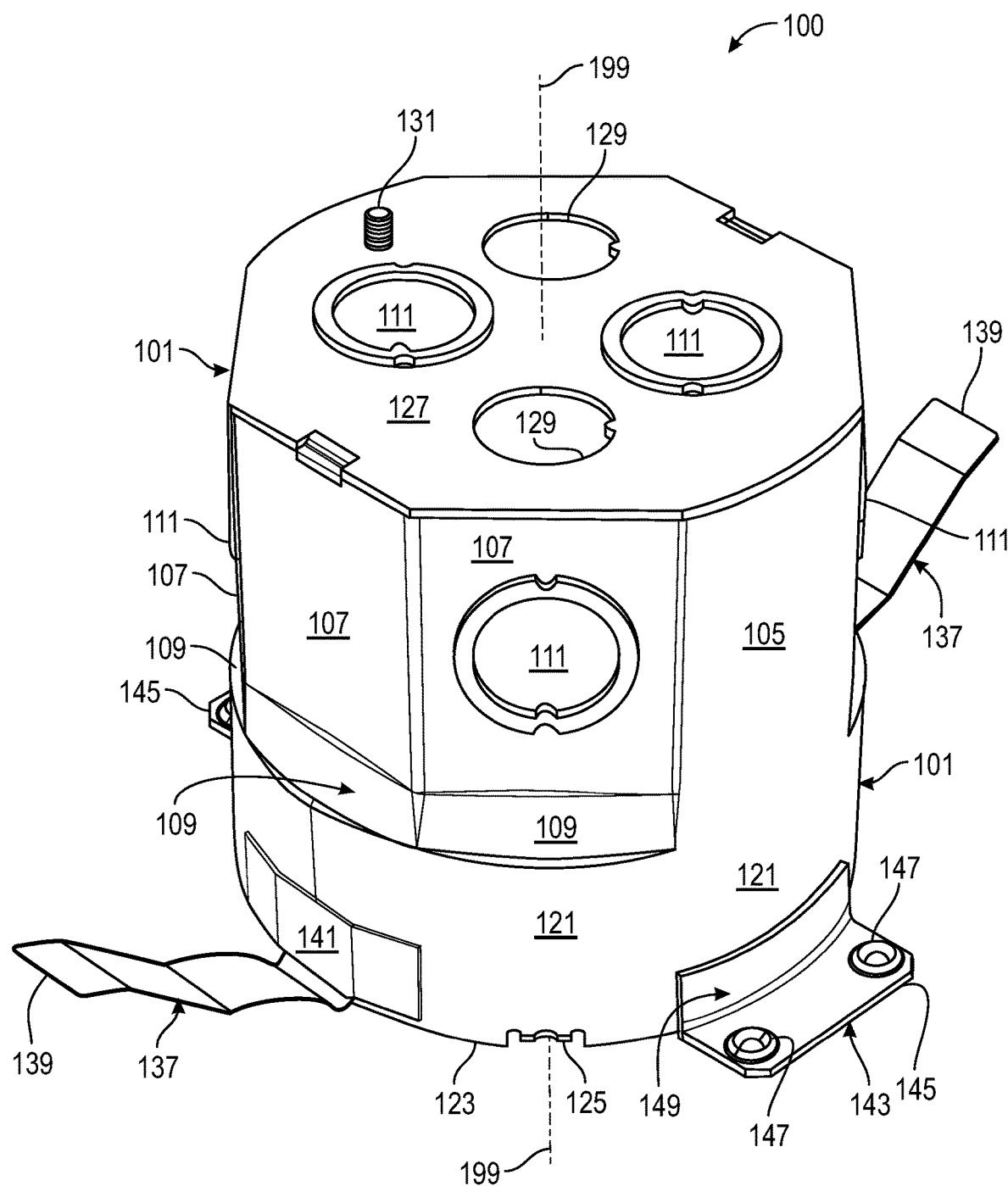
FIG. 1A depicts a top perspective view of a lighting-junction-box-assembly-for-remodel.

REFERENCE NUMERAL SCHEDULE 100 lighting-junction-box-assembly-for-remodel (assembly) 100
101 lighting-junction-box 101
103 upper-portion 103
105 curved-segment(s) 105
107 planar-face(s) 107
109 sloped-indentation(s) 109
111 knock-out(s) 111
113 internal-curved-portion 113
115 internal-planar-portion 115
117 internal-tab 117
119 hole 119
121 lower-portion 121
123 bottom-circular-edge 123
125 notch 125
127 lid 127
129 hole-for-conduit(s) 129
131 screw/bolt 131
133 internal-side 133
135 cavity 135
137 spring(s) 137
139 elongate-leg-portion 139
141 complementary-mounting-portion 141
143 mounting-tab(s) 143
145 extension-portion 145
147 hole(s) (extension-portion hole(s)) 147
149 complementary-mounting-portion 149
151 outside-transverse-width 151
153 outside-diameter 153
155 angle-between-connected-planar-faces 155
157 angle-between-planar-face-and-connected-curved-segment 157
199 axial-centerline 199
201 top 201
300 (existing) ceiling 300
301 cutout-for-junction-box (largest-hole) 301
303 hole-for-mounting-tab-and-anchor (smaller-hole(s)) 303
400 template 400
401 template-for-cutout-for-junction-box (single-largest-circle) 401
403 template-for-hole-for-mounting-plate-and-anchor (smaller-circles) 403
500 method of retrofitting existing ceiling with lighting junction box 500
501 step of attaching template to bottom surface of existing ceiling 501
503 step of cutting "cutout-for-junction-box" 503
505 step of drilling holes for drywall-anchors and/or for mechanical fasteners into ceiling 505
507 step of inserting drywall-anchors into drilled out holes in ceiling 507
509 step of squeezing elongate-leg-portions towards side-walls of lighting-junction-box 509
511 step of inserting lighting-junction-box into "cutout-for-junction-box" in ceiling 511
513 step of securing mechanical fasteners to extension-portion holes & into ceiling holes 513
600 lighting-junction-box-assembly-for-remodel 600
601 lighting-junction-box 601
603 sidewall 603
604 inside-of-sidewall 604
605 bottom 605
607 top 607
609 lid 609
611 aperture 611
613 symbol-for-ground 613
615 top 615
616 bottom 616
621 variable-angle 621
700 overall-assembly 700
701 junction-box 701
711 conduit 711
712 bolt/screw 712

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Figure 1B:
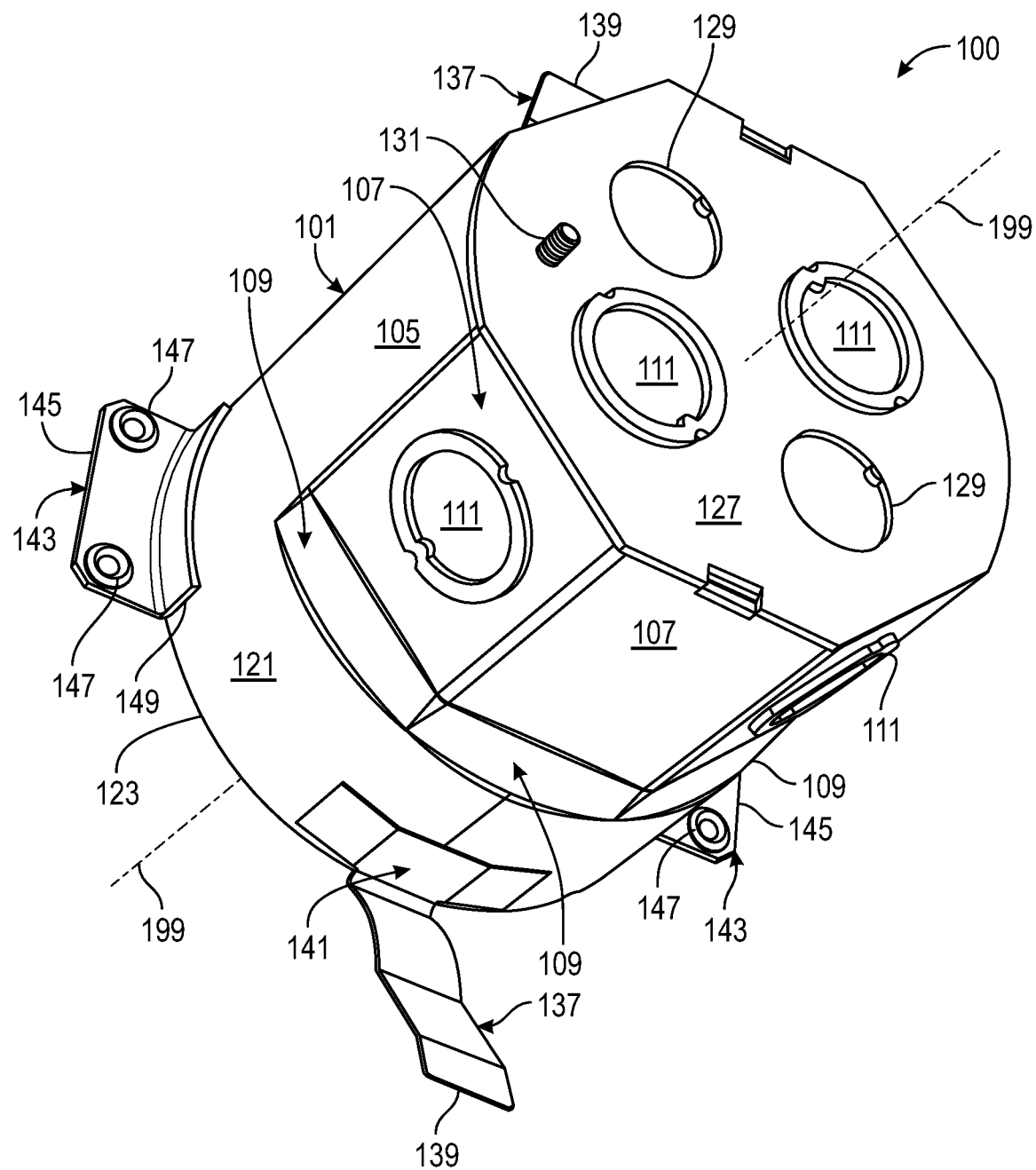
FIG. 1B depicts another top perspective view (i.e., a different view from FIG. 1A) of the lighting-junction-box-assembly-for-remodel of FIG. 1A.
Figure 1C:
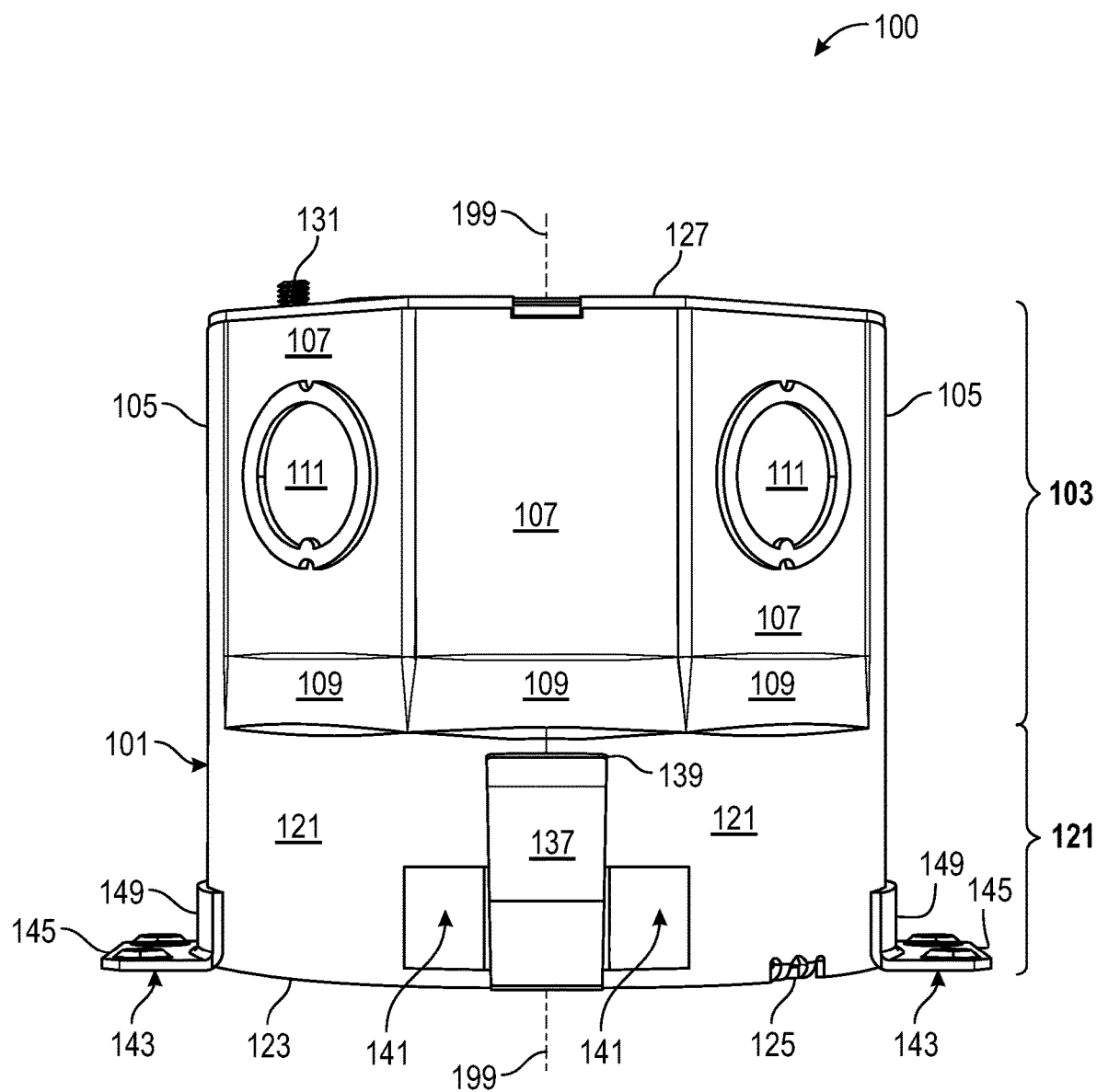
FIG. 1C depicts a front view of the lighting-junction-box-assembly-for-remodel of FIG. 1A.
Figure 1D:
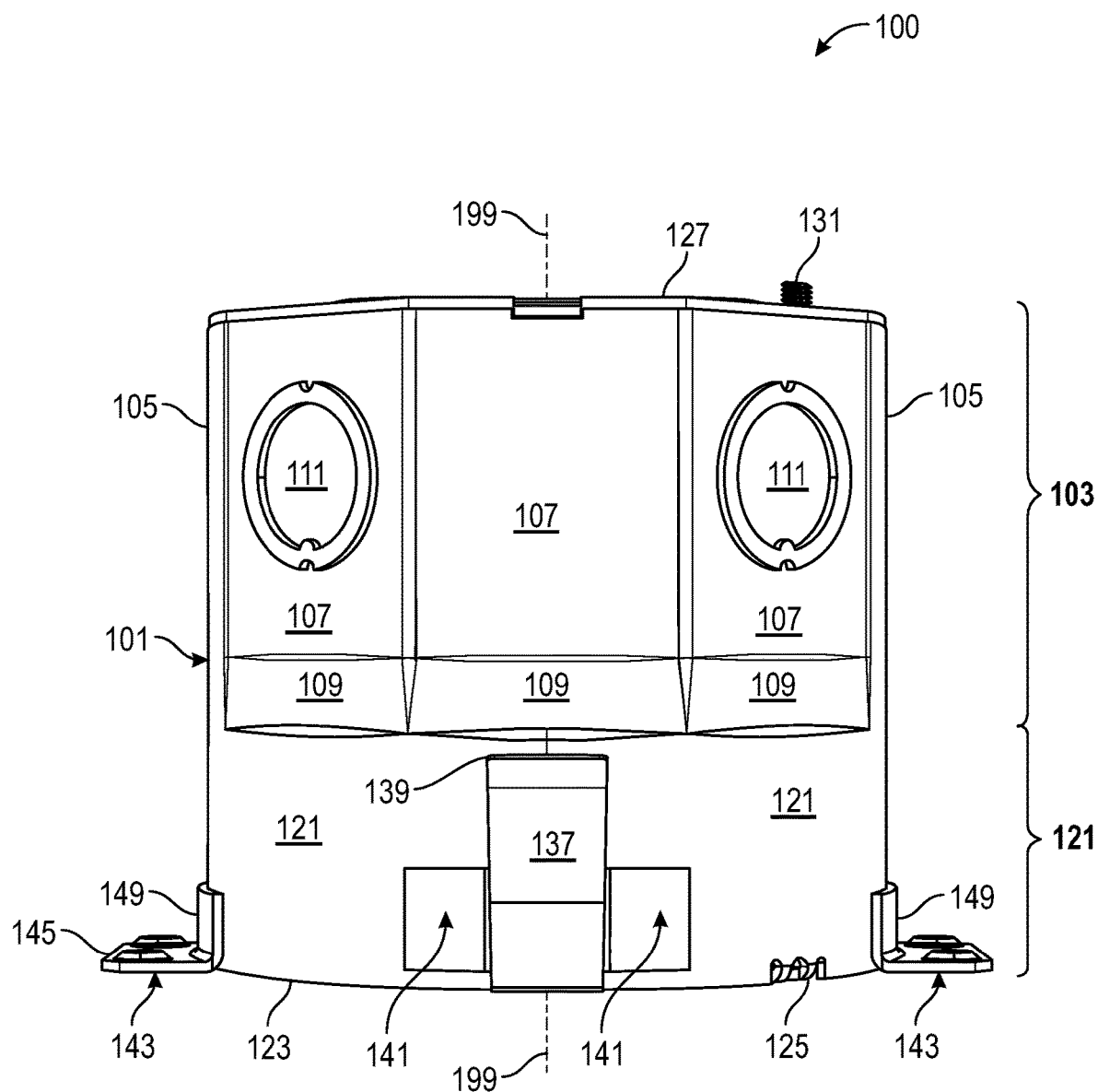
FIG. 1D depicts a rear (back) view of the lighting-junction-box-assembly-for-remodel of FIG. 1A.
Figure 1E:
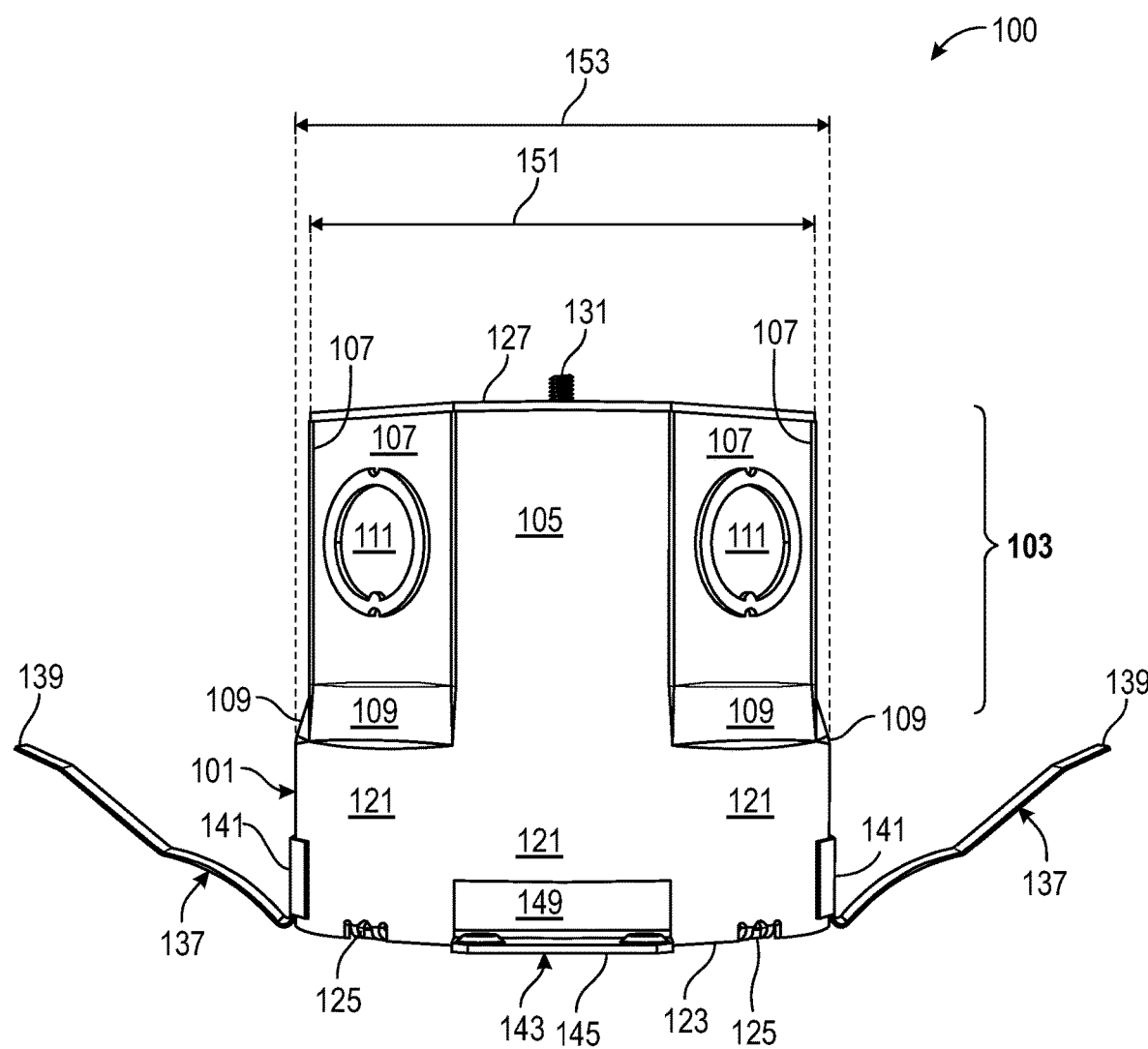
FIG. 1E depicts a left-side view of the lighting-junction-box-assembly-for-remodel of FIG. 1A.
Figure 1F:
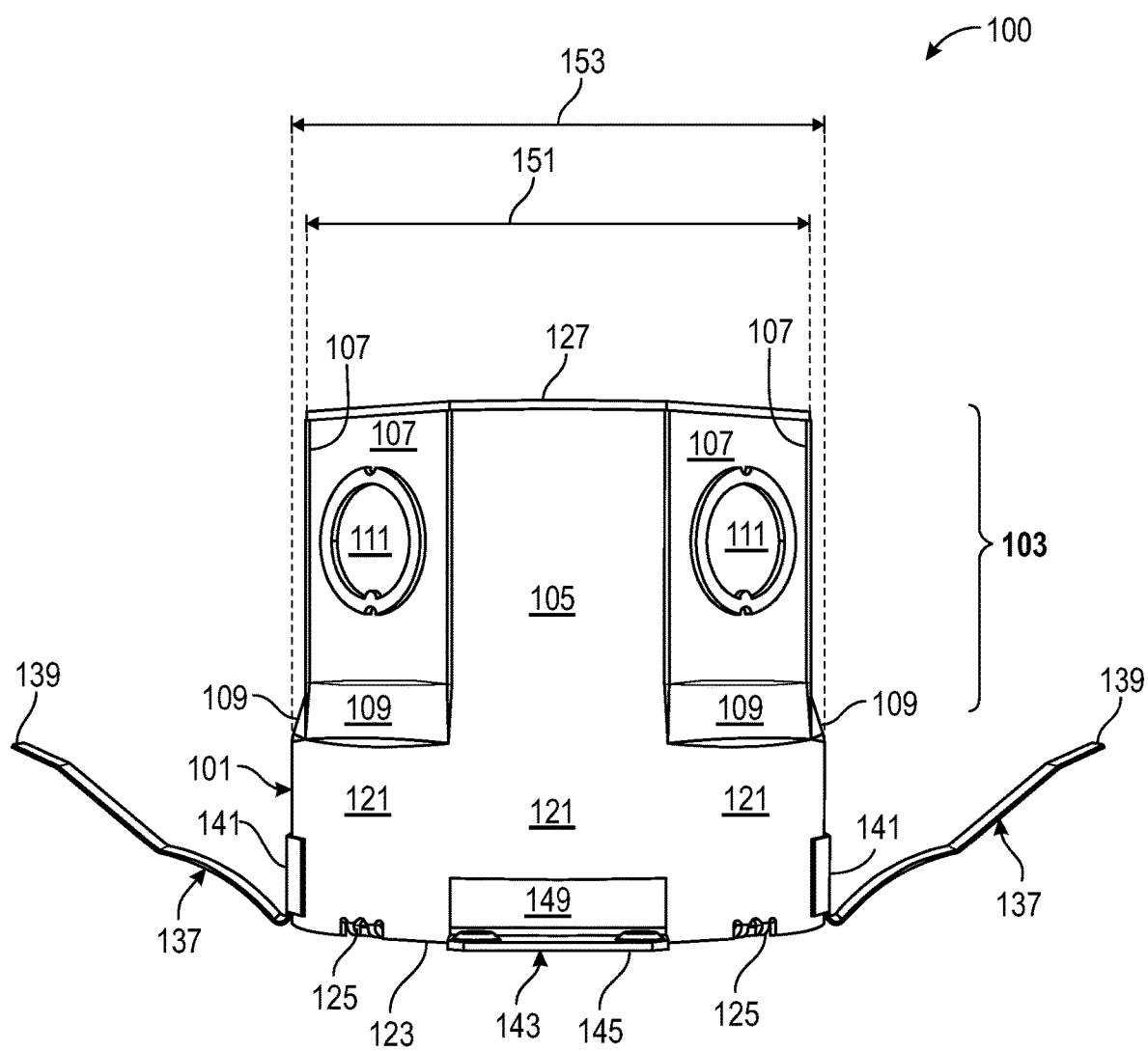
FIG. 1F depicts a right-side view of the lighting-junction-box-assembly-for-remodel of FIG. 1A.
Figure 1G:
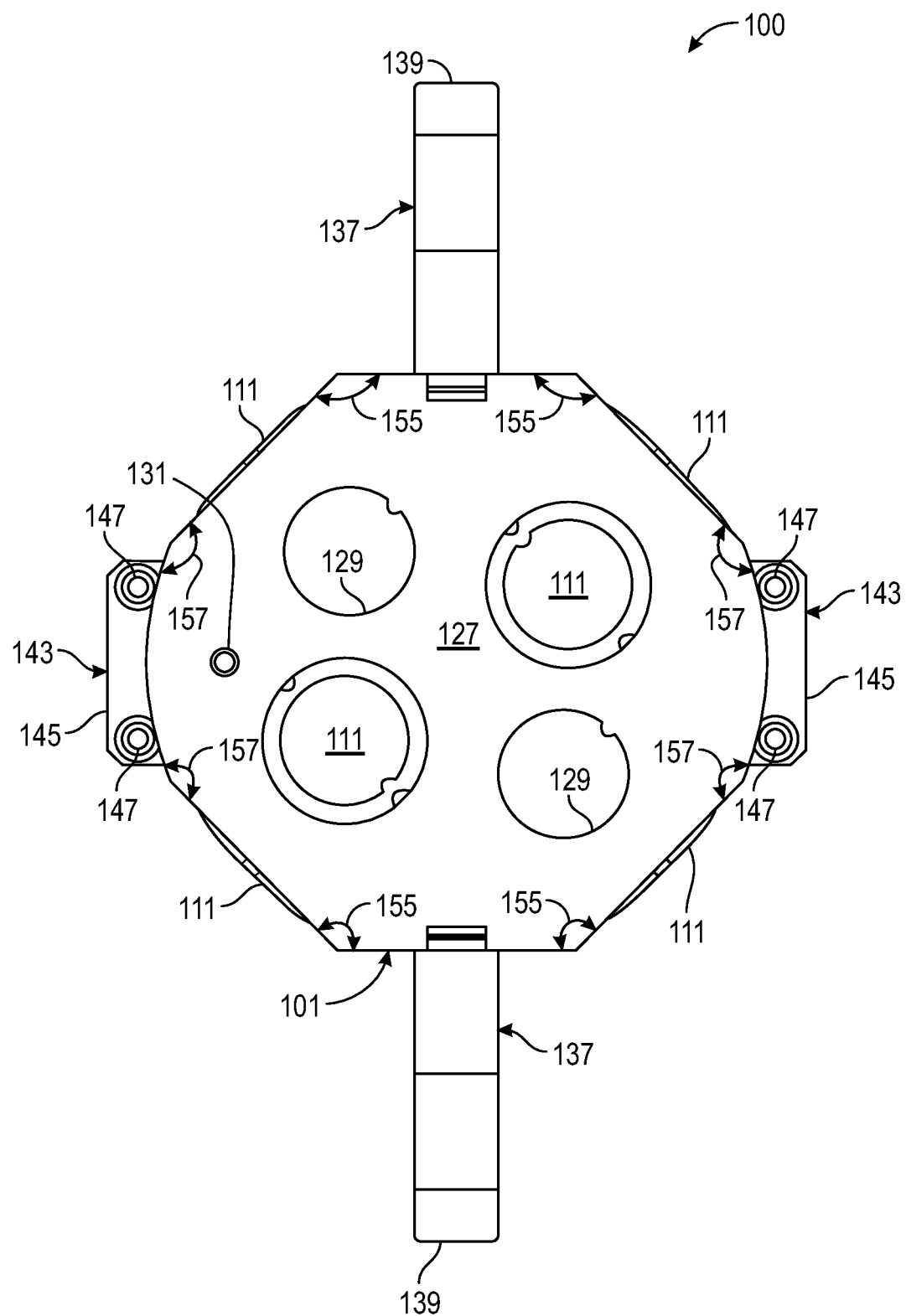
FIG. 1G depicts a top view of the lighting-junction-box-assembly-for-remodel of FIG. 1A.
Figure 1H:
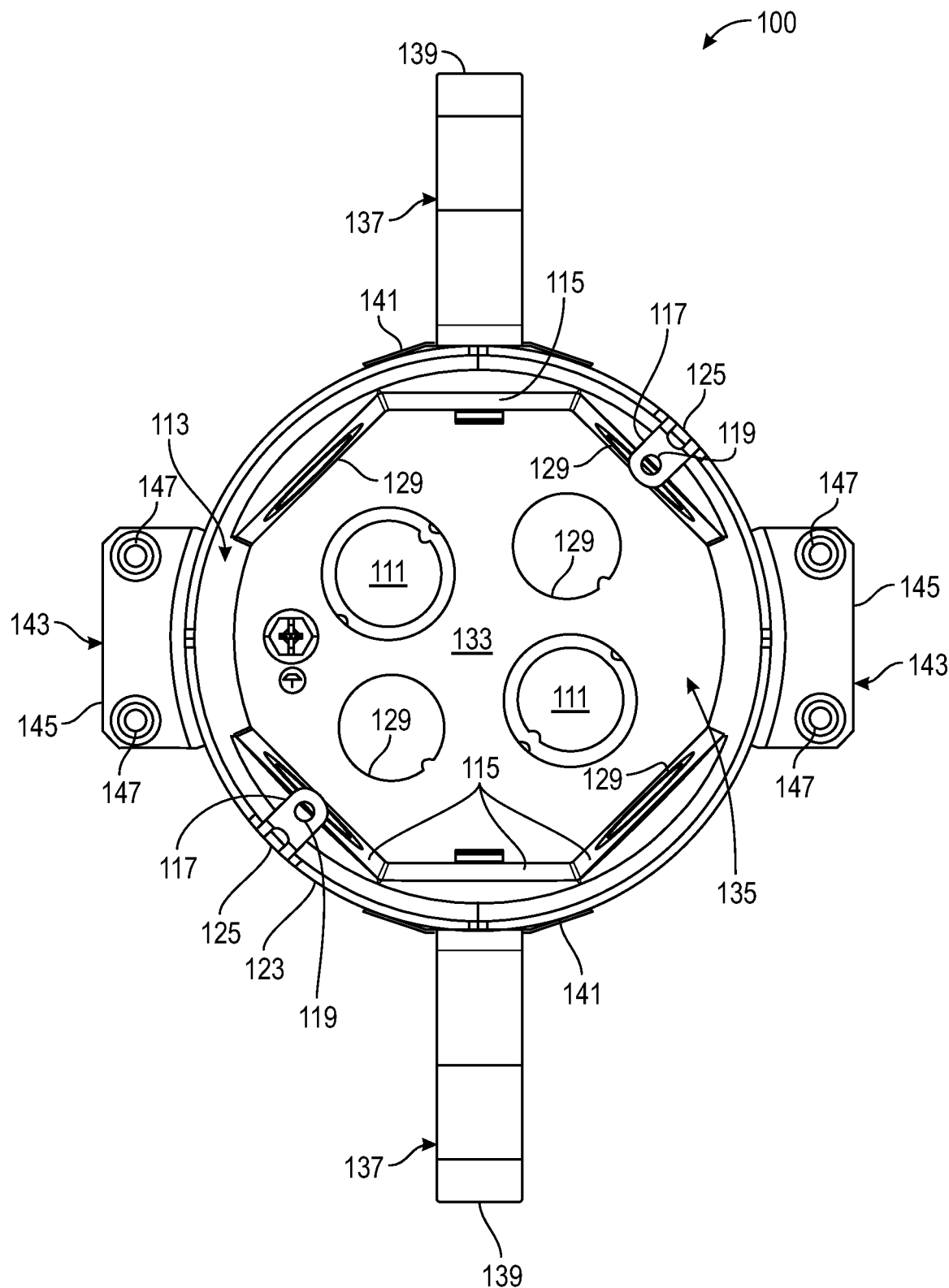
FIG. 1H depicts a bottom view of the lighting-junction-box-assembly-for-remodel of FIG. 1A.
Figure 1I:
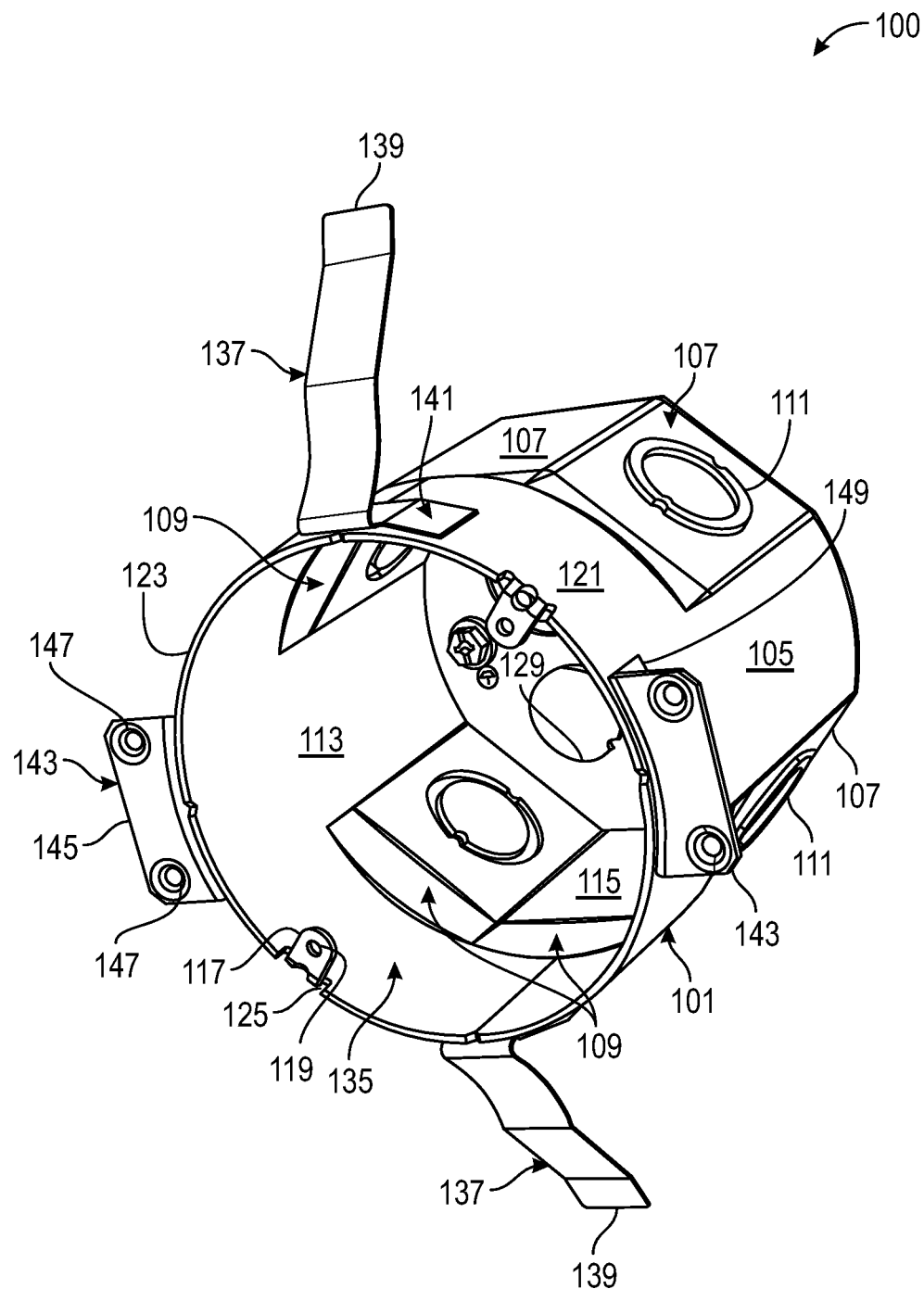
FIG. 1I depicts a bottom perspective view of the lighting-junction-box-assembly-for-remodel of FIG. 1A.
Figure 1J:
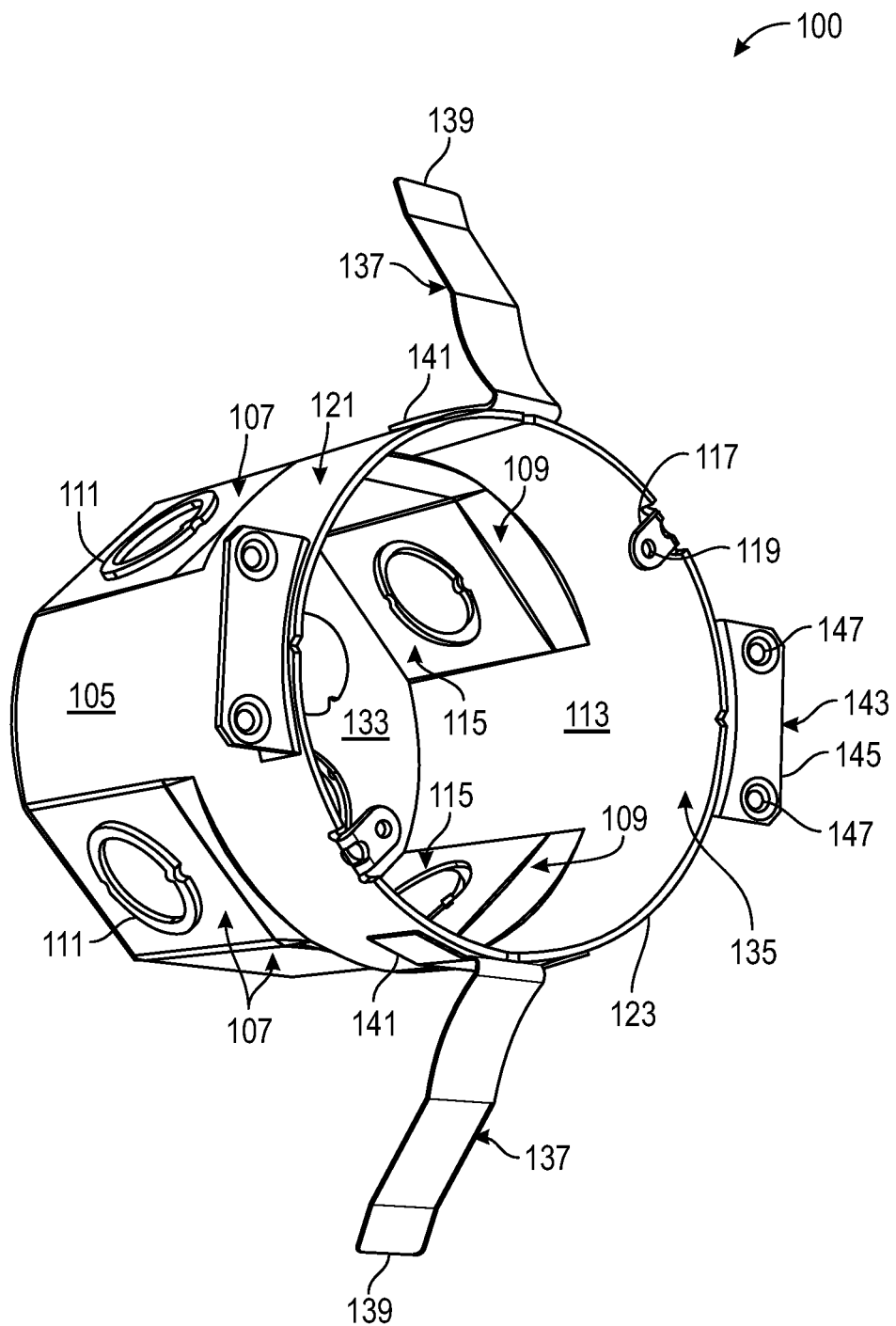
FIG. 1J depicts another bottom perspective view (i.e., a different view from FIG. 1I) of the lighting-junction-box-assembly-for-remodel of FIG. 1A.

FIG. 1A depicts a top perspective view of a lighting-junction-box-assembly-for-remodel 100 (hereinafter, "assembly 100"). FIG. 1B depicts another top perspective view (i.e., a different view from FIG. 1A) of assembly 100. FIG. 1C depicts a front view of assembly 100. FIG. 1D depicts a rear (back) view of assembly 100. FIG. 1E depicts a left-side view of assembly 100. FIG. 1F depicts a right-side view of assembly 100. FIG. 1G depicts a top view of assembly 100. FIG. 1H depicts a bottom view of assembly 100. FIG. 1I depicts a bottom perspective view of assembly 100. FIG. 1J depicts another bottom perspective view (i.e., a different view from FIG. 1I) of assembly 100.

Note, FIG. 6A to FIG. 7D show another/different embodiment of a lighting-junction-box-assembly-for-remodel distinguished by use of reference numeral 600 as opposed to 100.

In some embodiments, assembly 100 may be similar to "assembly 100" of U.S. patent application Ser. No. 17/106,048, filed Nov. 20, 2020, by the same inventor as the present patent application; except that the present assembly 100 may not include "adjusting-plates 600" nor guide-rail(s) 500" from U.S. patent application Ser. No. 17/106,048. In some embodiments, lighting-junction-box 101 may be substantially (mostly) similar to "junction-box 300" of U.S. patent application Ser. No. 17/106,048, filed Nov. 20, 2020, by the same inventor as the present patent application. Note, U.S. patent application Ser. No. 17/106,048, filed Nov. 20, 2020, is incorporated by reference as if fully set forth herein.

In some embodiments, assembly 100 may comprise at least one lighting-junction-box 101, at least one spring 137 attached to the at least one lighting-junction-box 101, and at least one mounting-tab 143 also attached to the at least one lighting-junction-box 101. In some embodiments, assembly 100 may comprise at least one lighting-junction-box 101, at least two springs 137 attached to the at least one lighting-junction-box 101, and at least two mounting-tabs 143 also attached to the at least one lighting-junction-box 101. See e.g., FIG. 1A to FIG. 1J.

In some embodiments, assembly 100 and/or lighting-junction-box 101 may have a fixed, finite, and predetermined total height (e.g., from bottom-circular-edge 123 to a top of lid 127). In some embodiments, assembly 100 and/or lighting-junction-box 101 may have a total height of four (4) inches (e.g., from bottom-circular-edge 123 to a top of lid 127). In some embodiments, assembly 100, lower-portion 121, and opposing curved-segments 105 may have a fixed, finite, and predetermined outside-diameter 153. In some embodiments, assembly 100, lower-portion 121, and opposing curved-segments 105 may have an outside-diameter 153 of four and one-eighth (4⅛) inches. In some embodiments, assembly 100, may have a maximum transverse-width from opposing distal ends of elongate-leg-portions 139 (when springs 137 are in their relaxed default configuration and not being squeezed) that is predetermined. In some embodiments, assembly 100, may have a maximum transverse-width from opposing distal ends of elongate-leg-portions 139 (when springs 137 are in their relaxed default configuration and not being squeezed) of seven and five-eights (7⅝) inches. Note, in other embodiments, assembly 100, lighting-junction-box 101, and/or portions thereof may have other predetermined dimensions. See e.g., FIG. 1C to FIG. 1F.

In some embodiments, lighting-junction-box-assembly 100 (assembly 100) may be configured for installation into a ceiling (e.g., an existing ceiling 300). In some embodiments, assembly 100 may comprise lighting-junction-box 101, at least two springs 137, and at least two mounting-tabs 143. In some embodiments, lighting-junction-box 101 may be configured for at least housing a portion of a lighting module within a cavity 135 of lighting-junction-box 101. In some embodiments, at least two springs 137 may be attached to lighting-junction-box 101. In some embodiments, each of at least two springs 137 may have a distal end that points away from sidewalls of lighting-junction-box 101, but wherein the distal end does at least partially point upwards from a bottom 123 of lighting-junction-box 101 towards a top 201 of lighting-junction-box 101. In some embodiments, each of at least two springs 137 may be configured to frictionally engage interior sides of a hole (e.g., cutout 301) within ceiling 300, wherein that hole (e.g., cutout 301) may be sized to fit at least most of lighting-junction-box 101 within an inside diameter of that hole (e.g., cutout 301). In some embodiments, at least two mounting-tabs 143 may be attached to lighting-junction-box 101. In some embodiments, each of at least two mounting-tabs 143 may have an extension-portion 145 that points away from sidewalls of lighting-junction-box 101. In some embodiments, each of at least two mounting-tabs 143 may be configured for facilitating attachment to ceiling 300. In some embodiments, the distal ends of at least two springs 137 and extension-portions 145 of at least two mounting-tabs 143 may all point in different directions from each other. See e.g., FIG. 1A to FIG. 3.

In some embodiments, lighting-junction-box 101 may comprise upper-portion 103, lower-portion 121, and lid 127. See e.g., FIG. 1C. When lid 127 may be attached to top 201 of upper-portion 103, upper-portion 103 and lower-portion 121 may form a hollow elongate structure (that is closed at top 201 and that is open at a bottom 123), with (sidewall) portions that are substantially (mostly) similar to a hollow right cylinder. See e.g., FIG. 1A through FIG. 1J. In some embodiments, lighting-junction-box 101 may be free from (without) any external annular to mostly annular flange(s). In some embodiments, this hollow interior space of lighting-junction-box 101 may be designated herein as cavity 135. In some embodiments, lighting-junction-box 101 may comprise cavity 135. In some embodiments, cavity 135 of lighting-junction-box 101 may be configured to receive one or more of: lighting modules, lighting elements, lights, LED(s) (light emitting diode(s)), lens, reflector(s), driver(s), control-ler(s), dimmer(s), electronics, circuits, portions thereof, combinations thereof, and/or the like. See e.g., FIG. 1H, FIG. 1I, and FIG. 1J for cavity 135. In some embodiments, cavity 135 may be (substantially [mostly]) bound of sides of cavity 135 by upper-portion 103 and lower-portion 121. In some embodiments, sidewall(s) of cavity 135 may be (substantially [mostly]) formed form upper-portion 103 and lower-portion 121. See e.g., FIG. 1I and FIG. 1J. In some embodiments, cavity 135 may be (substantially [mostly]) bound (closed) of on a top of cavity 135 by lid 127. See e.g., FIG. 1A. In some embodiments, cavity 135 may be (substantially [mostly]) open at bottom 123. See e.g., FIG. 1H, FIG. 1I, and FIG. 1J.

In some embodiments, lighting-junction-box 101 may comprise a lid 127 and sidewalls. In some embodiments, lid 127 and the sidewalls may at least mostly circumscribe cavity 135 around all boundaries of cavity 135 except at bottom 123 of lighting-junction-box 101. In some embodiments, wherein lid 127 and the sidewalls may be at least mostly solid closed structures (e.g., lid 127 and/or upper-portion 103 sidewalls may have hole-for-conduit(s) 129 and some hole-for-conduit(s) 129 may or may not be covered with knock-out(s) 111). In some embodiments, bottom 123 of lighting-junction-box 101 may be at least mostly (substantially) open providing access to cavity 135. See e.g., FIG. 1A to FIG. 3.

Note, for reference purposes lighting-junction-box 101 may have an axial-centerline 199 that runs through a center of lighting-junction-box 101 from bottom-circular-edge 123 to top 201/lid 127 of lighting-junction-box 101. See e.g., FIG. 1A to FIG. 1D. For example, and without limiting the scope of the present invention, if assembly 100 was installed within a ceiling 300, and a bottom surface of that existing ceiling 300 was at least mostly (substantially) horizontal (e.g., at least mostly parallel with a below floor's surface), then axial-centerline 199 may be in at least a mostly (substantially) vertical configuration with respect to the at least mostly (substantially) horizontal bottom surface of that existing ceiling 300.

Note, upper-portion 103 may be first called out in FIG. 1C (and also called out in FIGS. 1D to 1F). FIG. 1A, FIG. 1B, FIG. 1I, and FIG. 1J also show at least portions of up-per-portion 103 (but upper-portion 103 is not called out in FIG. 1A, FIG. 1B, FIG. 1I, and FIG. 1J). At least portions of lower-portion 121 may be shown (and called out) in FIG. 1A through FIG. 1F, and in FIG. 1H through FIG. 1J. In some embodiments, lighting-junction-box 101 may comprise an upper-portion 103 and an attached/integral lower-portion 121 (and lid 127 in some embodiments). In some embodiments, upper-portion 103 may be attached to lower-portion 121. In some embodiments, a bottom of upper-portion 103 may be attached to a top of lower-portion 121. In some embodiments, upper-portion 103 and lower-portion 121 may be integral with respect to each other. In some embodiments, upper-portion 103 and low-er-portion 121 may be made from a single article of manufacture. In some embodiments, up-per-portion 103 may transition into lower-portion 121. In some embodiments, upper-portion 103 may transition smoothly and/or seamlessly into lower-portion 121. In some embodiments, upper-portion 103 may transition substantially (mostly) smoothly and/or substantially (mostly) seamlessly into lower-portion 121. See e.g., FIG. 1A through FIG. 1F and see FIG. 1I and FIG. 1J. In some embodiments, a height of upper-portion 103 may be taller than a height of lower-portion 121. In some embodiments, a height of upper-portion 103 may be from 1.7 to 2.2 times taller than a height of lower-portion 121. See e.g., FIG. 1C through FIG. 1F.

In some embodiments, upper-portion 103 may comprise the upper sidewalls of lighting-junction-box 101 and lower-portion 121 may comprise the lower sidewalls of lighting-junction-box 101. In some embodiments, the upper sidewalls of lighting-junction-box 101 may have two different types of sidewalls, namely, curved-segment(s) 105 and planar-face(s) 107. In some embodiments, upper-portion 103 may comprise curved-segment(s) 105 and pla-nar-face(s) 107. In some embodiments, curved-segment(s) 105 may be a section (or sections) of sidewall of upper-portion 103 that is curved (with a similar to or same curvature as that of lower-portion 121); whereas, planar-face(s) 107 may be a section (or sections) of sidewall of upper-portion 103 that is at least substantially (mostly) flat and/or planar (and not curved). In some embodiments, a main planar surface of planar-face 107, may run in a bottom to top direction (or top to bottom direction) and may be at least mostly (substantially) parallel with axial-centerline 199. See e.g., FIG. 1A.

In some embodiments, a radius of curvature of curved-segment(s) 105 may be the same (or at least mostly the same) as a radius of curvature of the sidewall(s) of lower-portion 121. In some embodiments, a transition from a given curved-segment 105 to a portion of low-er-portion 121 that is directly below that given curved-segment 105 may be seamless and/or smooth. In some embodiments, a given curved-segment 105 and a portion of lower-portion 121 that is directly below that given curved-segment 105 may be integral with respect to each other and/or of a single article of manufacture. See e.g., FIG. 1A.

In some embodiments, a transition from a given planar-face 107 to a portion of lower-portion 121 that is directly below that given planar-face 107 may involve an intermediary structure, termed a sloped-indentation 109. In some embodiments, lighting-junction-box 101 and/or upper-portion 103 may comprise one or more sloped-indentation(s) 109. In some embodiments, between a bottom of each planar-face 107 and a top of the lower-portion 121 that is directly below that given planar-face 107, there may be at least one sloped-indentation 109 that physically/operatively links that given planar-face 107 to that particular section of lower-portion 121. In some embodiments, a given sloped-indentation 109, may be a transition structure, that transitions a bottom of a given planar-face 107 into a top of a section of lower-portion 121 that is directly below that given planar-face 107. See e.g., FIG. 1A. In some embodiments, a top of a given (first) sloped-indentation 109 may have a transverse-width (e.g., outside-transverse-width 151) to a top of an opposing (second) sloped-indentation 109 that is the same or mostly the same as a transverse-width (e.g., outside-transverse-width 151) between opposing planar-faces 107 that are located directly above those two sloped-indentations 109; whereas, a bottom of that given (first) sloped-indentation 109 may have an outside diameter (e.g., outside-diameter 153) to a bottom of an opposing (second) sloped-indentation 109 that is the same or mostly the same as an outside diameter (e.g., outside-diameter 153) between opposing sections of lower-portion 121 that are directly below those two sloped-indentations 109. See e.g., FIG. 1E and/or FIG. 1F.

In some embodiments, outside-transverse-width 151 may be an outside transverse-width between opposing planar-faces 107; and/or outside-transverse-width 151 may be an outside transverse-width between tops of opposing sloped-indentations 109. In some embodiments, outside-diameter 153 may be an outside diameter between opposing sections of lower-portion 121; and/or outside-diameter 153 may be an outside diameter between bottoms of opposing sloped-indentations 109. In some embodiments, outside-diameter 153 may be larger (longer) than outside-transverse-width 151. See e.g., FIG. 1E and/or FIG. 1F.

In some embodiments, a given slope-indentation 109 may begin at its top being substantially flat and/or planar and may smoothly transition into a curved portion at its bottom. See e.g., FIG. 1A and FIG. 1E.

In some embodiments, upper-portion 103 may have a quantity of six (6) planar-faces 107 and a quantity of two (2) curved-segments 105. In some embodiments, the six (6) planar-faces 107 may be arranged in two separate/distinct groups of three (3) planar-faces 107, with one of the two (2) curved-segments 105 being located in between each of the two groups of three (3) planar-faces 107. In some embodiments, the six (6) planar-faces 107 and the two (2) curved-segments 105 may be arranged in a closed ring structure of upper-portion 101 sidewalls when viewed from the top. In some embodiments, a first planar-face 107 may be attached to a second planar-face 107; the second planar-face 107 may be attached to a third planar-face 107 (forming a first group of connected planar-faces 107); the third planar-face 107 may be attached to a first curved-segment 105; the first curved-segment 105 may be attached to a fourth planar-face 107; the fourth planar-face 107 may be attached to a fifth planar-face 107; the fifth planar-face 107 may be attached to a sixth (and final) planar-face 107 (forming a second group of connected planar-faces 107); the sixth (and final) planar-face 107 may be attached to a second (and final) curved-segment 105; and the second (and final) curved-segment 105 may be attached to the first planar-face 107—forming a closed ring structure (of sidewalls) when viewed from above. In some embodiments, when viewed from above, the first group of connected planar-faces 107 and the second group of connected planar-faces 107 may each form half of a hexagon or hexagon like structure; wherein those two half hexagon or hexagon like structures are joined together by the two opposing curved-segments 105 (i.e., the first curved-segment 105 and the second curved-segment 105). In some embodiments, there may be a fixed and no-variable angle-between-connected-planar-faces 155 (angle 155). In some embodiments, angle 155 may be between first and second planar-faces 107, between second and third planar-faces 107 (i.e., the first group of connected planar-faces 107); between fourth and fifth planar-faces 107, and between fifth and sixth planar-faces 107 (i.e., the second group of connected planar-faces 107). In some embodiments, there may be a fixed and no-variable angle-between-planar-face-and-connected-curved-segment 157 (angle 157). In some embodiments, angle 157 may be between third planar-face 107 and first curved-segment 105, between first curved-segment 105 and fourth planar-face 107; between sixth planar-face 107 and second curved-segment 105; and between second curved-segment 105 and first planar-face 107. In some embodiments, there may be four (4) angles 155; and four (4) angles 157; such that the closed ring like structure of upper-portion 103 approximates a look of an octagon when viewed from the top, except that the two (2) opposing curved-segments 105 are curved and not flat/planar. In some embodiments, angle 157 may be larger than angle 155. See e.g., FIG. 1G, FIG. 1A, FIG. 1B, FIG. 1I, and FIG. 1J.

In some embodiments, all planar-surfaces 107 of a given upper-portion 103, may have a same: transverse-width, length/height, and/or thickness. See e.g., FIG. 1C to FIG. 1G. In some embodiments, all planar-surfaces 107 of a given upper-portion 103, may be more flat and planar than curved/rounded. In some embodiments, all planar-surfaces 107 of a given upper-portion 103, may be substantially (mostly) without a curved surface and/or a radiused surface. In some embodiments, all planar-surfaces 107 of a given upper-portion 103, may be shorter than an overall/total length/height of assembly 100/lighting-junction-box 101. See e.g., FIG. 1C to FIG. 1G.

In some embodiments, at least one of planar-face(s) 107 may comprise one or more of: knock-out(s) 111 and/or hole-for-conduit(s) 129. In some embodiments, four (4) of the six (6) planar-face 107 may comprise one or more of: knock-out(s) 111 and/or hole-for-conduit(s) 129. In some embodiments, hole-for-conduit 129 may be a through hole passing entirely through a section/portion of a given planar-face 107. In some embodiments, hole-for-conduit 129 may be configured to permit passage of a portion of conduit, cable, wire, portions thereof, combinations thereof, and/or the like. In some embodiments, a given hole-for-conduit 129 may be partially to totally covered (initially) by a knock-out 111. In some embodiments, a given knock-out 111 may be initially/temporarily cover over at least a portion of a given hole-for-conduit 129, until that given knock-out 111 may be removed (i.e., knocked-out). In some embodiments, a given knock-out 111 may be a disc (disk) like member. In some embodiments, a given hole-for-conduit 129 may be uncovered by a knock-out 111. See e.g., FIG. 1A through FIG. 1F and/or see FIG. 1I and FIG. 1J. In some embodiments, knock-out(s) 111 and/or hole-for-conduit(s) 129 may also be present in lid 127. See e.g., FIG. 1G and/or FIG. 1J.

In some embodiments, curved-segment(s) 105 may be free from (without) knock-out(s) 111 and/or hole-for-conduit(s) 129. See e.g., FIG. 1A through FIG. 1F and/or see FIG. 1I and FIG. 1J.

In some embodiments, at least one of curved-segment 105 may comprise one or more of: knock-out(s) 111 and/or hole-for-conduit(s) 129.

In some embodiments, upper-portion 103 may be free from spring(s) 137, mounting-tab(s) 143, portions thereof, combinations thereof, and/or the like. See e.g., FIG. 1A through FIG. 1F and see FIG. 1I and FIG. 1J.

In some embodiments, lower-portion 121 may be a substantially (mostly) hollow right cylinder member, that begins at a bottom of bottom-circular-edge 123 and ends at a top of lower-portion 121 at where sloped-indentations 109 begins or at where curved-segments 105 begin. In some embodiments, lower-portion 121 may comprise and/or include one or more of: bottom-circular-edge 123, notch(es) 125, internal-tab(s) 117, hole(s) 119, at least some portions of internal-curved-portion 113, portions thereof, combinations thereof, and/or the like. In some embodiments, lower-portion 121 may have a same, uniform, fixed, finite, and/or predetermined outside-diameter 153, all along an outside perimeter of lower-portion 121. In some embodiments, lower-portion 121 may be free from (without) any external annular to mostly annular flange(s). See e.g., FIG. 1A through FIG. 1F; and see FIG. 1H to FIG. 1J for inter-nal-tab(s) 117, hole(s) 119, and internal-curved-portion 113.

In some embodiments, bottom-circular-edge 123 may be a bottom edge of lower-portion 121 that may be substantially (mostly) circular when viewed from below (see e.g., FIG. 1H). In some embodiments, bottom-circular-edge 123 may comprise one or more notch(es) 125. In some embodiments, one or more notch(es) 125 may be located in bottom-circular-edge 123. In some embodiments, a pair of notches 125 may be opposing each other (see e.g., FIG. 1H).

In some embodiments, lower-portion 121 may be free from (without) one or more of: external annular to mostly annular flange(s), knock-out(s) 111, hole(s)-for-conduit 129, planar-face(s) 107, sloped-indentation(s) 109, lid 127, portions thereof, combinations thereof, and/or the like. In some embodiments, bottom-circular-edge 123 may be free from (without) one or more of: external annular to mostly annular flange(s), knock-out(s) 111, hole(s)-for-conduit 129, planar-face(s) 107, sloped-indentation(s) 109, lid 127, portions thereof, combinations thereof, and/or the like. See e.g., FIG. 1A through FIG. 1F and see FIG. 1I and FIG. 1J.

In some embodiments, assembly 100 and/or lighting-junction-box 101 may comprise at least one lid 127. In some embodiments, lid 127 may be attached to a top of upper-portion 103. In some embodiments, lid 127 may at least mostly (substantially) cover over an otherwise large upper/top hole to upper-portion 103. See e.g., FIG. 1A through FIG. 1F and FIG. 1I and FIG. 1J. In some embodiments, lid 127 may be attached to a top 201 of upper-portion 103. Note, top 201 of upper-portion 103 may be shown in the exploded views of FIG. 2A and/or FIG. 2B. In some embodiments, when lid 127 may be viewed from the top, lid 127 may have a shape that approximates an octagon, with an exception that two opposing sides (e.g., the opposing curved-segments 105) of the octagon are curved and not straight. See e.g., FIG. 1G. In some embodiments, lid 127 may comprise at least one screw/bolt 131. In some embodiments, screw/bolt 131 may be configured to being operatively connected in a ground/grounding circuit; e.g., when lid 127 and/or other portions of lighting-junction-box 101 may be at least substantially (mostly) from electrically conductive material(s) (e.g., metals). See e.g., FIG. 1A through FIG. 1E and see FIG. 1G through FIG. H.

In some embodiments, lid 127 may comprise at least one hole-for-conduit 129.

In some embodiments, hole-for-conduit 129 may be a through hole passing entirely through a section/portion of lid 127. In some embodiments, lid 127 may comprise at least one knock-out 111. See e.g., FIG. 1A.

In some embodiments, FIG. 1H through FIG. 1J may show various internal structures of lighting-junction-box 101. For example, and without limiting the scope of the present invention, at least some of cavity 135 may be shown in FIG. 1H through FIG. 1J. At least some of internal-curved-portion(s) 113 may also be shown in FIG. 1H through FIG. 1J. In some embodiments, internal-curved-portion 113 may be internal/interior sides/surfaces of curved-segment(s) 105 and/or of lower-portion 121. In some embodiments, internal-curved-portion(s) 113 may be part of both upper-portion 103 and lower-portion 121. At least some of internal-planar-portion(s) 115 may also be shown in FIG. 1H through FIG. 1J. In some embodiments, internal-planar-portion 115 may be internal/interior sides/surfaces of planar-face(s) 107. In some embodiments, internal-planar-portion(s) 115 may be only part of upper-portion 103 and not lower-portion 121. At least some portions of holes-for-conduit 129 in planar-face(s) 107/internal-planar-portion(s) 115 may be shown in FIG. 1H through FIG. 1J, wherein at least some of these holes-for-conduit 129 may be exteriorly covered by knock-outs 111 (see e.g., FIG. 1A). At least some of internal-side 133 may also be shown in FIG. 1H through FIG. 1J. In some embodiments, internal-side 133 may be internal/interior sides/surfaces of lid 127.

FIG. 1H through FIG. 1J may also show internal-tab(s) 117. In some embodiments, lighting-junction-box 101 and/or lower-portion 121 may comprise at least one internal-tab(s) 117. In some embodiments, lighting-junction-box 101 and/or lower-portion 121 may comprise at least two opposing internal-tab 117. In some embodiments, internal-tab 117 may be an interior facing (cavity 135 facing) tab/extension, that extends partially into cavity 135 by a fixed, finite, and predetermined length. In some embodiments, internal-tab 117 may begin at bottom-circular-edge 123 and terminate/end at an opposing distal end within cavity 135 and/or pointing into cavity 135. In some embodiments, internal-tab 117 may begin at notch 125 and termi-nate/end at an opposing distal end within cavity 135 and/or pointing into cavity 135. In some embodiments, that opposing distal end may comprise a hole 119. In some embodiments, hole 119 may pass entirely through the opposing distal end of a given internal-tab 117. In some embodiments, internal-tab(s) 117 may not be readily visible from front, rear, or side (left and/or right) views of lighting-junction-box 101 (assembly 100). In some embodiments, inter-nal-tab(s) 117 may be configured to provide mounting, anchoring, and/or attachment structure for other articles to be attached to lower-portion 121 (and/or attached to lighting-junction-box 101). See e.g., FIG. 1H through FIG. 1J.

In some embodiments, assembly 100 may comprise at least one spring 137. In some embodiments, assembly 100 may comprise at least two springs 137. See e.g., FIG. 1A through FIG. 1J. In some embodiments, spring 137 may be a spring clip leg. In some embodiments, spring(s) 137 may be configured to provide friction/tension against an inside diameter of a given hole within a ceiling (e.g., a cutout-for-junction-box 301), wherein that ceiling hole may be intended to fit a largest outside diameter (e.g., outside-diameter 153) of assembly 100. See e.g., FIG. 3 for cutout-for-junction-box 301. In some embodiments, spring(s) 137 may pre-vent assembly 100 from falling down (by frictional resistance to sliding against a hole within the ceiling) while that assembly 100 may be (permanently) installed into a given ceiling.

In some embodiments, spring 137 may comprise elongate-leg-portion 139 and com-plementary-mounting-portion 141. In some embodiments, elongate-leg-portion 139 may be elongate planar member that is longer than wide and wider than thick. In some embodiments, elongate-leg-portion 139 may have a finite, fixed, and predetermined length. In some embodiments, elongate-leg-portion 139 may have a finite, fixed, and predetermined rigidity, that may be appropriate for holding assembly 100 within cutout-for-junction-box 301; however, an installer may be able to squeeze (by hand) distal portions of elongate-leg-portion(s) 139 towards lighting-junction-box 101 sufficiently close, for at least a majority of lighting-junction-box 101/assembly 100 to be fit into cutout-for-junction-box 301. See e.g., FIG. 1A through FIG. 1J. In some embodiments, elongate-leg-portion 139 may be bendable and/or squeezable. In some embodiments, when elongate-leg-portion 139 may be bent and/or squeezed towards lighting-junction-box 101, that elongate-leg-portion 139 may want to return to its original configuration where elongate-leg-portion 139 was more extended out and away from lighting-junction-box 101; e.g., as shown in FIG. 1A through FIG. 1J.

In some embodiments, complementary-mounting-portion 141 may be a portion of spring 137 that is attached to an exterior portion of lower-portion 121. In some embodiments, complementary-mounting-portion 141 may be a portion of spring 137 that is attached to a bottom exterior portion of sidewall 603 of lighting-junction-box 601. In some embodiments, elongate-leg-portion 139 may be attached to (part of) complementary-mounting-portion 141. In some embodiments, elongate-leg-portion 139 may extend out and away from complemen-tary-mounting-portion 141 and out and away from an exterior of lighting-junction-box 101 or of lighting-junction-box 601. However, elongate-leg-portion 139 may be removably squeezed towards lighting-junction-box 101 (or towards lighting-junction-box 601) and/or towards com-plementary-mounting-portion 141, by hand(s) of an installer of assembly 100 (or of assembly 600) into a given ceiling. In some embodiments, complementary-mounting-portion 141 may have a radius of curvature that may be complementary (matches) a radius of curvature of low-er-portion 121 (or of the bottom exterior of sidewall 603). In some embodiments, complemen-tary-mounting-portion 141 may be attached to (an exterior of) lower-portion 121 at or proximate to bottom-circular-edge 123, wherein proximate in this context may be two (2) inches or less. In some embodiments, complementary-mounting-portion 141 may be attached to the bottom exterior of sidewall 603 at or proximate to bottom 605, wherein proximate in this context may be two (2) inches or less. In some embodiments, complementary-mounting-portion 141 may be attached to an exterior of lower-portion 121, such that when elongateleg-portion 139 is squeezed towards lighting-junction-box 101, no knock-out(s) 111 and/or no hole(s)-for-conduit 129 are blocked by the squeezed in elongate-leg-portion 139. In some embodiments, complementary-mounting-portion 141 may be attached to the bottom exterior of sidewall 603, such that when elongate-leg-portion 139 is squeezed towards lighting-junction-box 601, no knock-out(s) 111 and/or no hole(s)-for-conduit 129 are blocked by the squeezed in elongate-leg-portion 139. In some embodiments, complementary-mounting-portion 141 may be attached to an exterior of lower-portion 121, below a given planar-face 107 that is free of (without) any knock-out(s) 111 and/or free of (without) any hole(s)-for-conduit 129. In some embodiments, complementary-mounting-portion 141 may be attached to an exterior of lower-portion 121, below a curved-segment 105 that is free of (without) any knock-out(s) 111 and/or free of (without) any hole(s)-for-conduit 129. In some embodiments, complementary-mounting-portion 141 may be attached to the bottom exterior of sidewall 603 that is free of (without) any knock-out(s) 111 and/or free of (without) any hole(s)-for-conduit 129. In some embodiments, when there are two (2) springs 137 attached to (exteriors of) lower-portion 121, those two (2) springs 137 may be opposing each other by 180 degrees. In some embodiments, when there are two (2) springs 137 attached to the bottom exteriors of sidewall 603, those two (2) springs 137 may be opposing each other by 180 degrees. See e.g., FIG. 1A through FIG. 2B for lighting-junction-box 101. See e.g., FIG. 6A through FIG. 7D for lighting-junction-box 601 and/or assembly 600. Spring(s) 137 and/or portions thereof may be shown in any such figures.

In some embodiments, complementary-mounting-portion 141 may be attached to an exterior of lower-portion 121 (at or near bottom-circular-edge 123, wherein "near" may within two (2) inches) by one or more of: a heat weld, adhesive, glue, solvent bond, an ultrasonic weld, a mechanical fastener, portions thereof, combinations thereof, and/or the like. See e.g., FIG. 1A through FIG. 1J.

In some embodiments, complementary-mounting-portion 141 may be attached to the bottom exterior of sidewall 603 (at or near bottom 605, wherein "near" may within two (2) inches) by one or more of: a heat weld, adhesive, glue, solvent bond, an ultrasonic weld, a mechanical fastener, portions thereof, combinations thereof, and/or the like. See e.g., FIG. 6A through FIG. 7D.

In some embodiments, spring 137 (e.g., complementary-mounting-portion 141) may begin at or near bottom-circular-edge 123 of lower-portion 121, at an exterior of lower-portion 121, and then elongate-leg-portion 139 may extend both upwards towards top 201/lid 127 but also way from exterior sides of lighting-junction-box 101, such that an overall length of elongate-leg-portion 139 is not parallel with an axial-centerline 199 of lighting-junction-box 101 and that overall length of elongate-leg-portion 139 is also not orthogonal with the axial-centerline 199 of lighting-junction-box 101—when spring 137/elongate-leg-portion 139 is in a default/relaxed configuration (i.e., when spring 137/elongate-leg-portion 139 is not being bent/squeezed). In some embodiments, spring 137/elongate-leg-portion 139 may extend away from the opening to cavity 135 along bottom-circular-edge 123.

In some embodiments, spring 137 (e.g., complementary-mounting-portion 141) may begin at or near bottom 605 of sidewall 603 and then elongate-leg-portion 139 may extend both upwards towards top 607/lid 609 but also way from exterior sides of lighting-junction-box 601, such that an overall length of elongate-leg-portion 139 is not parallel with an axial-centerline 199 of lighting-junction-box 601 and that overall length of elongate-leg-portion 139 is also not orthogonal with the axial-centerline 199 of lighting-junction-box 601—when spring 137/elongate-leg-portion 139 is in a default/relaxed configuration (i.e., when spring 137/elongate-leg-portion 139 is not being bent/squeezed). In some embodiments, spring 137/elongate-leg-portion 139 may extend away from an opening to a cavity of lighting-junction-box 601 along bottom 605. See e.g., FIG. 6A through FIG. 7D.

In some embodiments, spring 137/elongate-leg-portion 139 may not extend from a top to a bottom direction (e.g., a general direction from top 201/lid 127 towards bottom-circular-edge 123) of lighting-junction-box 101. In some embodiments, spring 137/elongate-leg-portion 139 may not extend in a direction from the (at least mostly) closed lid 127/top 201 towards the opening to cavity 135 along bottom-circular-edge 123. See e.g., FIG. 1A.

In some embodiments, spring 137/elongate-leg-portion 139 may not extend from a top 607 to a bottom 605 direction (e.g., a general direction from top 607/lid 609 towards bottom 605) of lighting-junction-box 601. In some embodiments, spring 137/elongate-leg-portion 139 may not extend in a direction from the (at least mostly) closed lid 609/top 607 towards the opening to the cavity of lighting-junction-box 601 along bottom 605. See e.g., FIG. 6A through FIG. 7D.

In some embodiments, each of at least two springs 137 may comprise elongate-leg-portion 139 that may be longer than wide and wider than thick. In some embodiments, elongate-leg-portion 139 terminates at the distal-end of the given spring 137 disposed away from lower-portion 121 (and/or disposed away from complementary-mounting-portion 141). In some embodiments, elongate-leg-portion 139 terminates at the distal-end of the given spring 137 disposed away from the bottom exterior of sidewall 603 (and/or disposed away from complementary-mounting-portion 141). In some embodiments, elongate-leg-portion 139 may have an overall length that is not parallel nor orthogonal with an axial-centerline 199 of lighting-junction-box 101 (or of lighting-junction-box 601), when the elongate-leg-portion 139 is in a default resting relaxed configuration (i.e., the un-squeezed configuration). In some embodiments, elongate-leg-portion 139 may have a predetermined rigidity (stiffness) that is configured to be temporarily squeezed into a squeezed configuration towards the sidewalls of lighting-junction-box 101 (or of lighting-junction-box 601) (during ceiling 300 installation operations) and when not being squeezed, elongate-leg-portion 139 may be in the default resting relaxed configuration. In some embodiments, when both of elongate-leg-portions 139 are in the squeezed configuration, lighting-junction-box-assembly 100 (or assembly 600) may be configured to fit at least mostly within a hole (cutout 301) in ceiling 300. In some embodiments, up-per/top and/or lower/bottom surfaces of elongate-leg-portion 139 are neither parallel nor orthogonal from a major/main plane of lid 127, when elongate-leg-portion 139 may be in the default resting relaxed configuration. In some embodiments, upper/top and/or lower/bottom surfaces of elongate-leg-portion 139 are neither parallel nor orthogonal from a major/main plane of lid 609 (top 615), when elongate-leg-portion 139 may be in the default resting relaxed configuration. In some embodiments, each of the at least two springs 137 may comprise complementary-mounting-portion 141 that may be attached to lower-portion 121 of lighting-junction-box 101. In some embodiments, each of the at least two springs 137 may comprise complementary-mountingportion 141 that may be attached to the bottom exteriors of sidewall 603 of lighting-junction-box 601. In some embodiments, the two complementary-mounting-portions 141 may be oppositely disposed from each other (by 180 degrees) on lower-portion 121 of lighting-junction-box 101. In some embodiments, the two complementary-mounting-portions 141 may be oppositely disposed from each other (by 180 degrees) on the bottom exteriors of sidewall 603 of lighting-junction-box 601. See e.g., FIG. 1A through FIG. 2B for lighting-junction-box 101. See e.g., FIG. 6A through FIG. 7D for lighting-junction-box 601 and/or assembly 600. See also, FIG. 3 for ceiling 300.

In some embodiments, assembly 100 may comprise at least one mounting-tab 143. In some embodiments, assembly 100 may comprise at least two (2) mounting-tabs 143. In some embodiments, mounting-tab 143 may be how assembly 100 is (permanently) attached to a given ceiling. In some embodiments, mounting-tab(s) 143 may be configured to provide structure for mounting assembly 100 to a given ceiling. See e.g., FIG. 1A through FIG. 1J.

In some embodiments, mounting-tab 143 may comprise extension-portion 145 and complementary-mounting-portion 149. In some embodiments, extension-portion 145 may be elongate planar member that is wider than long and longer than thick. In some embodiments, extension-portion 145 may be shorter than elongate-leg-portion 139 (of a spring 137). In some embodiments, extension-portion 145 may be wider than elongate-leg-portion 139 (of a spring 137). In some embodiments, extension-portion 145 may have a finite, fixed, and predetermined length, width, and thickness. In some embodiments, extension-portion 145 may be a tab and/or an ear of rigid material that extends at least mostly (substantially) orthogonally away from lower-portion 121 and/or away from axial-centerline 199. In some embodiments, exten-sion-portion 145 may comprise at least one hole 147. In some embodiments, extension-portion 145 may comprise at least two holes 147. In some embodiments, hole 147 may be a hole that passes entirely through a portion of extension-portion 145. In some embodiments, hole 147 may be configured to receive a mechanical fastener, such as, but not limited to, a screw, a bolt, a nail, a rivet, a staple, a brad, portions thereof, combinations thereof, and/or the like. See e.g., FIG. 1A through FIG. 1J.

In some embodiments, complementary-mounting-portion 149 may be a portion of mounting-tab 143 that is attached to an exterior portion of lower-portion 121. In some embodiments, complementary-mounting-portion 149 may be a portion of mounting-tab 143 that is attached to a bottom exterior portion of sidewall 603 of lighting-junction-box 601. In some embodiments, extension-portion 145 may be attached to complementary-mounting-portion 141. In some embodiments, extension-portion 145 may extend out and away from complementary-mounting-portion 149 and out and away from an exterior of lighting-junction-box 101 (or of lighting-junction-box 601). In some embodiments, complementary-mounting-portion 149 may have a radius of curvature that may be complementary (matches) a radius of curvature of low-er-portion 121. In some embodiments, complementary-mounting-portion 149 may have a radius of curvature that may be complementary (matches) a radius of curvature of the bottom exterior portion of sidewall 603. In some embodiments, complementary-mounting-portion 149 may be attached to (an exterior of) lower-portion 121 at or proximate to bottom-circular-edge 123, wherein proximate in this context may be two (2) inches or less. In some embodiments, complementary-mounting-portion 149 may be attached to the bottom exterior of sidewall 603 at or proximate to bottom 605, wherein proximate in this context may be two (2) inches or less. In some embodiments, complementary-mounting-portion 149 may be attached to an exterior of lower-portion 121, such that when hole(s) 147 receive mechanical fastener(s), those mechanical fastener(s) and/or drywall-anchors that also may be receiving those mechanical fastener(s) do not block (obstruct) knock-out(s) 111 and/or hole(s)-for-conduit 129 of the upper-portion 103. In some embodiments, complementary-mounting-portion 149 may be attached to the bottom exterior of sidewall 603, such that when hole(s) 147 receive mechanical fastener(s), those mechanical fastener(s) and/or drywall-anchors that also may be receiving those mechanical fastener(s) do not block (obstruct) knock-out(s) 111 and/or hole(s)-for-conduit 129 of sidewall 603. In some embodiments, complementary-mounting-portion 149 may be attached to an exterior of lower-portion 121, below a curved-segment 105 that is free of (without) any knock-out(s) 111 and/or free of (without) any hole(s)-for-conduit 129. In some embodiments, complementary-mounting-portion 149 may be attached to an exterior of lower-portion 121, below a given planar-face 107 that is free of (without) any knock-out(s) 111 and/or free of (without) any hole(s)-for-conduit 129. In some embodiments, complementary-mounting-portion 149 may be attached to the bottom exterior of sidewall 603 that is free of (without) any knock-out(s) 111 and/or free of (without) any hole(s)-for-conduit 129. In some embodiments, when there are two (2) mounting-tabs 143 attached to (exteriors of) lower-portion 121, those two (2) mounting-tabs 143 may be opposing each other by 180 degrees. In some embodiments, when there are two (2) mounting-tabs 143 attached to the bottom exteriors of sidewall 603, those two (2) mounting-tabs 143 may be opposing each other by 180 degrees. In some embodiments, a given mounting-tab 143 may be separated from a given closet spring 137 of lower-portion 121 by 90 degrees. In some embodiments, a given mounting-tab 143 may be separated from a given closet spring 137 of sidewall 603 by 90 degrees. See e.g., FIG. 1A through FIG. 2B for lighting-junction-box 101. See e.g., FIG. 6A through FIG. 7D for lighting-junction-box 601 and/or assembly 600. Spring(s) 137 and/or portions thereof may be shown in any such figures.

In some embodiments, complementary-mounting-portion 149 may be attached to an exterior of lower-portion 121 (at or near bottom-circular-edge 123, wherein "near" may within two (2) inches) by one or more of: a heat weld, adhesive, glue, solvent bond, an ultrasonic weld, a mechanical fastener, portions thereof, combinations thereof, and/or the like. See e.g., FIG. 1A.

In some embodiments, complementary-mounting-portion 149 may be attached to the bottom exterior of sidewall 603 (at or near bottom 605, wherein "near" may within two (2) inches) by one or more of: a heat weld, adhesive, glue, solvent bond, an ultrasonic weld, a mechanical fastener, portions thereof, combinations thereof, and/or the like. See e.g., FIG. 6A through FIG. 7D.

In some embodiments, bottom surfaces of extension-portion 145 may be at least mostly (substantially) flush with bottom surfaces of bottom-circular-edge 123 (or of bottom 605). See e.g., FIG. 1C and/or FIG. 1D for bottom-circular-edge 123. See e.g., FIG. 6B to FIG. 6D for bottom 605.

In some embodiments, extension-portion 145 may extends orthogonally away from axial-centerline 199 of lighting-junction-box 101 (or of lighting-junction-box 601). In some embodiments, upper/top and/or lower/bottom surfaces of extension-portion 145 may be substantially parallel with a major/main plane of lid 127 (or of lid 609). In some embodiments, each of at least two mounting-tabs 143 may comprise complementary-mounting-portion 149 that may be attached to lower-portion 121 of lighting-junction-box 101. In some embodiments, each of at least two mounting-tabs 143 may comprise complementary-mounting-portion 149 that may be attached to the bottom exterior of sidewall 603 of lighting-junction-box 601. In some embodiments, the two complementary-mounting-portions 149 may be oppositely disposed from each other (by 180 degrees) on lower-portion 121 of lighting-junction-box 101. In some embodiments, the two complementary-mounting-portions 149 may be oppositely disposed from each other (by 180 degrees) on the bottom exteriors of sidewall 603 of lighting-junction-box 601. In some embodiments, extension-portion 145 may comprise at least one through-hole 147. In some embodiments, at least one through-hole 147 may be configured to receive a mechanical fastener (such as, but not limited to, a screw) for attachment to ceiling 300. For example, and without limiting the scope of the present invention, a portion of the mechanical fastener (e.g., a portion near a head of the mechanical fastener) may pass through hole 147 and a different portion of the mechanical fastener (e.g., a distal portion disposed away from the head of the mechanical fastener) may be received into hole 303 (wherein hole 303 may or may not have drywall-anchor(s) installed therein). See e.g., FIG. 1A through FIG. 2B for lighting-junction-box 101. See e.g., FIG. 6A through FIG. 7D for lighting-junction-box 601 and/or assembly 600. See also, FIG. 3 for ceiling 300.

In some embodiments, if imaginary four (4) lines were to connect the four (4) holes 147, a rectangle shape, as viewed from a bottom of assembly 100 (or of assembly 600), with rounded corners may be formed. See e.g., FIG. 1H for assembly 100 and see FIG. 6D for assembly 600. In some embodiments, that rectangle shape, may share a center with axial-centerline 199. In some embodiments, a length of that rectangle shape may be at least substantially (mostly) orthogonal/perpendicular to an imaginary line running between the two opposing springs 137. See e.g., FIG. 1H for assembly 100 and see FIG. 6D for assembly 600.

In some embodiments, each of the at least two springs 137 may comprise elongate-leg-portion 139, and elongate-leg-portion 139 may be longer than a length (or a width) of ex-tension-portion 145. In some embodiments, a length of elongate-leg-portion 139 may be from four (4) to six (6) times longer than a length of extension-portion 145. See e.g., FIG. 1C to FIG. 1H and/or see FIG. 6C to FIG. 6H.

In some embodiments, spring(s) 137 and/or mounting-tab(s) 143 are attached to/at, associated with, and/or in proximity to bottom-circular-edge 123 of lower-portion 121, wherein "associated with" and/or "in proximity to" in this context means a portion of spring(s) 137 (e.g., complementary-mounting-portion 141) and/or of mounting-tab(s) 143 (e.g., complemen-tary-mounting-portion 149) is within two (2) inches of bottom-circular-edge 123. See e.g., FIG. 1A.

In some embodiments, spring(s) 137 and/or mounting-tab(s) 143 are attached to/at, associated with, and/or in proximity to bottom 605 of the bottom exterior of sidewall 603, wherein "associated with" and/or "in proximity to" in this context means a portion of spring(s) 137 (e.g., comple-mentary-mounting-portion 141) and/or of mounting-tab(s) 143 (e.g., com-plementary-mounting-portion 149) is within two (2) inches of bottom 605. See e.g., FIG. 6A to FIG. 6H.

In some embodiments, spring(s) 137 and/or mounting-tab(s) 143 are not attached to/at, associated with, nor in proximity to one or more of: flange(s), external flange(s), annular flange(s), mostly annular flange(s), reflector(s), trim, portions thereof, combinations thereof, and/or the like; wherein "associated with" and/or "in proximity to" in this context means a portion of spring(s) 137 (e.g., complementary-mounting-portion 141) and/or of mounting-tab(s) 143 (e.g., complementary-mounting-portion 149) is at least two (2) inches or more separated away from such structures.

In some embodiments, spring(s) 137 and/or mounting-tab(s) 143 are not attached to/at, associated with, nor in proximity to one or more of: lid 127, top 201, upper-portion 103, curved-segment(s) 105, planar-surface(s) 107, sloped-indentation(s) 109, knock-out(s) 111, hole(s)-for-conduit 129, portions thereof, combinations thereof, and/or the like; wherein "associated with" and/or "in proximity to" in this context means a portion of spring(s) 137 (e.g., complementary-mounting-portion 141) when the spring(s) 137 are not being bent/squeezed and/or of mounting-tab(s) 143 (e.g., complementary-mounting-portion 149) is at least a half (0.5) inch or more separated away from such structures.

In some embodiments, spring(s) 137 and/or mounting-tab(s) 143 are not attached to/at, associated with, nor in proximity to one or more of: lid 609, top 607, knock-out(s) 111, hole(s)-for-conduit 129, portions thereof, combinations thereof, and/or the like; wherein "associated with" and/or "in proximity to" in this context means a portion of spring(s) 137 (e.g., complementary-mounting-portion 141) when the spring(s) 137 are not being bent/squeezed and/or of mounting-tab(s) 143 (e.g., complementary-mounting-portion 149) is at least a half (0.5) inch or more separated away from such structures. See e.g., FIG. 6A to FIG. 6H.

In some embodiments, a spring 137 selected from the at least two springs 137 and a mounting-tab 143 selected from the at least two mounting-tabs 143 may be adjacent to each other and separated from each other by ninety (90) degrees along an exterior of lower-portion 121 of lighting-junction-box 101. See e.g., FIG. 1G and/or FIG. 1H.

In some embodiments, a spring 137 selected from the at least two springs 137 and a mounting-tab 143 selected from the at least two mounting-tabs 143 may be adjacent to each other and separated from each other by ninety (90) degrees along an exterior of bottom exterior of sidewall 603 of lighting-junction-box 601. See e.g., FIG. 6C and/or FIG. 6D.

In some embodiments, each of the at least two springs 137 may comprise elongate-leg-portion 139, and elongate-leg-portion 139 may be longer than a length (or a width) of ex-tension-portion 145. See e.g., FIG. 1G, FIG. 1H, and/or see FIG. 6C to FIG. 6H.

Figure 2A:
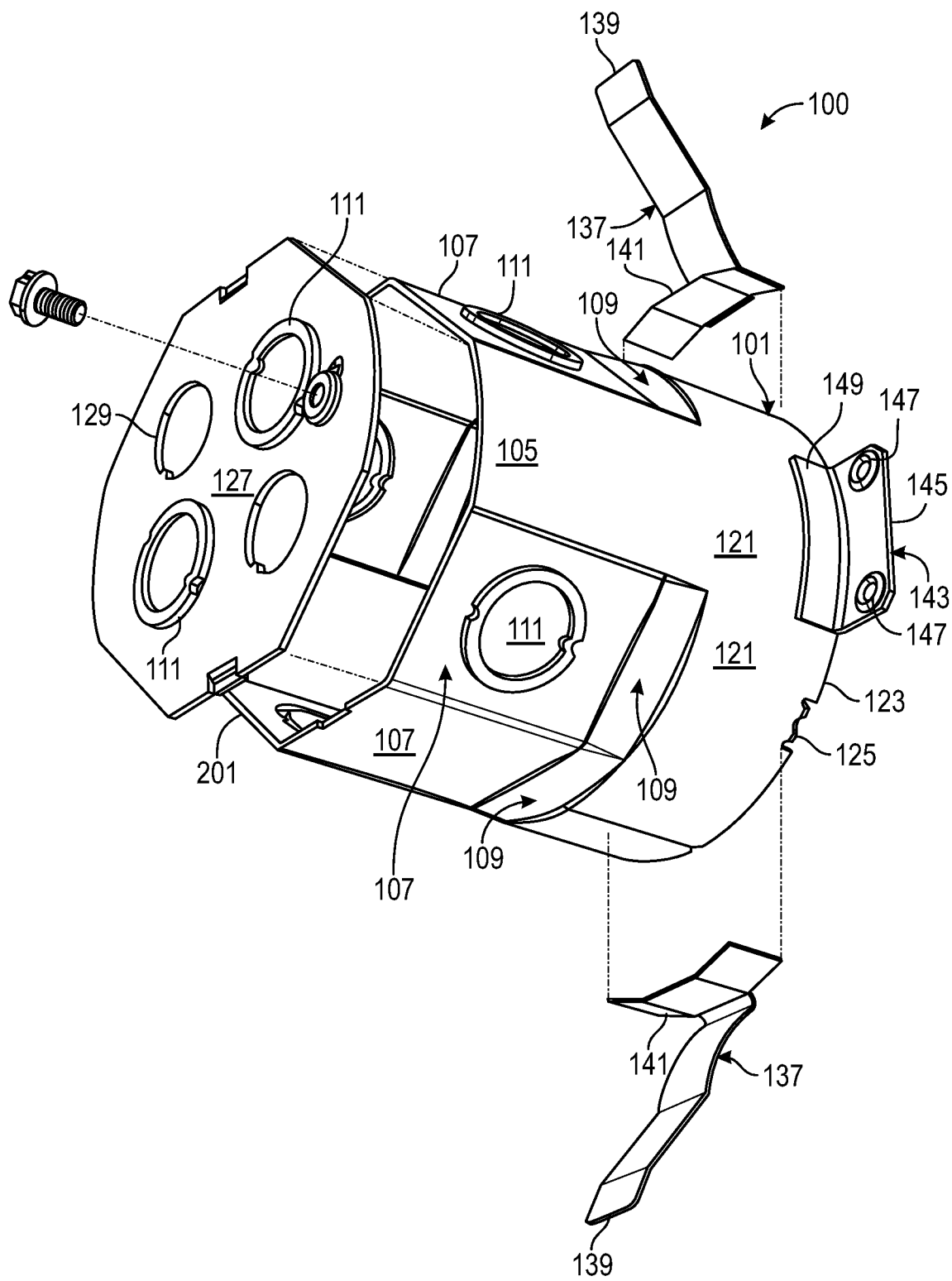
FIG. 2A depicts a partially exploded top perspective view of the lighting-junction-box-assembly-for-remodel of FIG. 1A.
Figure 2B:
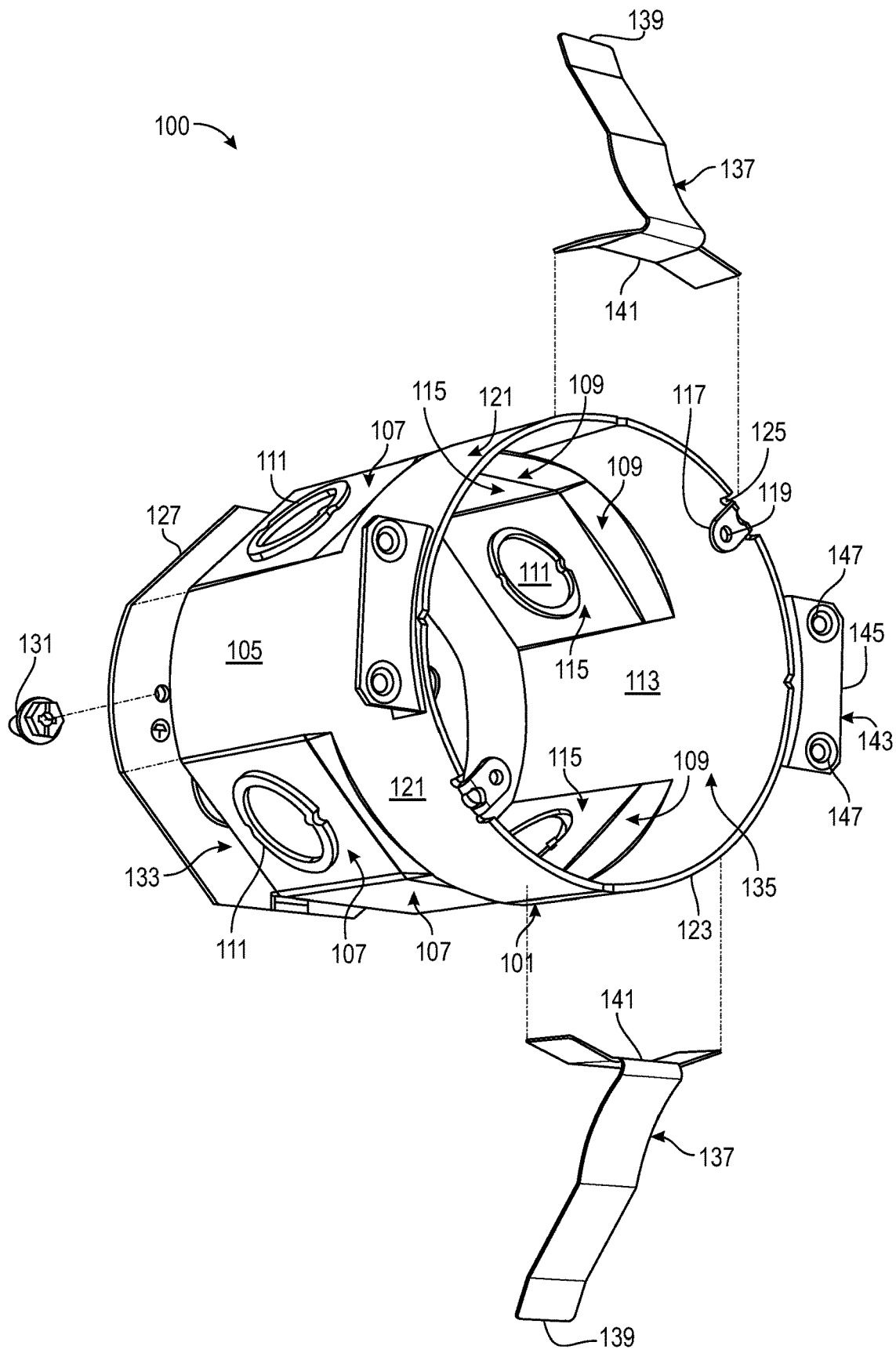
FIG. 2B depicts a partially exploded bottom perspective view of the lighting-junction-box-assembly-for-remodel of FIG. 1A.

FIG. 2A depicts a partially exploded top perspective view of assembly 100. FIG. 2B depicts a partially exploded bottom perspective view of assembly 100. FIG. 2A and FIG. 2B show: lid 127 exploded vertically away from top 201 of upper-portion 103; screw/bolt 131 exploded vertically away from lid 127; and springs 137 laterally exploded away from exterior sides of lower-portion 121. FIG. 2A and FIG. 2B show how upper-portion 103 and lower-portion 121 may be integral with each other, of a single article of manufacture.

Without lid 127 attached to a top 201 of upper-portion 103, upper-portion 103 and lower-portion 121 may form a hollow elongate structure (open at top 201 and at a bottom 123), with (sidewall) portions that are substantially (mostly) similar to a hollow right cylinder (see e.g., FIG. 2A and/or FIG. 2B).

In some embodiments, at least two or more of: upper-portion 103, curved-segments 105, planar-faces 107, sloped-indentations 109, holes-for-conduit 129 (of at least some planar-faces 107), lower-portion 121, bottom-circular-edge 123, and/or notch(es) 125 may be integral with each other and/or of a single article of manufacture; however, knock-out(s) 111 may be separate articles of manufacture that may be attached to at least some of the plana-faces 107. Lid 127 may also be a separate article of manufacture from upper-portion 103 and/or from lower-portion 121. Spring(s) 137 may also be a separate article(s) of manufacture from upper-portion 103 and/or from lower-portion 121. Mounting-tab(s) 143 may also be a separate arti-cle(s) of manufacture from upper-portion 103 and/or from lower-portion 121. See e.g., FIG. 2A and/or FIG. 2B.

In some embodiments, top 201 and/or lid 127 may be free from (without) any spring(s) 137 and/or mounting-tab(s) 143. See e.g., FIG. 2A and/or FIG. 2B.

Figure 3:
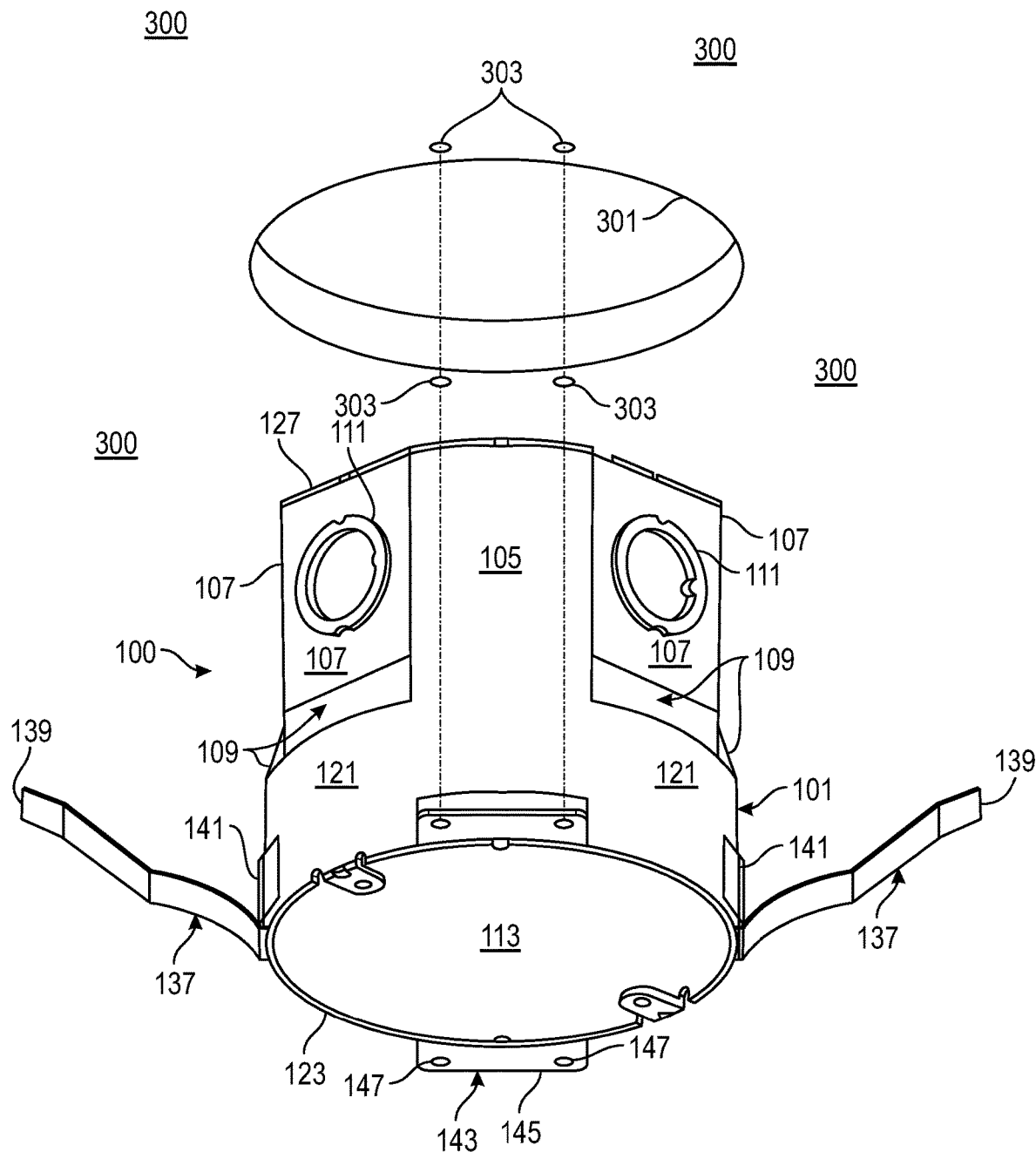
FIG. 3 depicts a bottom perspective view showing how a given lighting-junction-box-assembly-for-remodel of FIG. 1A may be installed into an existing ceiling.

FIG. 3 depicts a bottom perspective view showing how a given assembly 100 (or a given assembly 600) may be installed into an existing ceiling 300. See FIG. 6A to FIG. 7D for assembly 600. Continuing discussing FIG. 3, in some embodiments, existing ceiling 300 may be made substantially from one or more of: drywall, sheetrock, gypsum board, wood, en-gineered lumber, plywood, OSB (oriented strand board), cement, concrete, metal, steel, alumi-num, planks, panels, board, fiber board, plaster board, cement board, portions thereof, combinations thereof, and/or the like. For example, and without limiting the scope of the present invention, in some embodiments, existing ceiling 300 may be drywall of at least five-eighths (⅝) inches in (nominal/industry standard) thickness. With respect to a given existing ceiling 300, a circular hole may be formed (e.g., cut) into that ceiling 300 that is sized to receive an outside diameter (e.g., outside-diameter 153) of assembly 100 (or of assembly 600) within that circle, wherein such a circle may be designated as cutout-for-junction-box 301. In some embodiments, an inside diameter of cutout-for-junction-box 301 may be larger than outside diameter (e.g., outside-diameter 153) of assembly 100 (or of assembly 600). In some embodiments, for every hole 147 (of mounting-tab(s) 143 of assembly 100 [or of assembly 600]), a corresponding hole 303 may be formed (e.g., drilled) into that given existing ceiling 300. In some embodiments, hole(s) 147 may be vertical linear/straight alignment with hole(s) 303. In some embodiments, where there may be four (4) holes 147, then there may be four (4) holes 303, such that each hole 147 has a corresponding hole 303 in vertical linear/straight alignment as shown in FIG. 3. In some embodiments, hole 303 may be a hole for receiving a given mechanical fastener that secures mounting-tab(s) 143 to ceiling 300 and/or to drywall-anchor(s) that may be embedded within hole 303. See e.g., FIG. 3.

In some embodiments, to install a given assembly 100 (or a given assembly 600) into a given existing ceiling 300, cutout-for-junction-box 301 and hole(s) 303 are formed in the given existing ceiling 300. In some embodiments, template 400 (shown in FIG. 4) may be used to size and spatially place cutout-for-junction-box 301 and hole(s) 303 into the given existing ceiling 300. In some embodiments, cutout-for-junction-box 301 may be a circular hole sized as four (4) inches and three-eighths (⅜) inches in diameter. In other embodiments, a size of cutout-for-junction-box 301 may be different. In some embodiments, hole(s) 303 may be circular hole(s) of a size of three-sixteenths (³⁄₁₆) inches in diameter. In other embodiments, a size of hole(s) 303 may be different. Then, elongate-leg-portion(s) 139 may be manually squeezed (by an installer's hands) towards lighting-junction-box 101 (or towards lighting-junction-box 601) enough that at least most of assembly 100 (or of assembly 600) may pass into cutout-for-junction-box 301; whereby manual squeezing of elongate-leg-portion(s) 139 may be released, and elongate-leg-portion(s) 139 may then squeeze against cutout-for-junction-box 301 and temporarily holding assembly 100 (or holding assembly 600) within cutout-for-junction-box 301. Then, mechanical fasteners may be used to secure mounting-tab(s) 143 to the given existing ceiling 300, by the mechanical fasteners passing through hole(s) 147 and through/into hole(s) 303. In some embodiments, once a given assembly 100 (or a given assembly 600) has been so mounted to given existing ceiling 300, mounting-tab(s) 143 may remain below a bottom exterior surface of the given existing ceiling 300. See e.g., FIG. 3. In some embodiments, cutout-for-junction-box 301 may also be referred to as largest-hole 301. In some embodiments, hole-for-mounting-tab-and-anchor 303 may also be referred to as smaller-hole 303.

In some embodiments, smaller-holes 303 may be in close proximity to largest-hole 301; and smaller-holes 303 and largest-hole 301 are all arranged in a predetermined pattern (e.g., as shown in template 400 of FIG. 4) with respect to each other. See e.g., FIG. 3 and FIG. 4.

Figure 4:
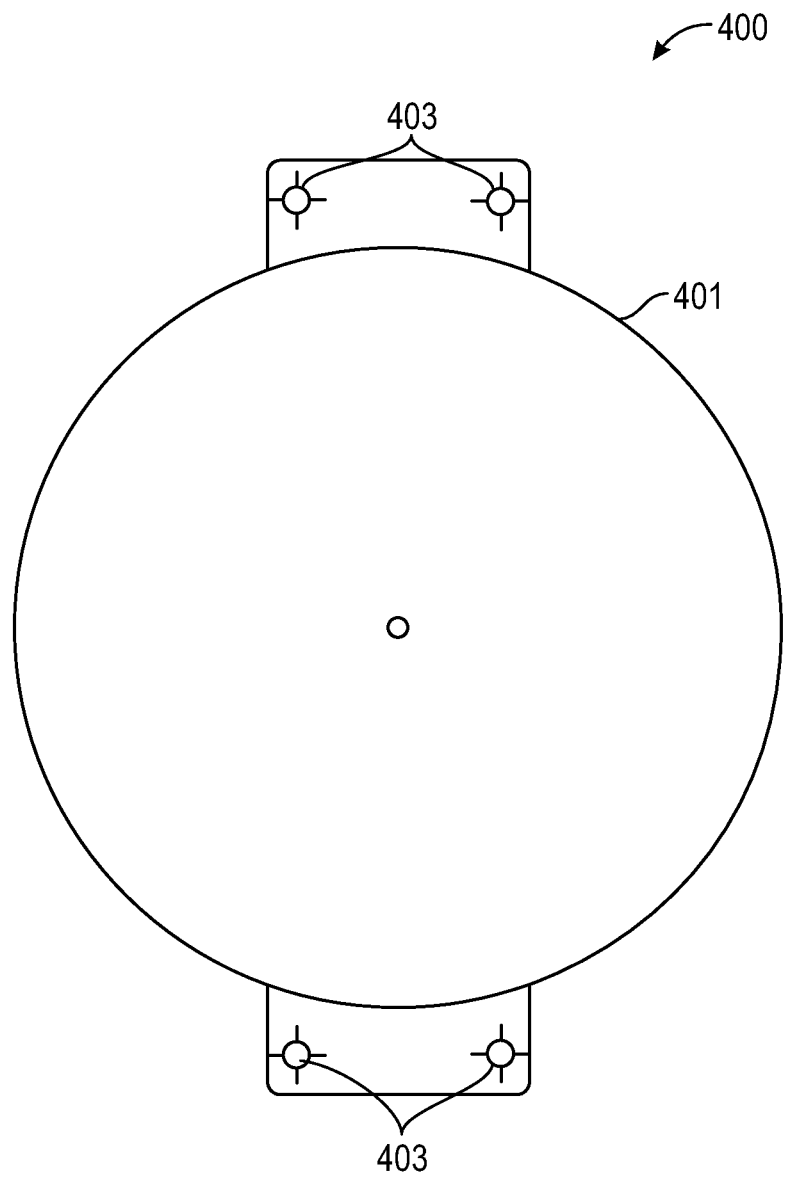
FIG. 4 depicts a plan view of a template for marking up an underside of an existing ceiling so that the marked-up region of the existing ceiling may receive installation of a given lighting-junction-box-assembly-for-remodel of FIG. 1A.

FIG. 4 depicts a plan view of a template 400, for marking up an underside of existing ceiling 300 so that the marked-up region of existing ceiling 300 may receive installation of a given assembly 100 (or a given assembly 600). See FIG. 6A to FIG. 7D for assembly 600. Continuing discussing FIG. 4, in some embodiments, template 400 may be flatly attached to a bottom underside of existing ceiling 300, where a given assembly 100 (or a given assembly 600) may be desired to be installed within existing ceiling 300. In some embodiments, template 400 may be used to form the ceiling 300 holes shown in FIG. 3. In some embodiments, template 400 may comprise template-for-cutout-for-junction-box 401 and template-for-hole-for-mounting-plate-and-anchor 403. In some embodiments, template-for-cutout-for-junction-box 401 and template-for-hole(s)-for-mounting-plate-and-anchor 403 may be circles of at least two different sizes. In some embodiments, template-for-cutout-for-junction-box 401 may be a circle size of four (4) inches and three-eighths (⅜) inches in diameter. In other embodiments, a size of template-for-cutout-for-junction-box 401 may be different. In some embodiments, template-for-hole(s)-for-mounting-plate-and-anchor 403 may be circle(s) of a size of three-sixteenths (³⁄₁₆) inches in diameter. In other embodiments, a size of template-for-hole-for-mounting-plate-and-anchor 403 may be different. In some embodiments, template-for-cutout-for-junction-box 401 may be used to form (e.g., cutout) cutout-for-junction-box 301. In some embodiments, template-for-hole(s)-for-mounting-plate-and-anchor 403 may be used to form (e.g., drill) hole(s) 303. In some embodiments, template-for-cutout-for-junction-box 401 may be larger in diameter than diameters of template-for-hole(s)-for-mounting-plate-and-anchor 403. In some embodiments, template-for-cutout-for-junction-box 401 may be centered between two set of opposing holes template-for-hole(s)-for-mounting-plate-and-anchor 403, wherein each such set of template-for-hole(s)-for-mounting-plate-and-anchor 403 may have two template-for-hole(s)-for-mounting-plate-and-anchor 403 (so there may be four (4) template-for-hole(s)-for-mounting-plate-and-anchor 403 in total). See e.g., FIG. 4 for template 400 and its circles 401/403. In some embodiments, template-for-cutout-for-junction-box 401 may also be referred to as largest-circle 401. In some embodiments, template-for-hole-for-mounting-plate-and-anchor 403 may also be referred to as smaller-circle 403. In some embodiments, template 400 may be a substantially (mostly) flat and planar sheet. In some embodiments, template 400 may be a substantially (mostly) made from paper, card stock, cardboard, plastic, sheeting material that is easy to cut (e.g., cuttable with hand-held scissors), portions thereof, combinations thereof, and/or the like.

Continuing discussing FIG. 4, in some embodiments, single-largest-circle 401 may be centered in template 400, with two smaller-circles 403 placed above and outside of single-largest-circle 401 at a same distance from a center of single-largest-circle 401; and wherein two additional smaller-circles 403 are placed below and outside of single-largest-circle 401, also at that same distance from the center of single-largest-circle 401; such that there are a total of four (4) smaller-circles 403, two (2) above single-largest-circle 401 and two (2) below sin-gle-largest-circle 401. In some embodiments, this pattern of circles of template 400 directly corresponds (and at a same scale) to a pattern of outside-diameter 153/bottom-circular-edge 123 and holes 147 of assembly 100 (or assembly 600), except that single-largest-circle 401 is slightly larger than outside-diameter 153.

In some embodiments, if imaginary four (4) lines were to connect the four (4) template-for-hole-for-mounting-plate-and-anchor 403 (smaller-circles 403), a rectangle shape, with rounded corners may be formed. See e.g., FIG. 4. In some embodiments, that rectangle shape, may share a center with axial-centerline 199. In some embodiments, a length of that rectangle shape may be at least substantially (mostly) orthogonal/perpendicular to an imaginary line running between the two opposing springs 137. See e.g., FIG. 4 and FIG. 1H.

Figure 5:
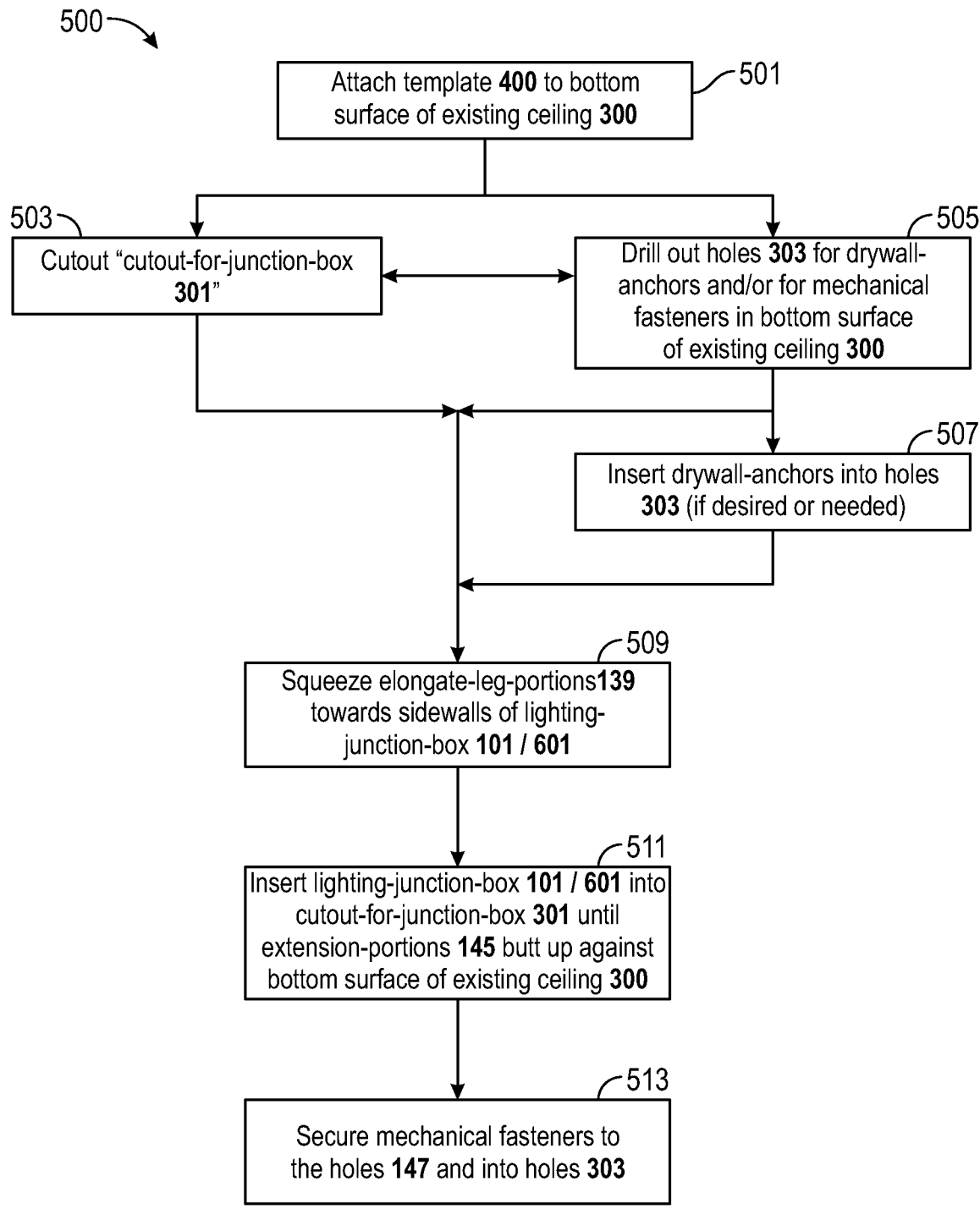
FIG. 5 may depict a flowchart of a method of retrofitting an existing ceiling with a lighting-junction-box-assembly-for-remodel installed within that existing ceiling.

FIG. 5 may depict a flowchart of a method 500. FIG. 5 may depict at least some steps of method 500 in a flowchart. In some embodiments, method 500 may be a method of retrofitting existing ceiling 300 with assembly 100 and/or with lighting-junction-box-assembly-for-remodel 600 (assembly 600) installed therein. See FIG. 6A to FIG. 7D for assembly 600. Continuing discussing FIG. 5, in some embodiments, method 500 may comprise at least one of the following steps: 501, 503, 505, 507, 509, 511, 513, portions thereof, combinations thereof, and/or the like. In some embodiments, method 500 at a minimum may comprise steps: 503, 505, 509, 511, and 513; wherein step 501 may be optional; and/or step 507 may be executed as desired or necessary depending upon existing ceiling 300 strength charac-teristics and/or whether or not any structural members are behind hole(s) 303. In some embodiments, method 500 may begin with either step 503 or with step 505, but both the steps 503 and 505 must be executed prior to executing the steps 509 through 513. In some embodiments, method 500 may begin with step 501, with step 503, or with step 505, but both the steps 503 and 505 must be executed prior to executing the steps 509 through 513. In some embodiments, at least one of these steps may be omitted from method 500. In some embodiments, at least some of these steps may be executed out of numerical order.

Continuing discussing FIG. 5, in some embodiments, step 501 may be a step of attaching template 400 to a bottom surface of existing ceiling 300, at a location of 300 wherein one plans to install a given assembly 100 (or assembly 600). In some embodiments, prior to executing steps 503 through 513, method 500 may comprise step 501 of attaching template 400 to a bottom surface of existing ceiling 300, wherein template 400 may comprise a single-largest-circle 401 and smaller-circles 403, wherein single-largest-circle 401 may be used to size largest-hole 301, and wherein smaller-circles 403 may be used to size smaller-holes 303. For example, and without limiting the scope of the present invention, tape and/or tacks may be used to attach template 400 to the bottom surface of existing ceiling 300. In some embodiments, smaller-holes 303 may be in close proximity to largest-hole 301; and smaller-holes 303 and largest-hole 301 are all arranged in a predetermined pattern (e.g., as shown in template 400 of FIG. 4) with respect to each other. In some embodiments, step 501 may be omitted from method 500. In some embodiments, step 501 may progress to step 503 and/or to step 505.

Continuing discussing FIG. 5, in some embodiments, step 503 may be a step of cutting out cutout-for-junction-box 301 in the bottom surface of existing ceiling 300. In some embodiments, step 503 may be a step of cutting a largest-hole 301 within existing ceiling 300, wherein largest-hole 301 may be sized to fit an outside-diameter of lighting-junction-box-assembly 100 (or assembly 600). A saw selected from various saws may be used to execute step 503. For example, and without limiting the scope of the present invention, if existing ceiling 300 may be drywall, then a drywall hand saw, a jigsaw, a drill with circular saw bit, a drill with hole bit, and/or the like may be used to form cutout-for-junction-box 301. In some embodiments, cutout-for-junction-box 301 may have a diameter of four and three-eights (4⅜) inches; whereas, in other embodiments, cutout-for-junction-box 301 may have a different sized diameter. In some embodiments, template-for-cutout-for-junction-box 401 from template 400 may be used to assist in forming cutout-for-junction-box 301; whereas, in other embodiments, cutout-for-junction-box 301 may be formed without use of template-for-cutout-for-junction-box 401 and just using an appropriate sized hole saw in the bottom surface of existing ceiling 300. In some embodiments, step 503 may progress to step 505 and/or to step 509. Note, in some embodiments, step 503 may only progress to step 509, if step 505 has already been executed.

Continuing discussing FIG. 5, in some embodiments, step 505 may be a step of drilling out holes 303 for drywall-anchors and/or for mechanical fasteners in the bottom surface of existing ceiling 300. In some embodiments, step 505 may be a step of drilling smaller-holes 303 within existing ceiling 300, wherein smaller-holes 303 may be configured for receiving mechanical fasteners and/or for receiving drywall-anchors. In some embodiments, step 505 may be executed with a drill, driver, and/or appropriately sized drill bits. In some embodiments, four (4) such holes 303 may be formed in step 505. In some embodiments, a three-sixteenths (3/16) inch drill bit (along with a drill) may be used for drill out hole(s) 303 in the bottom surface of existing ceiling 300; whereas, in other embodiments, a different sized drill bit may be used to form hole(s) 303 depending upon an inside diameter of hole(s) 147.

In some embodiments, template-for-hole-for-mounting-plate-and-anchor 403 from template 400 may be used to assist in forming hole(s) 303; whereas, in other embodiments, hole(s) 303 may be formed without use of template-for-hole-for-mounting-plate-and-anchor 403 and just using an appropriate sized drill bit in the bottom surface of existing ceiling 300 and using hole(s) 147 as a template of where to locate those hole(s) 303. In some embodiments, step 505 may progress to step 507 and/or to step 509. Note, in some embodiments, step 505 may only progress to step 509, if step 503 has already been executed.

Continuing discussing FIG. 5, in some embodiments, step 507 may be a step of inserting drywall-anchors into holes 303 (formed from step 505) (if desired or needed). In some embodiments, after executing step 505 but before executing step 509, method 500 may comprise step 507 of inserting at least one drywall-anchor into at least one of the smaller-holes 303. In some embodiments, the drywall-anchors may be sized appropriately for one or more of: a thickness of drywall of ceiling 300, a weight of assembly 100 (or assembly 600), and/or a weight of the lighting module (and trim) installed at least partially within assembly 100 (or assembly 600). For example, and without limiting the scope of the present invention, the dry-wall-anchors may be sized for certain weight requirements, such as, but not limited to, 25 pounds, 50 pounds, 75 pounds, and/or the like. For example, and without limiting the scope of the present invention, the drywall-anchors may be a commercially available drywall-anchor that is configured to fit into a hole within drywall and then receive a mechanical fastener (e.g., a screw) into the drywall-anchor. In some embodiments, step 507 may be omitted in method 500. In some embodiments, step 507 may be unnecessary; e.g., when a location for a given hole 303 may be backed by some structural member (e.g., a joist, a stud, wood, lumber, engi-neered lumber, metal, steel, concrete, cement, masonry, and/or the like). In some embodiments, step 507 may progress to step 509.

Continuing discussing FIG. 5, in some embodiments, step 509 may be a step of squeezing elongate-leg-portions 139 towards sidewalls of lighting-junction-box 101 (or towards sidewall 603 of lighting-junction-box 601). In some embodiments, step 509 may be a step of squeezing (e.g., manually by hand) elongate-leg-portions 139 of springs 137 of the lighting-junction-box-assembly 100 (or of assembly 600) towards sidewalls of the lighting-junction-box-assembly 101 (or towards sidewall 603 of lighting-junction-box 601). In some embodiments, step 509 may be executed solely by the installer's hand(s); i.e., spring(s) 139 squeezing may be done by human hands. In some embodiments, step 509 may progress to step 511. Note, execution of step 509 may overlap with execution of step 511.

Continuing discussing FIG. 5, in some embodiments, step 511 may be a step of inserting lighting-junction-box 101 (or inserting lighting-junction-box 601) (while simultaneous-ly still executing step 509) into cutout-for-junction-box 301 (made in step 503) until extension-portions 145 physically butt up against the bottom surface of existing ceiling 300. In some embodiments, while step 509 is still being executed, step 511 may be a step of inserting at least most of lighting-junction-box-assembly 100 into largest-hole 301. Once step 511 is executed, squeezing of elongate-leg-portions 139 towards sidewalls of lighting-junction-box 101 may no longer be possible; however, the inside diameter of cutout-for-junction-box 301 may now butt up against some underside portion of elongate-leg-portions 139 so that assembly 100 (or assembly 600) may be frictionally held within cutout-for-junction-box 301 (at least temporarily until step 513 may be executed). Note, not all of assembly 100 (or of assembly 600) may be entirely located within cutout-for-junction-box 301 once step 511 has been executed; e.g., ex-tension-portion(s) 145 may reside outside of cutout-for-junction-box 301 once step 511 has been executed. In some embodiments, when step 511 may be completed, top/upper surfaces of extension-portions 145 may butt physically up against a bottom surface of existing ceiling 300. Extension-portions 145 may not fit into hole 301 (cutout 301/largest-hole 301). In some embodiments, once assembly 100 (or assembly 600) may be installed within hole 301 (cutout 301/largest-hole 301) (e.g., after execution of step 513), trim, plaster, mud, and/or paint may cover up extension-portions 145. In some embodiments, step 511 may progress to step 513.

Continuing discussing FIG. 5, in some embodiments, step 513 may be a step of securing mechanical fasteners to the holes 147 and then with portions of those mechanical fasteners also going into holes 303 (and into any drywall-anchors, if present in hole(s) 303). In some embodiments, step 513 may be a step of securing the mechanical fasteners to extension-portions 145 (e.g., by use of hole(s) 147) of lighting-junction-box-assembly 100 (or of assembly 600) and to smaller-holes 303. In some embodiments, the mechanical fasteners used in step 513 may be selected from one or more of: a screw, a bolt, a rivet, a nail, a brad, a tack, a pin, portions thereof, combinations thereof, and/or the like. Upon completion of step 513, assembly 100 (or assembly 600) may be securely installed within cutout-for-junction-box 301 of existing ceiling 300.

Figure 6A:
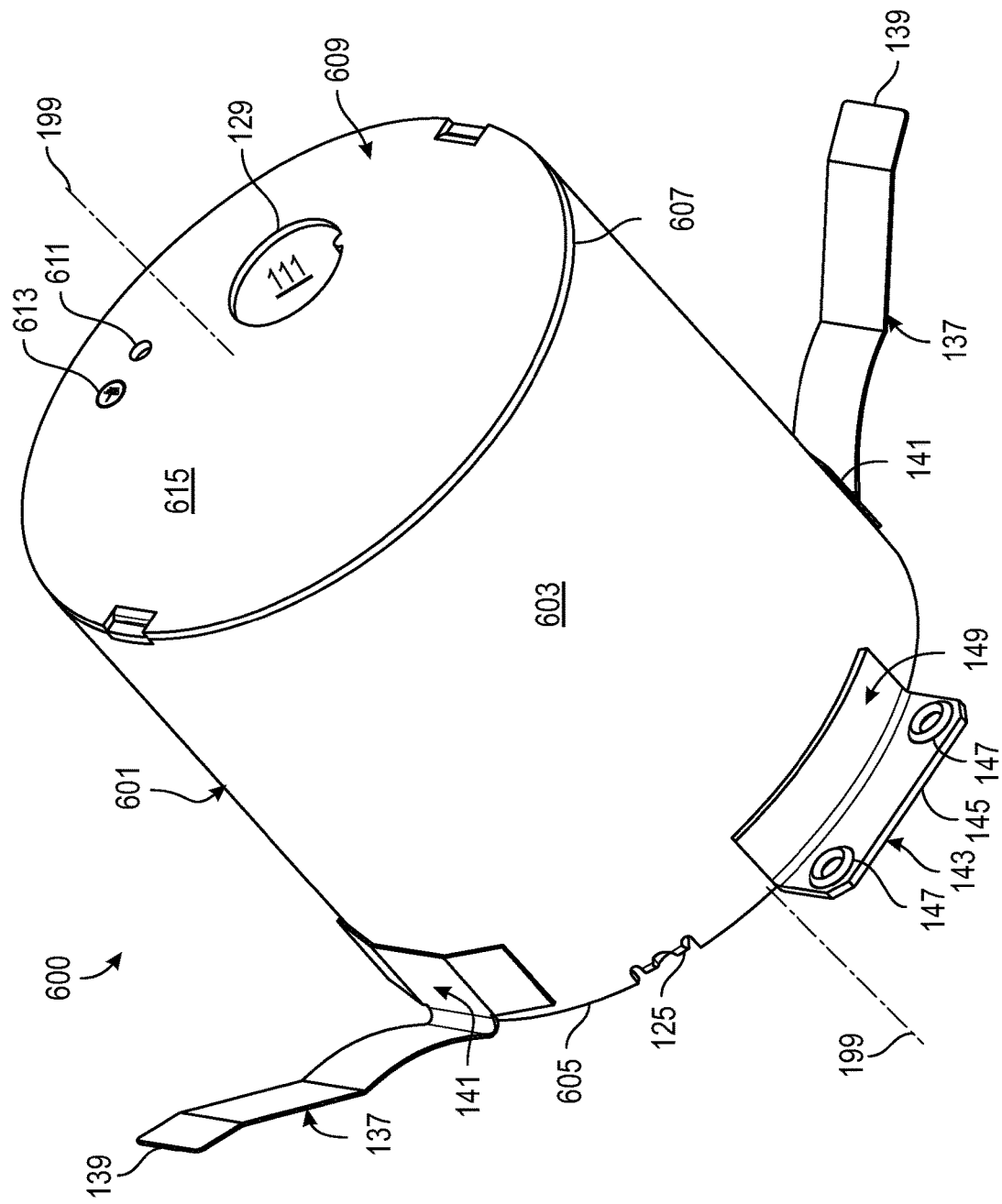
FIG. 6A depicts a lighting-junction-box-assembly-for-remodel, according to another embodiment, shown from a top-down perspective view.

FIG. 6A depicts a lighting-junction-box-assembly-for-remodel 600 (assembly 600) shown from a top-down perspective view. In some embodiments, lighting-junction-box-assembly-for-remodel 600 may be at least substantially similar to lighting-junction-box-assembly-for-remodel 100, except in lighting-junction-box-assembly-for-remodel 600, lighting-junction-box 101 may be replaced with lighting-junction-box 601. In some embodiments, in lighting-junction-box-assembly-for-remodel 600 there may be no lighting-junction-box 101 present, but instead there is lighting-junction-box 601 present. In some embodiments, in both lighting-junction-box-assembly-for-remodel 600 and in lighting-junction-box-assembly-for-remodel 100, there may be spring(s) 137 and mounting-tab(s) 143. In some embodiments, spring(s) 137 and/or mounting-tab(s) 143 of assembly 600 may be at least substantially (mostly) to exactly the same as spring(s) 137 and/or mounting-tab(s) 143 of assembly 100. In some embodiments, the discussions of spring(s) 137 and/or mounting-tab(s) 143 above in the discussion of assembly 100 may be entirely applicable to assembly 600. In some embodiments, lighting-junction-box 601 and lighting-junction-box 101 may differ from each other with respect to the shape of the respective sidewall elements. In some embodiments, in lighting-junction-box 601 and its respective sidewall 603 may be at least substantially to entirely of (right) cylindrical member.

Continuing discussing FIG. 6A, in some embodiments, lighting-junction-box-assembly-for-remodel 600 may comprise (only) one lighting-junction-box 601, at least one spring(s) 137, and at least one mounting-tab(s) 143. In some embodiments, lighting-junction-box-assembly-for-remodel 600 may comprise (only) one lighting-junction-box 601, (exactly) two (2) springs 137, and (exactly) two (2) mounting-tabs 143. In some embodiments, lighting-junction-box-assembly-for-remodel 600 may comprise (only) one lighting-junction-box 601, (exactly) two (2) opposing springs 137, and (exactly) two (2) opposing mounting-tabs 143.

Continuing discussing FIG. 6A, in some embodiments, lighting-junction-box 601 may comprise sidewall 603 and one (1) lid 609. In some embodiments sidewall 603 may be a sidewall of lighting-junction-box 601. In some embodiments, sidewall 603 may be rigid to semi-rigid. In some embodiments, sidewall 603 may be a hollow elongate member. In some embodiments sidewall 603 may be at least substantially to entirely (right) cylindrical member that is at least substantially (mostly) hollow and open at bottom 605 and at top 607. Note, bottom 605 and top 607 are with respect to sidewall 603. However, in the assembled form of lighting-junction-box 601, top 607 of sidewall 603 may be at least substantially (mostly) covered over by attached lid 609. In some embodiments, sidewall 603 may run vertically upwards from bottom 605 to top 607. In some embodiments, sidewall 603 may be at least substantially (mostly) to entirely free from breaks, apertures, and/or holes; with the exception of hole-for-conduit(s) 129 which may or may not be present in sidewall 603 and/or hole(s)/aperture(s) for securing/attaching complementary-mounting-portion 141 and/or complementary-mounting-portion 149 to bottom exterior portions of sidewall 603. In some embodiments, sidewall 603 may comprise one or more hole-for-conduit(s) 129. In some embodiments, hole-for-conduit(s) 129 of sidewall 603 may be with or without a knock-out 111. In some embodiments, sidewall 603 may be at least substantially (mostly) open at its bottom 605. In some embodiments, similar to bottom 123, bottom 605 may comprise/have notch(es) 125. In some embodiments, similar to lower-portion 121, bottom exterior portions of sidewall 603 may have attached thereto complementary-mounting-portion 141 (of spring(s) 137) and complementary-mounting-portion 149 (of mounting-tab(s) 143).

Continuing discussing FIG. 6A, in some embodiments, lid 609 may be attached to sidewall 603 at and/or proximate to top 607 of sidewall 603. In some embodiments, lid 609 may be attached to top 607 of sidewall 603 in the same or similar fashion as lid 127 is attached to the top of upper-portion 103 of lighting-junction-box 101 (such as, but not limited to, by welding). In some embodiments, lid 609 may be configured to operate/function as a lid. In some embodiments, lid 609 may cover over top 607 of sidewall 603. In some embodiments, a shape of lid 609, when viewed from above or from below, may complementary match a shape of top 605 of sidewall 603 (when viewed from above or from below). In some embodiments, a shape of lid 609, when viewed from above or from below, may be at least substantially (mostly) to entirely circular, i.e., a circle shape. In some embodiments, lid 609 may be rigid to semi-rigid. In some embodiments, lid 609 may be flat, planar, and/or solid disc/disk member. In some embodiments, lid 609 may be at least substantially (mostly) to entirely free from breaks, apertures, and/or holes; with the exception of hole-for-conduit(s) 129 which may or may not be present in lid 609 and/or aperture 611 for receiving a bolt/screw 712 for circuit/electronics grounding purposes. In some embodiments, lid 609 may comprise one or more hole-for-conduit(s) 129. In some embodiments, hole-for-conduit(s) 129 of lid 609 may be with or without a knock-out 111. In some embodiments, lid 609 may comprise at least one aperture 611. In some embodiments, aperture 611 may be a hole that passes entirely through a thickness of lid 609. In some embodiments, internal surfaces of aperture 611 may be (female) threaded. In some embodiments, aperture 611 may be sized and shaped to complementary receive a mating bolt/screw 712 (see e.g., FIG. 7C for bolt/screw 712). In some embodiments, bolt/screw 712 and mating aperture 611 may be configured for use in a grounding circuit. In some embodiments, next to, adjacent to, and/or proximate to aperture 611, may be symbol-for-ground 613; and next to, adjacent to, and/or proximate to, in this context, may be within (less than) one (1) inch. In some embodiments, symbol-for-ground 613 may be a symbol denoting a grounding circuit or portion thereof.

In some embodiments, an outside-diameter of lighting-junction-box 601, sidewall 603, and/or lid 609 may be outside-diameter 153 or the same as outside-diameter 153.

Also shown in FIG. 6A may be top 615, wherein top 615 may be a top-surface of lid 609. In some embodiments, top 615 (of lid 609) may be separated from top 607 (of sidewall 603) by a thickness of lid 609.

Like lighting-junction-box 101, lighting-junction-box-assembly-for-remodel 600, lighting-junction-box 601, sidewall 603, and lid 609 all have and share the common axial-centerline 199. Note, for reference purposes (only) lighting-junction-box 601 may have an ax-ial-centerline 199 that runs through a center of lighting-junction-box 601 from bottom 605 to lid 609. See e.g., FIG. 6A. In some embodiments, axial-centerline 199 may be an axial centerline of lighting-junction-box-assembly-for-remodel 600, lighting-junction-box 601, sidewall 603, and/or lid 609. For example, and without limiting the scope of the present invention, if assembly 600 was installed within a ceiling 300, and a bottom surface of that existing ceiling 300 was at least substantially (mostly) horizontal (e.g., at least mostly parallel with a below floor's surface), then axial-centerline 199 may be in at least a substantially (mostly) vertical configuration with respect to the at least mostly (substantially) horizontal bottom surface of that existing ceiling 300. In some embodiments, lighting-junction-box-assembly-for-remodel 600, lighting-junction-box 601, sidewall 603, and lid 609 all share the same/common axial-centerline 199. In some embodiments, lighting-junction-box-assembly-for-remodel 600, lighting-junction-box 601, sidewall 603, and lid 609 are all at least substantially (mostly) to entirely radially symmetrical about the shared common axial-centerline 199.

FIG. 6B depicts lighting-junction-box-assembly-for-remodel 600 shown from a bottom-up perspective view. FIG. 6B may show at least some portions of inside-of-sidewall 604 which may be an interior surface of sidewall 603. FIG. 6B may show at least some portions of bottom 616 which may be a bottom-side (interior surface side) of lid 609. In some embodiments, top 615 and bottom 616 may be opposing surfaces, disposed opposite from each other, by the thickness of lid 609. In some embodiments, symbol-for-ground 613 may be marked on bottom 616 (and/or on top 615), next to, adjacent to, and/or proximate to aperture 611. FIG. 6B also shows a portion of a knock-out 111 and/or of a hole-for-conduit 129. FIG. 6B also shows how lighting-junction-box 601 and/or sidewall 603 may be at least substantially hollow. In some embodiments, this hollow void space inside of lighting-junction-box 601 may be configured to house and/or receive various electronics, circuitry, and/or wiring of a lighting system (such as, but not limited to, at least one light source [e.g., a LED chip], a driver, a heat sink, portions thereof, combinations thereof, and/or the like). FIG. 6B also shows the pair of opposing internal-tabs 117 that protrude inwards towards axial-centerline 199 from bottom 605.

Figure 6C:
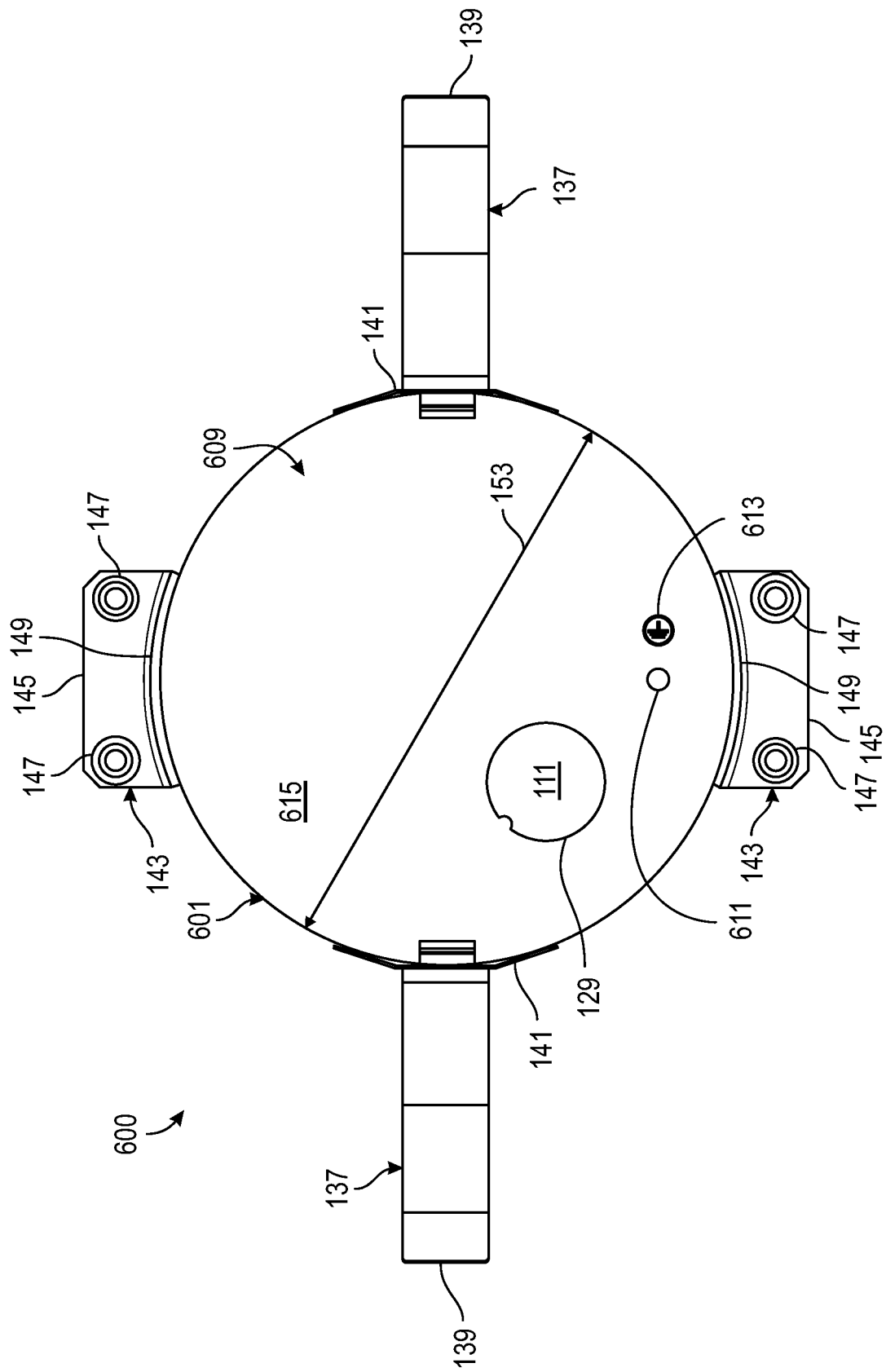
FIG. 6C depicts the lighting-junction-box-assembly-for-remodel of FIG. 6A shown from a top-down (top) view.
Figure 6D:
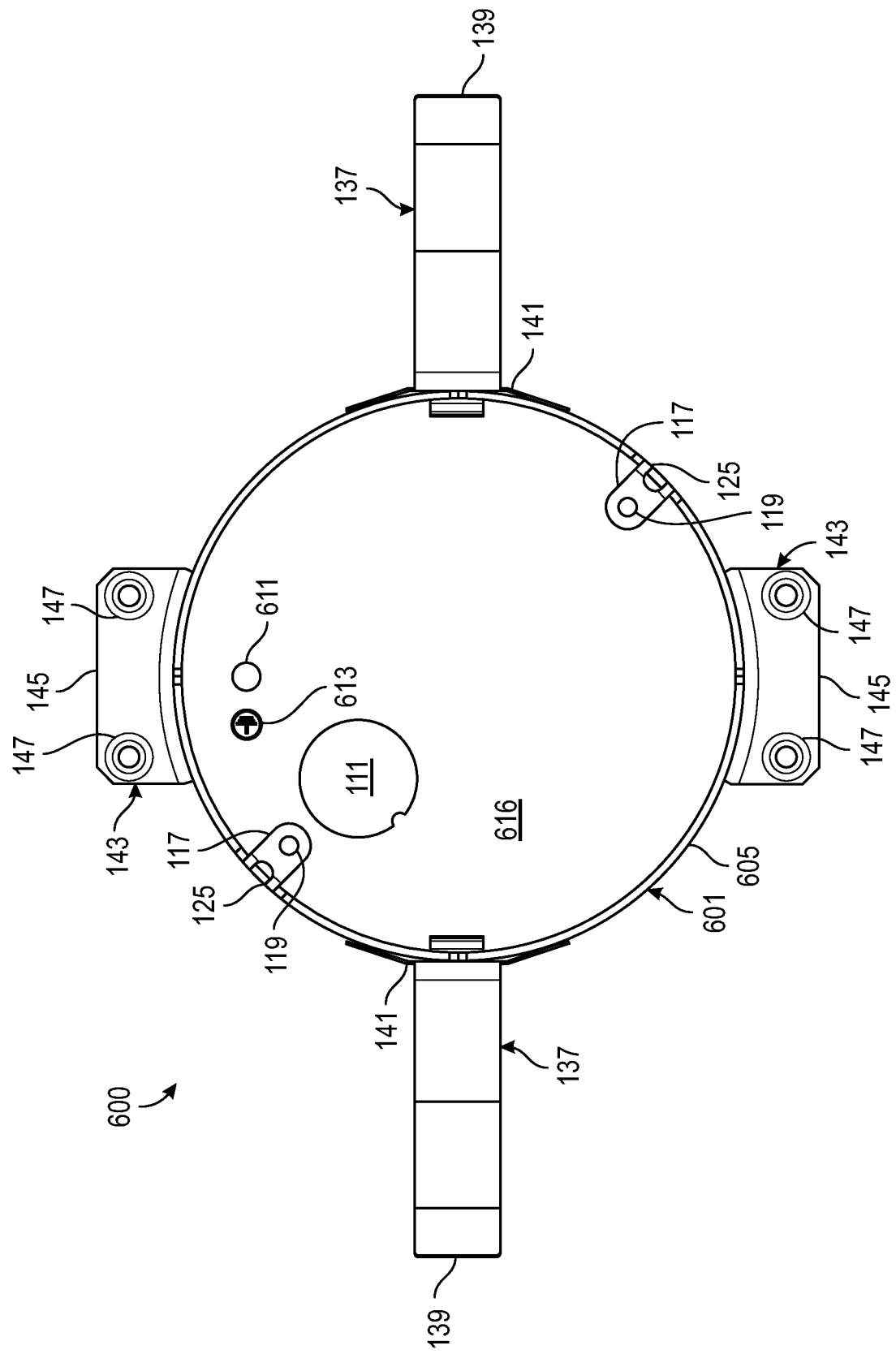
FIG. 6D depicts the lighting-junction-box-assembly-for-remodel of FIG. 6A shown from a bottom-up (bottom) view.
Figure 6E:
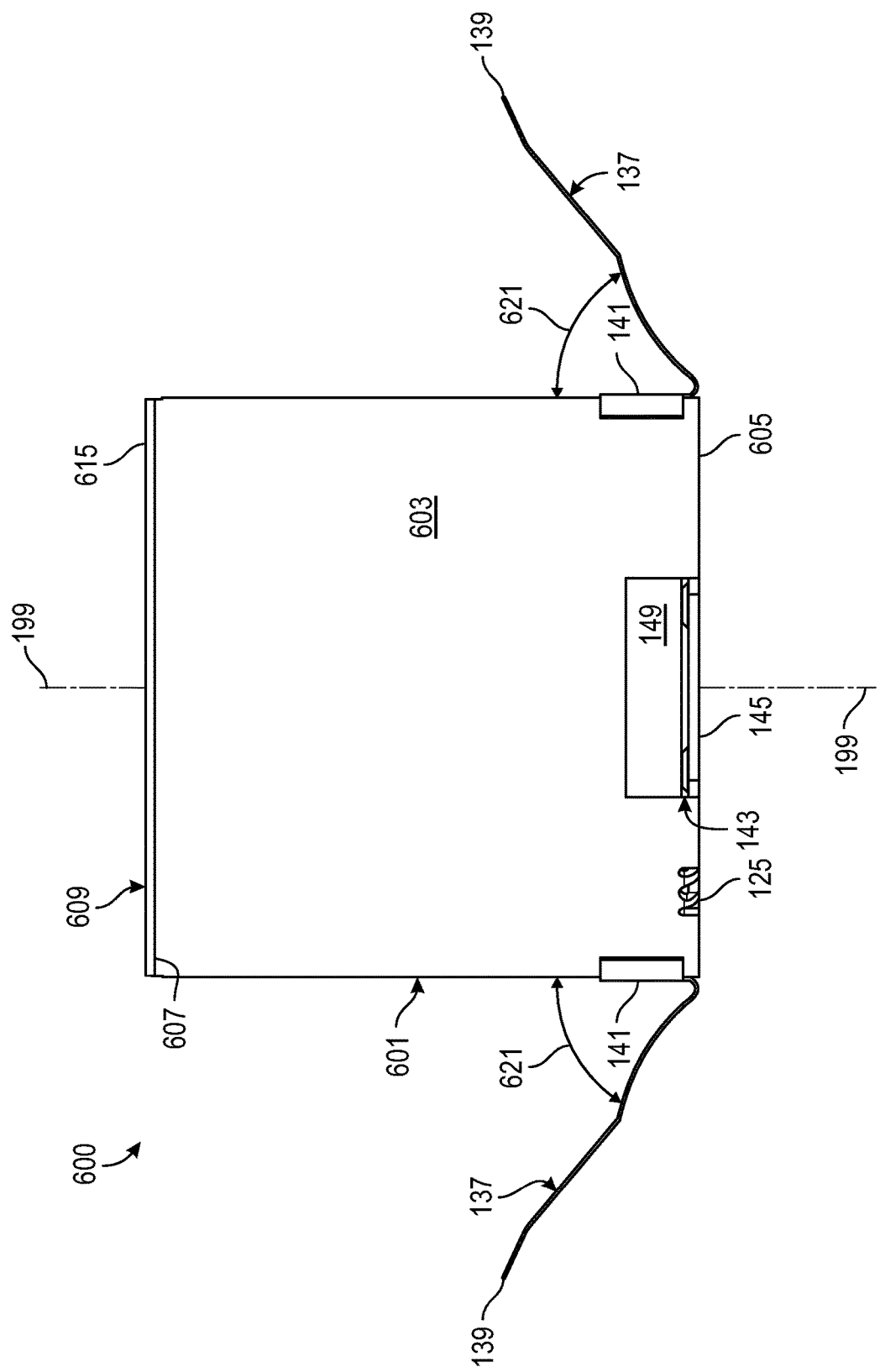
FIG. 6E depicts the lighting-junction-box-assembly-for-remodel of FIG. 6A shown from a front view.
Figure 6F:
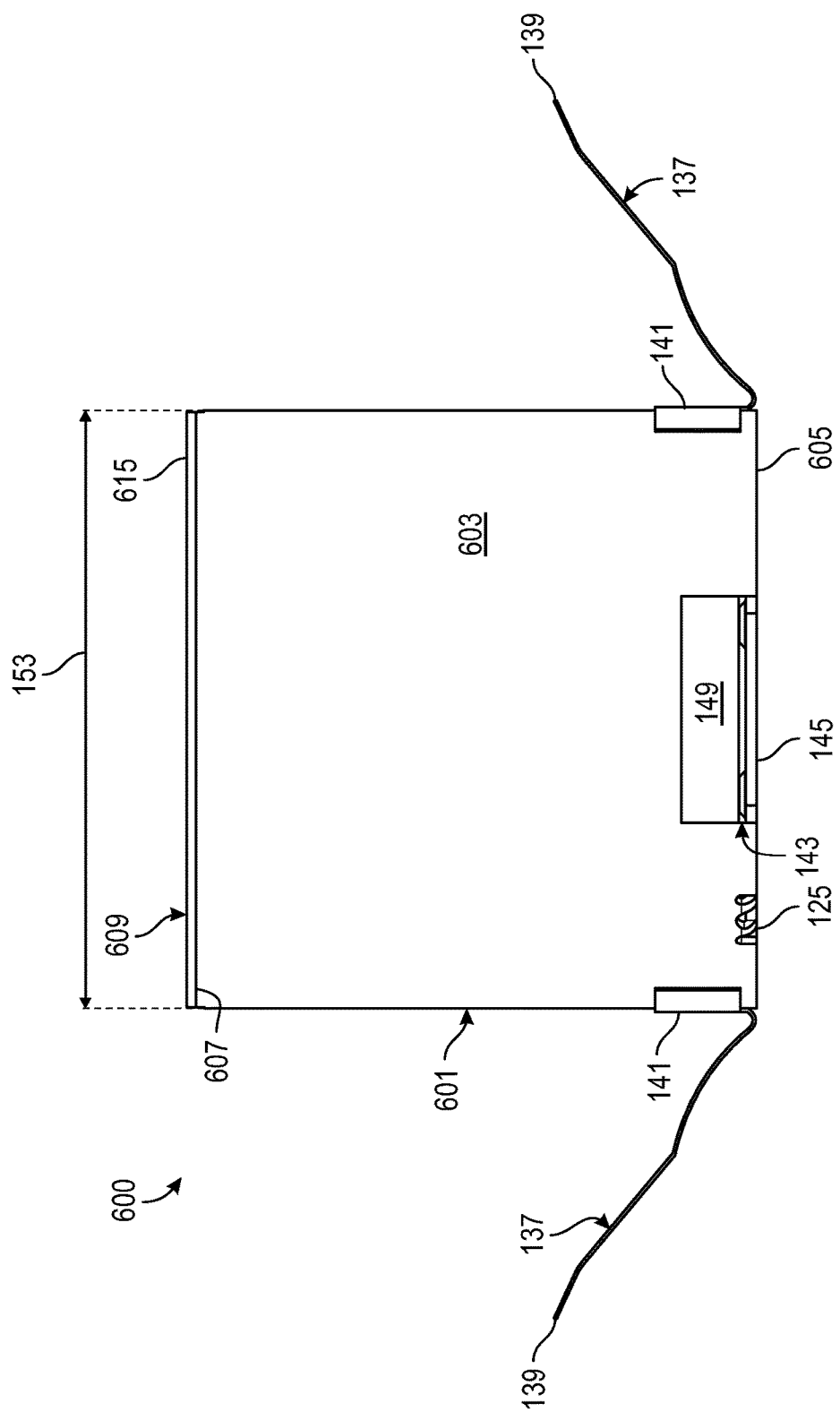
FIG. 6F depicts the lighting-junction-box-assembly-for-remodel of FIG. 6A shown from a rear (back) view.
Figure 6G:
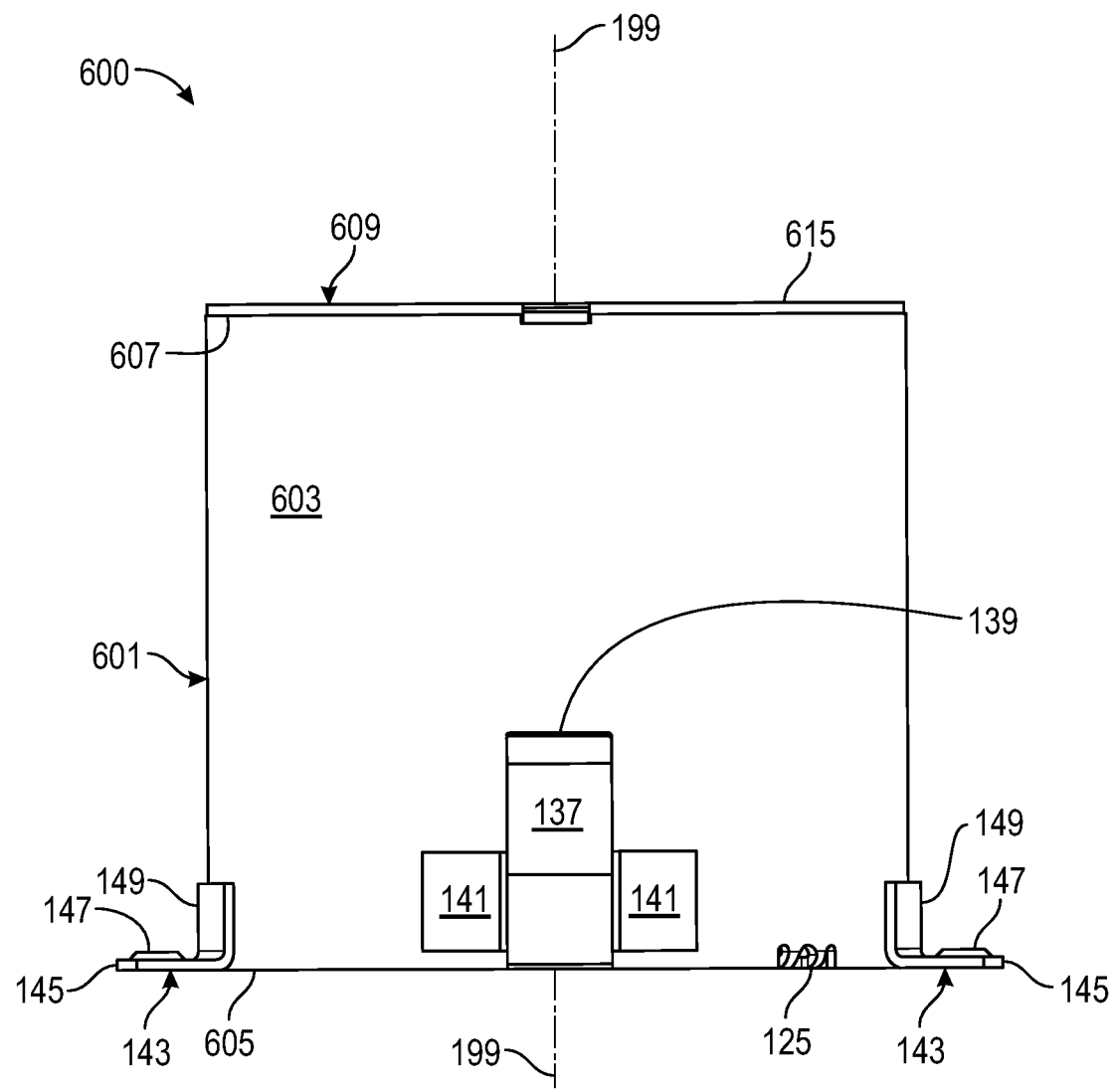
FIG. 6G depicts the lighting-junction-box-assembly-for-remodel of FIG. 6A shown from a left-side view.
Figure 6H:
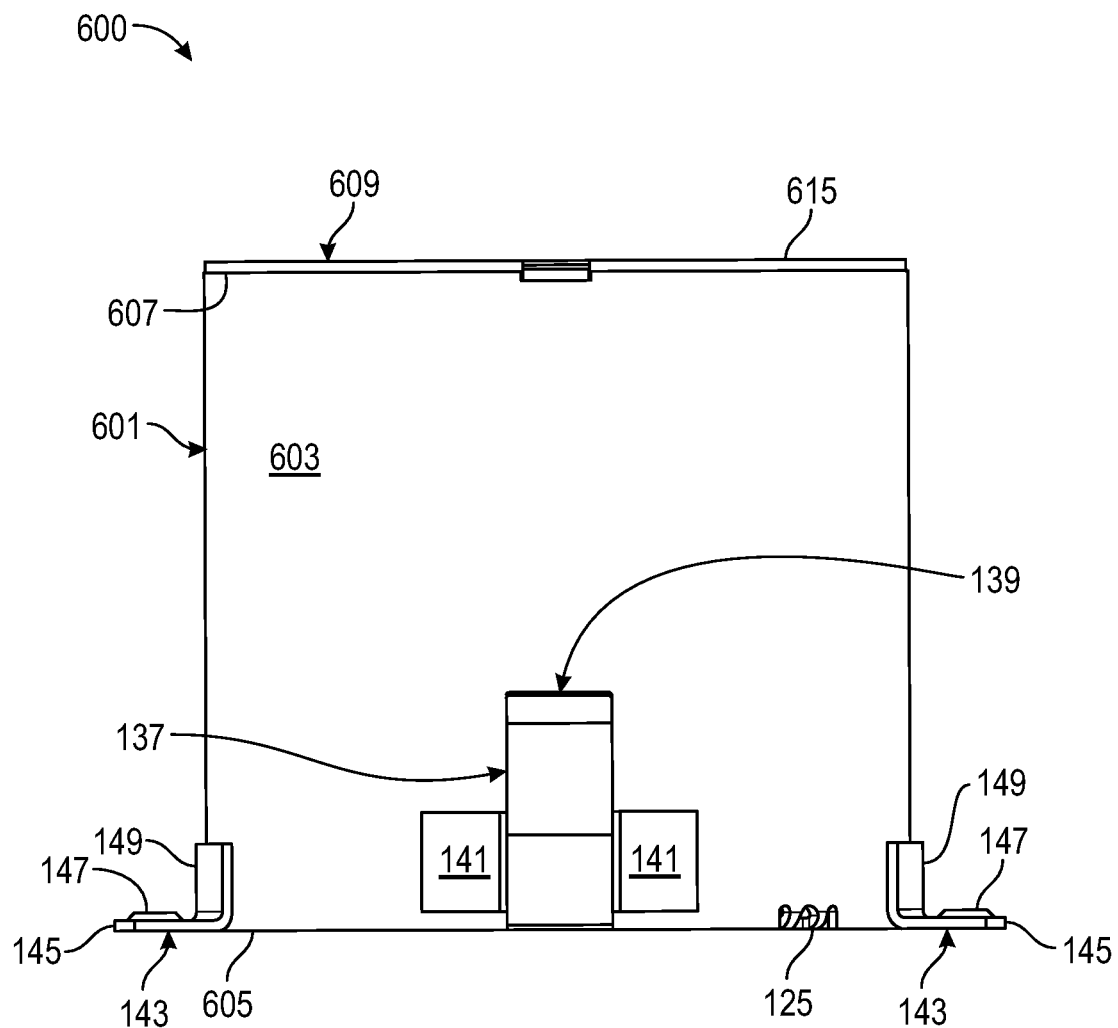
FIG. 6H depicts the lighting-junction-box-assembly-for-remodel of FIG. 6A shown from a right-side view.

Note, FIG. 6C through and including FIG. 6H may show the standard six (6) orthogonal views of lighting-junction-box-assembly-for-remodel 600.

FIG. 6C depicts lighting-junction-box-assembly-for-remodel 600 shown from a top-down (top) view. FIG. 6C may show top 615 of lid 609, with at least one hole-for-conduit(s) 129, with at least one aperture 611, and with one symbol-for-ground 613 for each such aperture 611. In some embodiments, any hole-for-conduit(s) 129 present on lighting-junction-box-assembly-for-remodel 600, may or may not have an associated/detachable knock-out 111. FIG. 6C shows the two opposing springs 137 and the two (2) opposing mounting-tabs 143 each protruding/extending away from bottom exterior surfaces of sidewall 603. In some embodiments, any pair of adjacent spring 137 and mounting-tab 143 may extend/protrude outwards away from the bottom exterior surfaces of sidewall 603 such that the directions this pair is pointing are at least substantially (mostly) ninety (90) degrees separated from each other.

FIG. 6D depicts lighting-junction-box-assembly-for-remodel 600 shown from a bottom-up (bottom) view. FIG. 6D and FIG. 6C may be opposing views from each other. FIG. 6D may show bottom 616 of lid 609, with at least one hole-for-conduit(s) 129, with at least one aperture 611, and with one symbol-for-ground 613 for each such aperture 611. In some embodiments, any hole-for-conduit(s) 129 present on lighting-junction-box-assembly-for-remodel 600, may or may not have an associated/detachable knock-out 111.

FIG. 6D shows a bottom surface of bottom 605 of sidewall 603. FIG. 6D shows the pair of opposing internal-tabs 117 that protrude inwards towards axial-centerline 199 from bottom 605. In some embodiments, each internal-tab 117 may comprise a hole 119 located at a distal terminal end of each internal-tab 117. In some embodiments, internal-tab(s) 117 and/or hole(s) 119 may be configured to provide anchoring structure for at least some elements of the internally housed lighting system elements that may be housed within lighting-junction-box 601 (and/or within sidewall 603). In some embodiments, at least some elements of the internally housed lighting system elements that may be housed within lighting-junction-box 601 (and/or within sidewall 603) may rest upon internal-tab(s) 117.

FIG. 6D shows the two opposing springs 137 and the two (2) opposing mounting-tabs 143 each protruding/extending away from bottom exterior surfaces of sidewall 603. In some embodiments, any pair of adjacent spring 137 and mounting-tab 143 may extend/protrude outwards away from the bottom exterior surfaces of sidewall 603 such that the directions this pair is pointing are at least substantially (mostly) ninety (90) degrees separated from each other.

FIG. 6E depicts lighting-junction-box-assembly-for-remodel 600 shown from a front view. FIG. 6E shows lid 609 resting and/or attached on top of sidewall 603. FIG. 6E shows the two (2) opposing springs 137 extending/protruding outwards and away from bottom exterior surfaces of sidewall 603, with portions (e.g., complementary-mounting-portions 141) of springs 137 attached to the bottom exterior surfaces of sidewall 603. Note, the two (2) opposing springs 137 do not extend/protrude in a manner that is perfectly perpendicular/orthogonal to the bottom exterior surfaces of sidewall 603; nor do the two (2) opposing springs 137 extend/protrude in a manner that is perfectly parallel to the bottom exterior surfaces of sidewall 603. Rather, the two (2) opposing springs 137 extend/protrude in a manner such that there is a variable-angle 621 between the bottom exterior surfaces of sidewall 603 and lengths of springs 137. In some embodiments, this variable-angle 621 may be greater than zero (0) degrees and less than ninety (90) degrees. In some embodiments, this variable-angle 621 may be variable because springs 137 may be bent and act/function as springs. FIG. 6E shows one notch 125 located on bottom 605 of sidewall 603, located between one spring 137 and one mounting-tab 143. In some embodiments, each notch 125 may be attached to one internal-tab 117.

FIG. 6F depicts lighting-junction-box-assembly-for-remodel 600 shown from a rear (back) view. FIG. 6F and FIG. 6E may be opposing views from each other. In some embodiments, the elements, structures, geometries, relationships shown in FIG. 6E may also be seen in FIG. 6F. For example, and without limiting the scope of the present invention, FIG. 6F shows the other opposing notch 125 located on bottom 605 of sidewall 603, located between one spring 137 and one mounting-tab 143.

FIG. 6G depicts lighting-junction-box-assembly-for-remodel 600 shown from a left-side view. FIG. 6G shows the two (2) opposing mounting-tabs 143 extending/protruding outwards and away from bottom exterior surfaces of sidewall 603, with portions (e.g., complementary-mounting-portions 149) of mounting-tabs 143 attached to the bottom exterior surfaces of sidewall 603. Note, the two (2) opposing extension-portions 145 of mounting-tabs 143 do extend/ protrude in a manner that may be at least substantially (mostly) perpendicu-lar/orthogonal to the bottom exterior surfaces of sidewall 603. FIG. 6E shows one notch 125 located on bottom 605 of sidewall 603, located between one mounting-tab 143 and one spring 137. In some embodiments, each notch 125 may be attached to one internal-tab 117.

FIG. 6H depicts lighting-junction-box-assembly-for-remodel 600 shown from a right-side view. FIG. 6H and FIG. 6G may be opposing views from each other. In some embodiments, the elements, structures, geometries, relationships shown in FIG. 6G may also be seen in FIG. 6H. For example, and without limiting the scope of the present invention, FIG. 6H shows the other opposing notch 125 located on bottom 605 of sidewall 603, located between one mounting-tab 143 and one spring 137.

Note, an exploded view of lighting-junction-box-assembly-for-remodel 600 may be at least substantially similar as that of FIG. 2A and/or FIG. 2B, but with replacing lid 127 with lid 609 and with replacing lighting-junction-box 101 with lighting-junction-box 601.

Figure 7A:
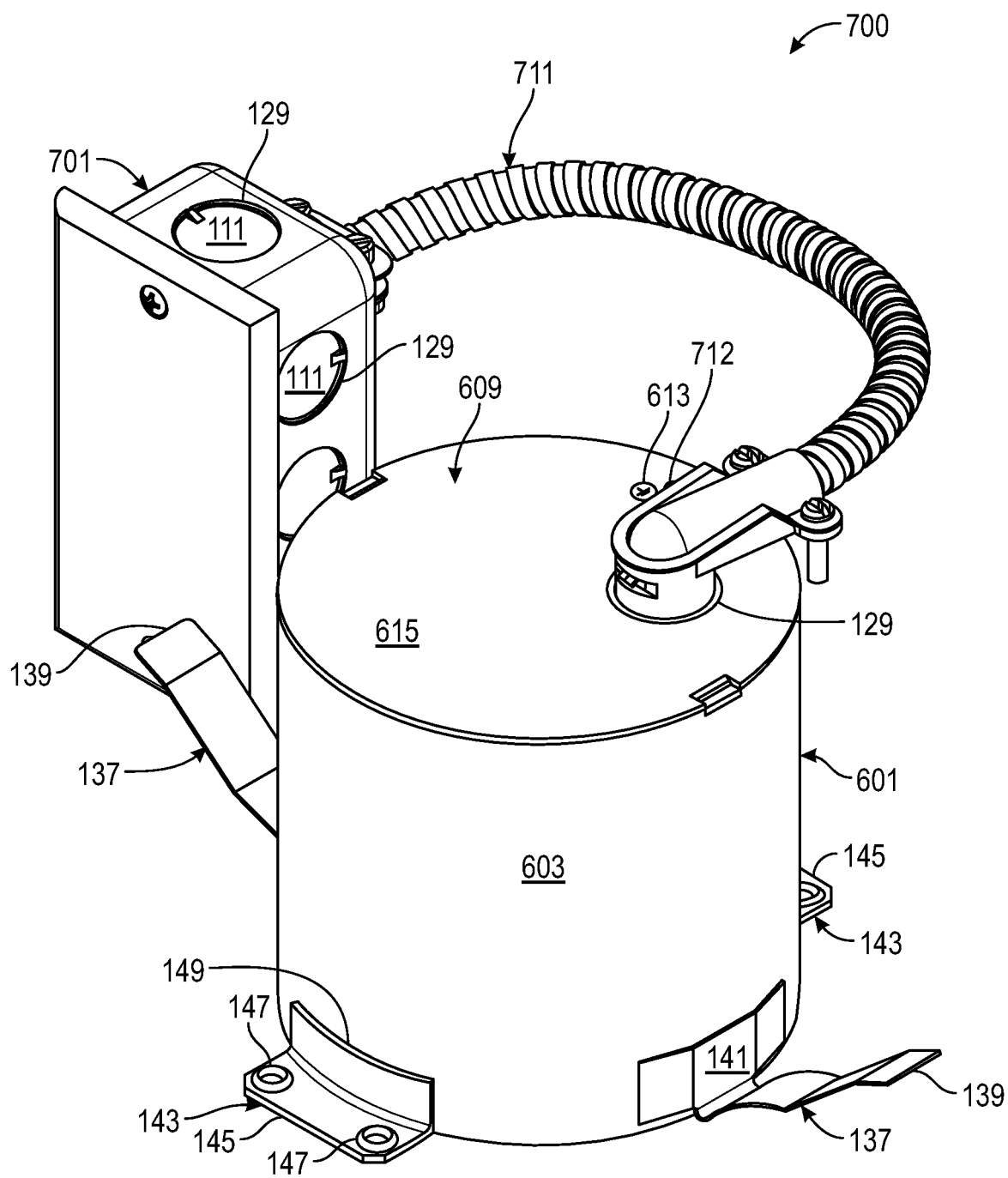
FIG. 7A depicts an overall-assembly, that includes a second junction-box, shown from a top-down perspective view.

FIG. 7A depicts an overall-assembly 700 shown from a top-down perspective view.

In some embodiments, overall-assembly 700 may comprise one lighting-junction-box-assembly-for-remodel 600, one junction-box 701, and one conduit 711. In some embodiments, overall-assembly 700 may also comprise template 400. In some embodiments, junction-box 701 may be a junction-box. In some embodiments, conduit 711 may be conduit, configured for housing and/or protecting electrical wiring/cabling within. In some embodiments, conduit 711 may be a fixed, a finite, and a predetermined length of metal or plastic hollow cylindrical sheathing. In some embodiments, conduit 711 may connect lighting-junction-box 601 to junc-tion-box 701. In some embodiments, conduit 711 may comprise two opposing terminal ends. In some embodiments, one terminal end of conduit 711 may be attached to lighting-junction-box 601 and the other opposing terminal end of conduit 711 may be attached to junction-box 701. In some embodiments, one terminal end of conduit 711 may be attached to lid 609 and the other opposing terminal end of conduit 711 may be attached to junction-box 701. In some embodiments, attachment of one terminal end of conduit 711 to lid 609, may occur such that this attachment is off-center from axial-centerline 199. In some embodiments, one terminal end of conduit 711 may be attached to sidewall 603 and the other opposing terminal end of conduit 711 may be attached to junction-box 701.

In application (use), junction-box 701 may be spaced apart from lighting-junction-box-assembly-for-remodel 600 by some distance, that may be varied, but limited to the length of conduit 711. For example, and without limiting the scope of the present invention, junction-box 701 may be spaced apart from lighting-junction-box-assembly-for-remodel 600 from one-half (0.5) inches to twelve (2) inches.

Note, overall-assembly 700 may comprise two (2) different junction-boxes, that of lighting-junction-box 601 and that of junction-box 701. In some embodiments, junction-box 701 may be referred to as "second junction-box 701," wherein lighting-junction-box 601 (or lighting-junction-box 101) may be the first junction-box. This two (2) different junction-boxes configuration allows the splitting of the electronics, circuitry, electrical connections, and/or wiring/ cabling that would otherwise have to be entirely within a lighting junction box (e.g., only a lighting can) to now occupy junction-box 701 and/or to occupy lighting-junction-box 601. This two (2) different junction-boxes configuration has several benefits. This two (2) different junction-boxes configuration allows some of the heat generating electronics, circuitry, electrical connections, and/or wiring/cabling that would otherwise have to be entirely within the lighting junction box (lighting can) to now occupy the adjacent junction-box 701. This two (2) different junction-boxes configuration allows the electronics, circuitry, electrical connections, and/or wiring/cabling that remain in lighting-junction-box 601 to now have more room (space), which in turn improves heat dissipation occurring within lighting-junction-box 601; and which in turn allows the electronics, circuitry, electrical connections, and/or wiring/cabling that remain in lighting-junction-box 601 to have longer operational lifespans as compared to a single junction-box only configuration.

Figure 7B:
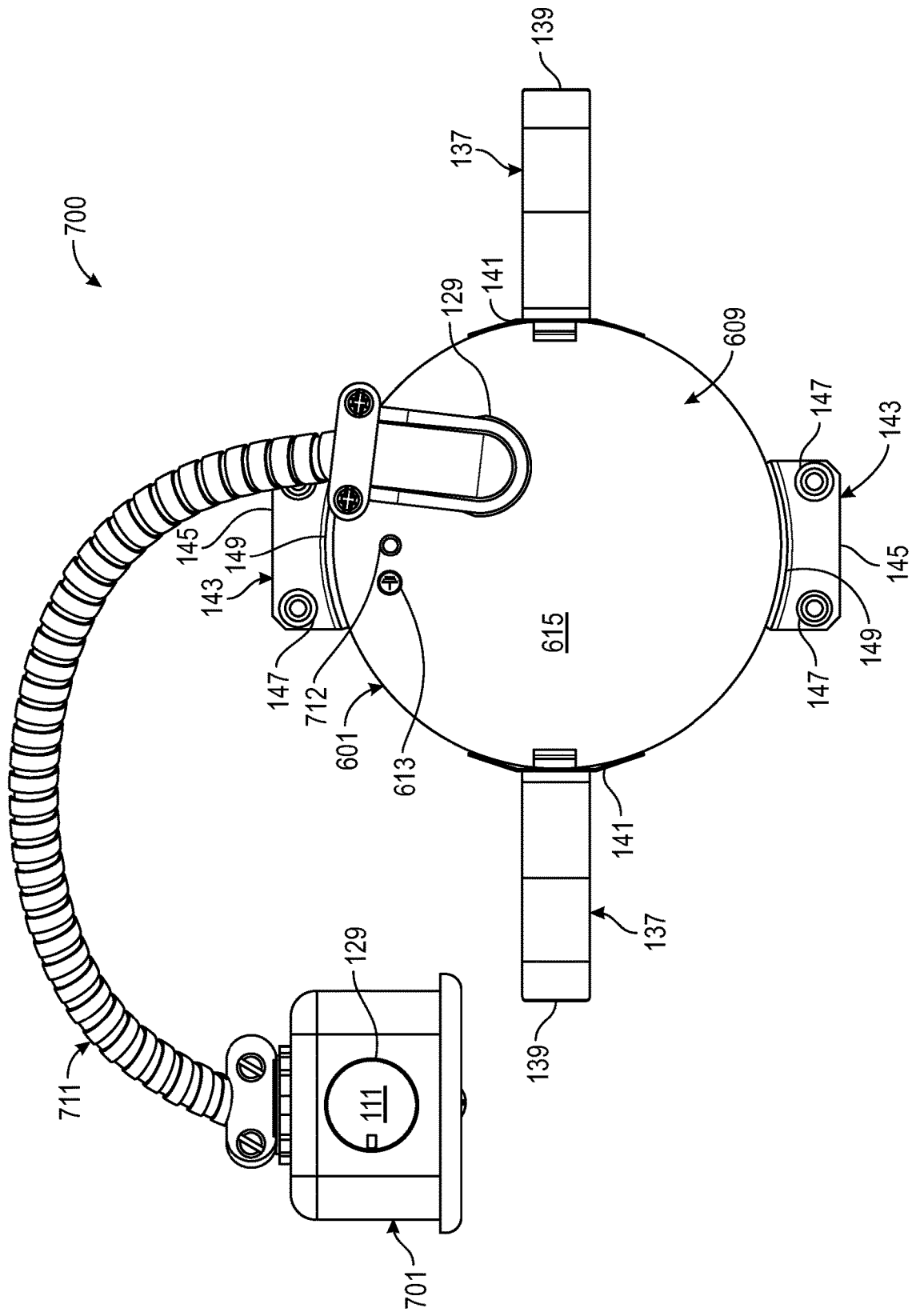
FIG. 7B depicts the overall-assembly of FIG. 7A shown from a top-down (top) view.

FIG. 7B depicts overall-assembly 700 shown from a top-down (top) view. FIG. 7B shows how junction-box 701 may be spaced apart from lighting-junction-box-assembly-for-remodel 600 by some distance (limited by the fixed length of conduit 711).

Figure 7C:
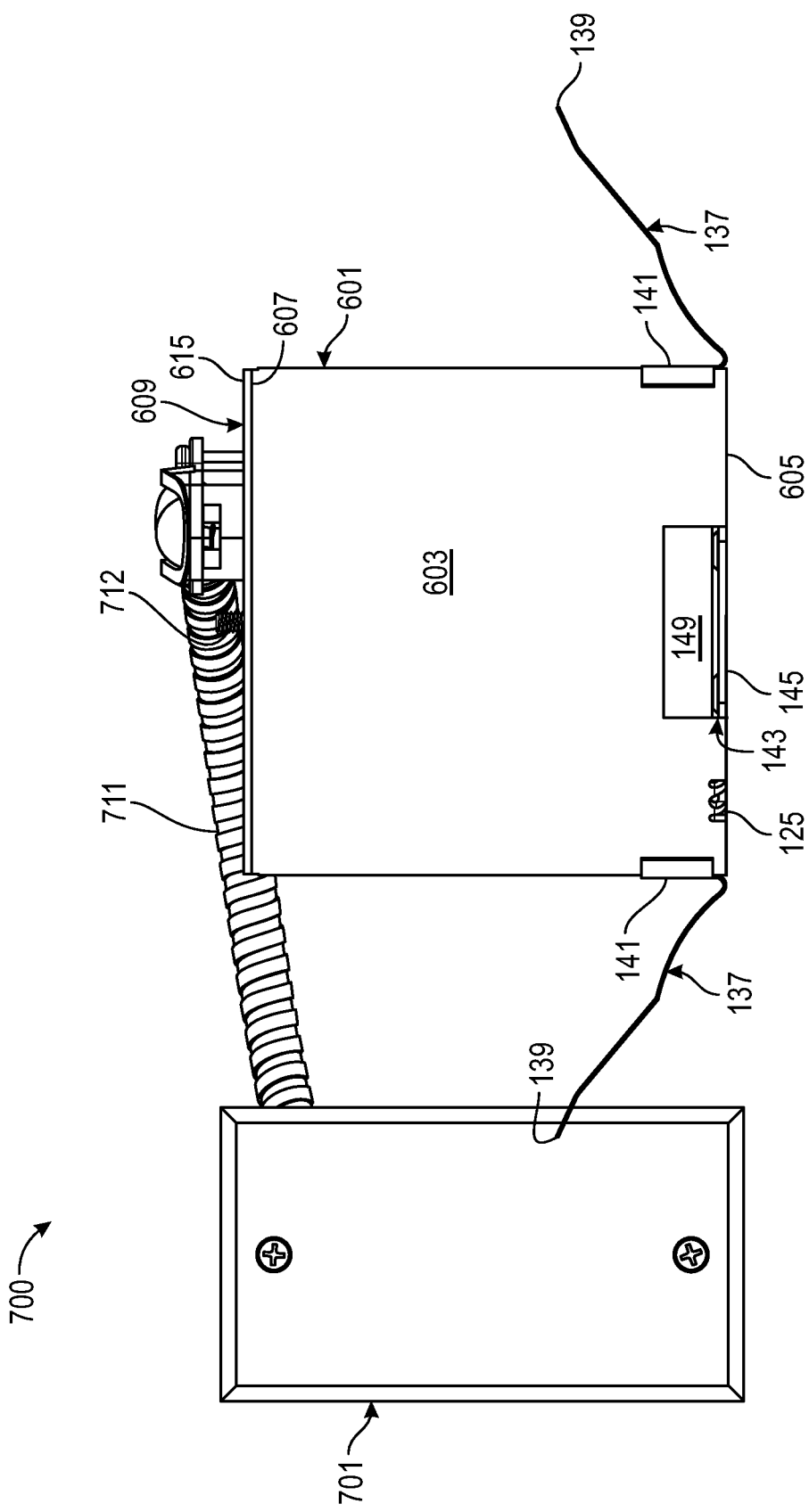
FIG. 7C depicts the overall-assembly of FIG. 7A shown from a front view.

FIG. 7C depicts overall-assembly 700 shown from a front view. FIG. 7C shows how junction-box 701 may be spaced apart from lighting-junction-box-assembly-for-remodel 600 by some distance (limited by the fixed length of conduit 711). In application (use), both lighting-junction-box-assembly-for-remodel 600 and junction-box 701 would be located (installed) above the ceiling.

Figure 7D:
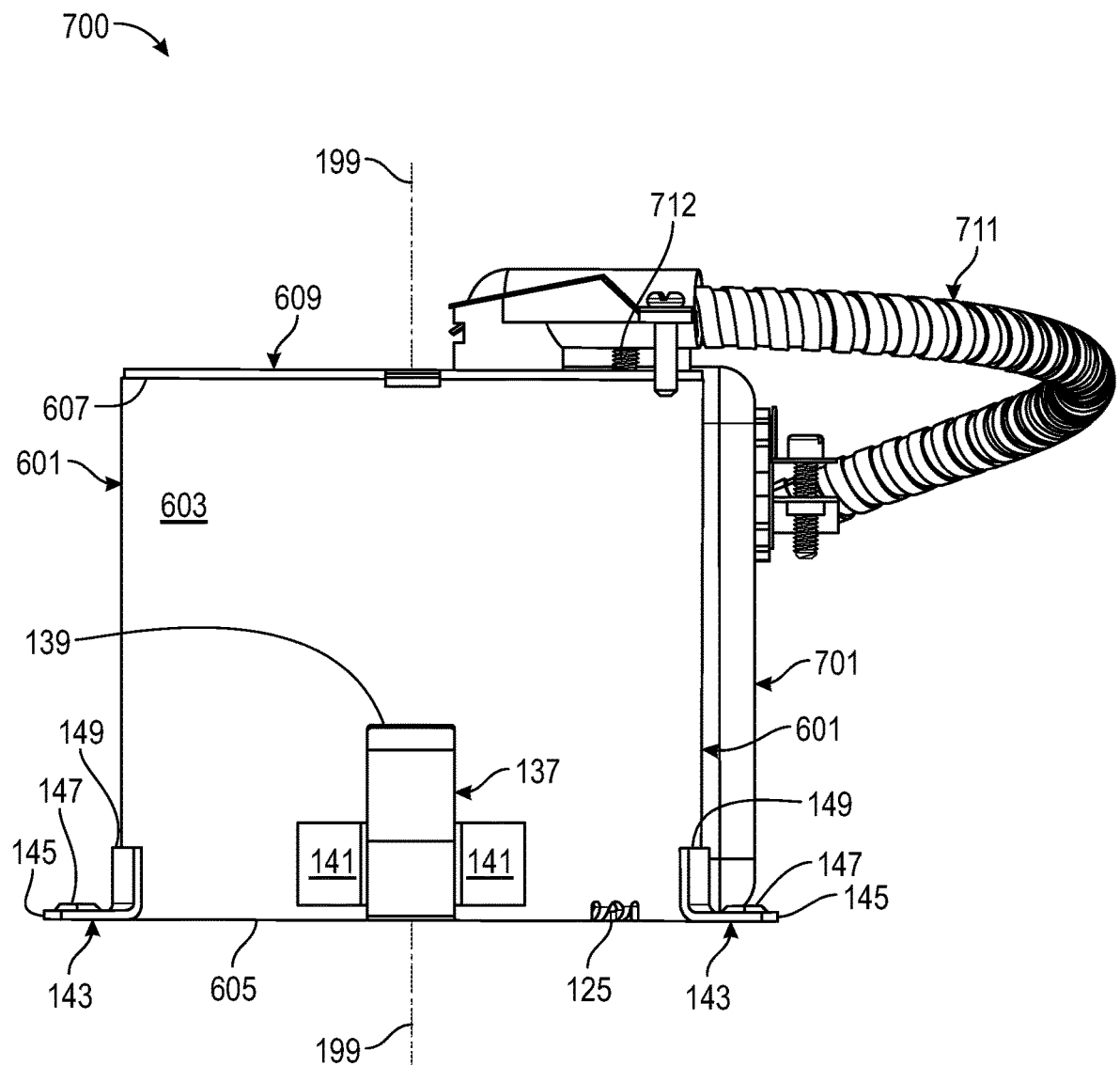
FIG. 7D depicts the overall-assembly of FIG. 7A shown from a right-side view.

FIG. 7D depicts overall-assembly 700 shown from a right-side view. Note, in FIG. 7D most of junction-box 701 is blocked from view by lighting-junction-box-assembly-for-remodel 600. Whereas, in an opposing left-side view (which is not included/shown), junction-box 701 would block some view of lighting-junction-box-assembly-for-remodel 600. However, other right-side or left-side views could be created wherein lighting-junction-box-assembly-for-remodel 600 and junction-box 701 do not block views of each other because conduit 711 may be flexible, i.e., lighting-junction-box-assembly-for-remodel 600 and junction-box 701 may be moved with respect to each other (limited by the fixed length of conduit 711).

In some embodiments, lighting-junction-box-assembly-for-remodel 600 of overall-assembly 700 may be replaced by lighting-junction-box-assembly-for-remodel 100. In some embodiments, overall-assembly 700 may comprise lighting-junction-box-assembly-for-remodel 600 or lighting-junction-box-assembly-for-remodel 100.

In some embodiments, assembly 100, 600, and/or 700 are not be used with mounting-frames; wherein mounting-frames are usually attached to a pair of parallel hanger bars; wherein the hanger bars are attached to adjacent parallel ceiling joists; wherein the mounting-frames receive a lighting can and sometimes a junction box; wherein such mounting-frames are often used in new construction (i.e., at least new ceiling construction). In some embodiments, assembly 100, 600, and/or 700 are used in existing ceiling retrofits (remodels) for recessed lighting applications.

In some embodiments, in terms of use/application, assembly 100 may be replaced with assembly 600 or vice-versa. In some embodiments, in terms of use/application, lighting-junction-box 101 may be replaced with lighting-junction-box 601 or vice-versa.

In some embodiments, assembly 100 or assembly 600 and/or at least a portion thereof may be at least mostly (substantially) made from one or more materials of: a metal, an alloy, plastic, carbon fiber, ceramic, wood, portions thereof, combinations thereof, and/or the like. In some embodiments, assembly 100 or assembly 600 and/or at least a portion thereof may be at least mostly (substantially) made from one or more materials approved by a regulatory agency and/or law that may be applicable to where a given assembly 100 or assembly 600 may be planned to be installed.

In some embodiments, exterior surfaces of assembly 100 or assembly 600 and/or at least a portion thereof may be painted and/or powder coated.

Note with respect to the materials of construction, it is not desired nor intended to thereby unnecessarily limit the present invention by reason of such disclosure.

In some embodiments, assembly 100 or assembly 600 may be IC (insulation contact) rated. In some embodiments, assembly 100 or assembly 600 may be configured for use in IC (insulation contact) and/or non-IC applications. In some embodiments, assembly 100 or assembly 600 may be IC (insulation contact) rated airtight for direct contact with insulation.

In some embodiments, a maximum two (2) hour fire rated ceiling assembly may be maintained when assembly 100 or assembly 600 may be installed according to the International Building Code, Section 714.

In some embodiments, assembly 100 or assembly 600 may be UL (Underwriters' Laboratories) listed under UL 514A Standards as a metallic outlet box. In some embodiments, assembly 100 or assembly 600 may be UL listed under 1598 Standards as a luminaire housing.

In some embodiments, assembly 100 or assembly 600 may be configured for use in damp locations and/or potentially in wet locations.

In some embodiments, assembly 100 or assembly 600 may be low profile, making assembly 100 or assembly 600 ideal for use in shallow plenum applications. For example, and without limiting the scope of the present invention, assembly 100 or assembly 600 may have a height of four (4) inches (e.g., from bottom-circular-edge 123 to a top of lid 127 or from bottom 605 to top 615 of lid 609).

In some embodiments, extension-portion(s) 145 may not be completely covered by trim; i.e., mudding, plastering, and/or painting may be desired, required, and/or necessary after installation of assembly 100 or assembly 600 into existing ceiling 300.

Lighting-junction-box-assemblies-for-remodel have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently consid-ered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An assembly for lighting configured for installation into a ceiling, wherein the assembly comprises:
   a lighting-junction-box that is configured for at least housing at least one light source within a cavity of the lighting-junction-box, wherein the lighting-junction-box comprises a sidewall that is cylindrical, wherein the sidewall surround sides of the cavity;
   at least two springs attached to the lighting-junction-box at a bottom exterior of the sidewall, wherein each of the at least two springs has a distal end that points away from the sidewall of the lighting-junction-box, but wherein the distal end does at least partially point upwards from a bottom of the lighting-junction-box towards a top of lighting-junction-box, wherein each of the at least two springs is configured to frictionally engage interior sides of a hole within the ceiling, wherein that hole is sized to fit at least most of the lighting-junction-box within an inside diameter of that hole; and at least two mounting-tabs attached to the lighting-junction-box at the bottom exterior of the sidewall, wherein each of the at least two mounting-tabs has an extension-portion that points away from the lighting-junction-box, wherein each of the at least two mounting-tabs is configured for facilitating attachment of the lighting-junction-box to the ceiling;

wherein the distal ends of the at least two springs and the extension-portions of the at least two mounting-tabs all point in different directions from each other.

2. The assembly according to claim 1, wherein each of the at least two springs comprises an elongate-leg-portion that is longer than wide and wider than thick, and wherein the elongate-leg-portion terminates at the distal-end.

3. The assembly according to claim 2, wherein the elongate-leg-portion has an overall length that is not parallel nor orthogonal with an axial-centerline of the lighting-junction-box, when the elongate-leg-portion is in a default resting relaxed configuration.

4. The assembly according to claim 2, wherein the elongate-leg-portion has a predetermined rigidity that is configured to be temporarily squeezed into a squeezed configuration towards the sidewall of the lighting-junction-box and when not being squeezed the elongate-leg-portion is in a default resting relaxed configuration.

5. The assembly according to claim 4, wherein when both of the elongate-leg-portions are in the squeezed configuration, the assembly is configured to fit at least mostly within the hole in the ceiling.

6. The assembly according to claim 1, wherein each of the at least two springs comprises a complementary-mounting-portion that is attached to the bottom exterior of the sidewall of the lighting-junction-box.

7. The assembly according to claim 6, wherein the two complementary-mounting-portions are oppositely disposed from each other on the bottom exterior of the sidewall of the lighting-junction-box.

8. The assembly according to claim 1, wherein the extension-portion extends orthogonally away from an axial-centerline of the lighting-junction-box.

9. The assembly according to claim 1, wherein each of the at least two mounting-tabs comprises a complementary-mounting-portion that is attached to the bottom exterior of the sidewall of the lighting-junction-box.

10. The lighting-junction-box-assembly according to claim 9, wherein the two complementary-mounting-portions are oppositely disposed from each other on the bottom exterior of the sidewall of the lighting-junction-box.

11. The assembly according to claim 1, wherein the extension-portion comprises at least one through-hole, wherein the at least one through-hole is configured to receive a mechanical fastener for attaching the extension-portion to the ceiling.

12. The assembly according to claim 1, wherein a spring selected from the at least two springs and a mounting-tab selected from the at least two mounting-tabs are adjacent to each other and separated from each other by ninety (90) degrees along the bottom exterior of the sidewall of the lighting-junction-box.

13. The assembly according to claim 1, wherein each of the at least two springs comprises an elongate-leg-portion that is longer than the extension-portion.

14. The assembly according to claim 1, wherein the lighting-junction-box comprises a lid that is attached to a top of the sidewall; wherein the lid and the sidewall together at least mostly circumscribe the cavity around all boundaries of the cavity except at the bottom of the lighting-junction-box; wherein the lid and the sidewall are at least mostly solid closed structures; wherein the bottom of the lighting-junction-box is at least mostly open providing access to the cavity.

15. The assembly according to claim 1, wherein the assembly further comprises a second junction-box that is separate and distinct from the lighting-junction-box; wherein the second junction-box and the lighting-junction-box are attached to each other by a finite length of conduit.

16. The assembly according to claim 15, wherein both the second junction-box and the lighting-junction-box are installed above the ceiling.

17. The assembly according to claim 15, wherein the second junction-box is configured to house at least some circuitry that would have been housed in the lighting-junction-box if the second junction-box was not present.

18. The assembly according to claim 17, wherein when the second junction-box houses the at least some circuitry, then circuitry remaining within the cavity of the lighting-junction-box has more room and is better able to dissipate heat generated during electrical activation of the circuitry, wherein the circuitry comprises the at least one light source.

* * * * *